(12) United States Patent
Ho

(10) Patent No.: US 12,366,944 B2
(45) Date of Patent: Jul. 22, 2025

(54) TOUCH PANEL AND APPLICABLE TOUCH SENSITIVE PROCESSING METHOD AND APPARATUS AND TOUCH SYSTEM

(71) Applicant: EGALAX_EMPIA TECHNOLOGY INC., Taipei (TW)

(72) Inventor: Shun-Lung Ho, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 0 days.

(21) Appl. No.: 18/376,529

(22) Filed: Oct. 4, 2023

(65) Prior Publication Data

US 2024/0220056 A1    Jul. 4, 2024

(30) Foreign Application Priority Data

Dec. 28, 2022   (TW) .................................. 111150472

(51) Int. Cl.
| | |
|---|---|
| *G06F 3/044* | (2006.01) |
| *G06F 1/16* | (2006.01) |
| *G06F 3/041* | (2006.01) |

(52) U.S. Cl.
CPC .......... *G06F 3/0445* (2019.05); *G06F 1/1652* (2013.01); *G06F 3/0412* (2013.01); *G06F 3/0414* (2013.01); *G06F 2203/04102* (2013.01); *G06F 2203/04105* (2013.01)

(58) Field of Classification Search
CPC ......... G06F 1/1652; G06F 2203/04102; G06F 2203/04105; G06F 3/041; G06F 3/0412; G06F 3/0414; G06F 3/04166; G06F 3/0445; G06F 3/0446
See application file for complete search history.

(56) References Cited

U.S. PATENT DOCUMENTS

| | | | |
|---|---|---|---|
| 10,191,604 B2* | 1/2019 | Lee ...................... | G06F 3/0445 |
| 2016/0062505 A1* | 3/2016 | Hwang ................. | G06F 3/0445 345/174 |
| 2017/0160819 A1 | 6/2017 | Yi et al. | |
| 2018/0246585 A1 | 8/2018 | Hara | |

* cited by examiner

*Primary Examiner* — Robin J Mishler
(74) *Attorney, Agent, or Firm* — WPAT, PC

(57) ABSTRACT

A touch panel sequentially comprising: a first electrode layer, which comprises multiple first electrodes in parallel to a first axis; an elastic dielectric layer; and a second structure, which further comprises: multiple second circuits in parallel to the first axis; multiple third circuits in parallel to a second axis; multiple second electrodes; and multiple switch circuits, wherein that each of the switch circuits is coupled to one of the second electrodes and one of the second circuits, wherein that each of the switch circuits is configured to be selectively closed or opened according to signals transmitted from one of the third circuits, wherein each of the first electrodes covers on top of one of the second circuits and the switch circuits and the second electrodes which are coupled to the one of the second circuits.

51 Claims, 23 Drawing Sheets

TOUCH PANEL AND APPLICABLE TOUCH SENSITIVE PROCESSING METHOD AND APPARATUS AND TOUCH SYSTEM

CROSS REFERENCE TO RELATED PATENT APPLICATION

This patent application is based on a Taiwan, R.O.C. patent application No. 111150472 filed on Dec. 28, 2022.

FIELD OF THE INVENTION

The present invention relates to touch sensitive functions, and more particularly, to pressure sensitive array structure and its pressure and touch sensitive processing apparatus and method thereof.

BACKGROUND OF THE INVENTION

Applications of pressure and touch sensitive functions are extensive. Touch panel or screen (hereinafter, touch panel collectively) may be used to sense pressures applied to the touch panel by external objects or be used to sense positions where the external objects approach or touch the touch panel. However, the sensing of pressures and positions are not precise enough resulted from structures of existing touch panels.

Consequently, there exists a need of a new touch sensitive structure for measuring following information: 1) pressure values and central points of pressure where external objects pressing on a touch panel; 2) a central point where the external object hovering or touching on the touch panel; 3) a central point where a stylus or a board eraser which actively emits electrical signals hovering or touching on the touch panel. And in case the entire or a large part of the touch panel is covered with conductive liquid, the new touch sensitive structure is able being used to sense the first and the second information.

SUMMARY OF THE INVENTION

According to one embodiment of the present application, a touch panel is provided. The touch panel sequentially comprising: a first electrode layer, which comprises multiple first electrodes in parallel to a first axis; an elastic dielectric layer; and a second structure, which further comprises: multiple second circuits in parallel to the first axis; multiple third circuits in parallel to a second axis; multiple second electrodes; and multiple switch circuits, wherein that each of the switch circuits is coupled to one of the second electrodes and one of the second circuits, wherein that each of the switch circuits is configured to be selectively closed or opened according to signals transmitted from one of the third circuits, wherein each of the first electrodes covers on top of one of the second circuits and the switch circuits and the second electrodes which are coupled to the one of the second circuits.

Preferably, in order to reduce thickness of the touch panel or to increase transparency of the touch panel, wherein the second structure comprises a second electrode layer, wherein the second electrodes and the second circuits are arranged on a first surface of the second electrode layer, wherein the third circuits and the switch circuits are arranged on a second surface of the second electrode layer, wherein the first surface is opposite to the second surface, the first surface is closer to the first electrode layer than the second surface.

Preferably, in order to provide flexible designs of touch system, which includes a flexible touch panel or screen, wherein the first electrode layer, the dielectric layer, and the second structure are all flexible.

Preferably, in order to reduce manufacturing complexity and cost, wherein the second structure sequentially comprises a second electrode layer and a third electrode layer, wherein the second electrode layer further comprises the second circuits and the second electrodes, wherein the third electrode layer further comprises the third circuits and the switch circuits, wherein the second electrode layer is closer to the first electrode layer than the third electrode layer.

According to an embodiment of the present application, a touch sensitive processing method is provided. Applicable to the touch panel, the touch sensitive processing method comprising: performing multiple pressure value array sensing steps corresponding to each of the third circuits, wherein the pressure value array sensing step further comprises: controlling the switch circuits coupled to the corresponding third circuit being closed and controlling the switch circuits which are not coupled to the corresponding third circuit being opened; providing driving signals to at least a part of the first electrodes; and sensing the induced driving signals via the second circuits which are covered by the first electrodes which are being provided with the driving signals, respectively, to get a pressure value array; composing a pressure value image by all the pressure value arrays according to positions of the third circuits corresponding to the pressure value arrays; and calculating one or more points of pressure according to the pressure value image.

Preferably, in order to provide a pressure value corresponding to the point of pressure, the touch sensitive processing method further comprises: calculating a pressure value corresponding to each of the points of pressure according to the pressure value image.

Preferably, in order to provide points of pressure in lower resolution, wherein any given two of the first electrodes being provided with the driving signals are not adjacent to each other.

Preferably, in order to provide points of pressure in highest resolution, wherein the first electrodes being provided with the driving signals are all the first electrodes.

Preferably, in order to simultaneously provide a position of active stylus corresponding to the touch panel, wherein the pressure value array sensing step further comprises: sensing electrical signals via the second circuits, respectively, to get an electrical signal value array, wherein the electrical signals and the driving signals have different frequencies, the touch sensitive processing method further comprises composing an electrical signal value image based on all the electrical signal value arrays according to positions of the third circuits corresponding to the electrical signal value arrays; and calculating one or more positions of transmitters according to the electrical signal value image.

According to an embodiment of the present application, a touch sensitive processing method is provided. Applicable to the touch panel, the touch sensitive processing method comprising: performing multiple approaching or touching value array sensing steps corresponding to each of the third circuits, wherein the pressure value array sensing step further comprises: controlling the switch circuits coupled to the corresponding third circuit being closed and controlling the switch circuits which are not coupled to the corresponding third circuit being opened; providing driving signals to at least a part of the first electrodes; and sensing the induced driving signals via the second circuits which are covered by the first electrodes which are not being provided with the driving signals, respectively, to get an interlace approaching or touching value array; composing an interlace approaching or touching value image by all the interlace approaching or touching value arrays according to positions of the third circuits corresponding to the interlace approaching or touching value arrays; and calculating one or more points of approaching or touching according to the interlace approaching or touching value image.

Preferably, in order to provide a pressure value corresponding to the point of approaching or touching, the touch sensitive processing method further comprises calculating a pressure value corresponding to each of the points of approaching or touching according to the interlace approaching or touching value image.

Preferably, in order to provide points of pressure in lower resolution, wherein any given two of the first electrodes being provided with the driving signals are not adjacent to each other.

Preferably, in order to simultaneously provide a position of active stylus corresponding to the touch panel, wherein the approaching or touching value array sensing step further comprises: sensing electrical signals via the second circuits, respectively, to get an electrical signal value array, wherein the electrical signals and the driving signals have different frequencies, the touch sensitive processing method further comprises composing an electrical signal value image based on all the electrical signal value arrays according to positions of the third circuits corresponding to the electrical signal value arrays; and calculating one or more positions of transmitters according to the electrical signal value image.

According to an embodiment of the present application, a touch sensitive processing method is provided. Applicable to the touch panel, the touch sensitive processing method, comprising: performing multiple sensing steps corresponding to each of the third circuits, wherein the sensing step further comprises: controlling the switch circuits coupled to the corresponding third circuit being closed and controlling the switch circuits which are not coupled to the corresponding third circuit being opened; providing driving signals to at least a part of the first electrodes; sensing the induced driving signals via the second circuits which are covered by the first electrodes which are being provided with the driving signals, respectively, to get an interlace pressure value array; and sensing the induced driving signals via the second circuits which are covered by the first electrodes which are not being provided with the driving signals, respectively, to get an interlace approaching or touching value array; composing an interlace pressure value image by all the interlace pressure value arrays according to positions of the third circuits corresponding to the interlace pressure value arrays; composing an interlace approaching or touching value image by all the interlace approaching or touching value arrays according to positions of the third circuits corresponding to the interlace approaching or touching value arrays; calculating one or more points of pressure according to the interlace pressure value image; and calculating one or more points of approaching or touching according to the interlace approaching or touching value image.

Preferably, in order to provide a pressure value corresponding to the point of pressure and a pressure value corresponding to the point of approaching or touching, the touch sensitive processing method further comprises: calculating a pressure value corresponding to each of the points of pressure according to the interlace pressure value image; and calculating a pressure value corresponding to each of the points of approaching or touching according to the interlace approaching or touching value image.

Preferably, in order to provide points of pressure and points of approaching or touching in lower resolution, wherein any given two of the first electrodes being provided with the driving signals are not adjacent to each other.

Preferably, in order to make resolutions of the points of pressure and points of approaching or touching similar, wherein an absolute value of a difference of a number of the elements of the interlace approaching or touching value array and a number of the elements of the interlace pressure value array is zero or one.

Preferably, in order to simultaneously provide a position of active stylus corresponding to the touch panel, wherein the sensing step further comprises: sensing electrical signals via the second circuits, respectively, to get an electrical signal value array, wherein the electrical signals and the driving signals have different frequencies, the touch sensitive processing method further comprises composing an electrical signal value image based on all the electrical signal value arrays according to positions of the third circuits corresponding to the electrical signal value arrays; and calculating one or more positions of transmitters according to the electrical signal value image.

According to an embodiment of the present application, a touch sensitive processing method is provided. Applicable to the touch panel, the touch sensitive processing method, comprising: setting a positive number i as 1, designating multiple non-adjacent ones of the first electrodes as a first set, designating rest of the first electrodes as a second set, performing multiple interlace image sensing steps, wherein an i-th interlace image sensing step of the interlace image sensing steps comprises performing multiple sensing steps corresponding to each of the third circuits, wherein the sensing step further comprises: controlling the switch circuits coupled to the corresponding third circuit being closed and controlling the switch circuits which are not coupled to the corresponding third circuit being opened; providing driving signals to the first set; sensing the induced driving signals via the second circuits which are covered by the first electrodes which are being provided with the driving signals, respectively, to get an interlace pressure value array; sensing the induced driving signals via the second circuits which are covered by the first electrodes which are not being provided with the driving signals, respectively, to get an interlace approaching or touching value array; composing an i-th interlace pressure value image by all the interlace pressure value arrays according to positions of the third circuits corresponding to the interlace pressure value arrays; composing an i-th interlace approaching or touching value image by all the interlace approaching or touching value arrays according to positions of the third circuits corresponding to the interlace approaching or touching value arrays; increasing the positive integer i by 1 and exchanging the first set and the second set; and when a value of the positive integer i is larger than 2, forming a complete pressure value image based on an (i−1)-th interlace pressure value image and an (i−2)-th interlace pressure value image and forming a complete approaching or touching value image based on an (i−1)-th interlace approaching or touching value image and an (i−2)-th interlace approaching or touching value image; calculating one or more points of pressure according to the pressure value image; and calculating one or more points of approaching or touching according to the approaching or touching value image.

Preferably, in order to provide a pressure value corresponding to the point of pressure and a pressure value corresponding to the point of approaching or touching, the touch sensitive processing method further comprises: calculating a pressure value corresponding to each of the points of pressure according to the pressure value image; and calculating a pressure value corresponding to each of the points of approaching or touching according to the approaching or touching value image.

Preferably, in order to make resolutions of the points of pressure and points of approaching or touching similar, wherein an absolute value of a difference of a number of the elements of the interlace approaching or touching value array and a number of the elements of the interlace pressure value array is zero or one.

Preferably, in order to simultaneously provide a position of active stylus corresponding to the touch panel, wherein the sensing step further comprises: sensing electrical signals via the second circuits, respectively, to get an electrical signal value array, wherein the electrical signals and the driving signals have different frequencies, wherein the i-th interlace image sensing step further comprises composing an electrical signal value image based on all the electrical signal value arrays according to positions of the third circuits corresponding to the electrical signal value arrays; and calculating one or more positions of transmitters according to the electrical signal value image.

According to an embodiment of the present application, a touch sensitive processing method is provided. Applicable to the touch panel, the touch sensitive processing method, comprising: performing multiple electrical signal value array sensing steps corresponding to each of the third circuits, wherein the electrical signal value array sensing step further comprises: controlling the switch circuits coupled to the corresponding third circuit being closed and controlling the switch circuits which are not coupled to the corresponding third circuit being opened; sensing electrical signals via the second circuits, respectively, to get an electrical signal value array; composing an electrical signal value image based on all the electrical signal value arrays according to positions of the third circuits corresponding to the electrical signal value arrays; and calculating one or more positions of transmitters according to the electrical signal value image.

According to an embodiment of the present application, a touch sensitive processing method is provided. Applicable to the touch panel, the touch sensitive processing method, comprising: controlling potentials of all the first electrodes floating; providing first driving signals to all the third circuits so as that all the switch circuits being opened; providing second driving signals to all the third circuits and sensing variations of the second driving signals on each of the third circuits to get a first axis sensing array; providing the second driving signals to all the second circuits and sensing variations of the second driving signals on each of the second circuits to get a second axis sensing array; calculating one or more first axis coordinate values corresponding to one or more external conductive objects according to the first axis sensing array; and calculating one or more second axis coordinate values corresponding to the one or more external conductive objects according to the second axis sensing array.

According to an embodiment of the present application, a touch sensitive processing method is provided. Applicable to the touch panel, the touch sensitive processing method, comprising: controlling potentials of all the first electrodes floating; providing first driving signals to all the third circuits so as that all the switch circuits being closed; providing second driving signals to all the third circuits and sensing variations of the second driving signals on each of the third circuits to get a first axis sensing array; providing the second driving signals to all the second circuits and sensing variations of the second driving signals on each of the second circuits to get a second axis sensing array; calculating one or more first axis coordinate values corresponding to one or more external conductive objects according to the first axis sensing array; and calculating one or more second axis coordinate values corresponding to the one or more external conductive objects according to the second axis sensing array.

According to an embodiment of the present application, a touch sensitive processing method is provided. Applicable to the touch panel, the touch sensitive processing method, comprising: controlling potentials of all the first electrodes floating; providing first driving signals to all the third circuits so as that all the switch circuits being opened; providing second driving signals to all the third circuits and sensing variations of the second driving signals on each of the third circuits to get a first axis sensing array; providing third driving signals to all the second circuits and sensing variations of the third driving signals on each of the second circuits to get a second axis sensing array; calculating one or more first axis coordinate values corresponding to one or more external conductive objects according to the first axis sensing array; and calculating one or more second axis coordinate values corresponding to the one or more external conductive objects according to the second axis sensing array.

According to an embodiment of the present application, a touch sensitive processing method is provided. Applicable to the touch panel, the touch sensitive processing method, comprising: controlling potentials of all the first electrodes floating; providing first driving signals to all the third circuits so as that all the switch circuits being closed; providing second driving signals to all the third circuits and sensing variations of the second driving signals on each of the third circuits to get a first axis sensing array; providing third driving signals to all the second circuits and sensing variations of the third driving signals on each of the second circuits to get a second axis sensing array; calculating one or more first axis coordinate values corresponding to one or more external conductive objects according to the first axis sensing array; and calculating one or more second axis coordinate values corresponding to the one or more external conductive objects according to the second axis sensing array.

According to an embodiment of the present application, a touch sensitive processing apparatus is provided. Applicable to the touch panel, the touch sensitive processing apparatus comprising: an interconnection network for connecting the first electrodes, the second circuits, and the third circuits, respectively; a driving circuit for connecting to the interconnection network; a sensing circuit for connecting to the interconnection network; and a processor, configured to execute instructions stored in a non-volatile memory for: performing multiple pressure value array sensing steps corresponding to each of the third circuits, wherein the pressure value array sensing step further comprises: controlling the switch circuits coupled to the corresponding third circuit being closed and controlling the switch circuits which are not coupled to the corresponding third circuit being opened; providing driving signals to at least a part of the first electrodes; and sensing the induced driving signals via the second circuits which are covered by the first electrodes which are being provided with the driving signals, respectively, to get a pressure value array; composing a pressure value image by all the pressure value arrays according to positions of the third circuits corresponding to the pressure value arrays; and calculating one or more points of pressure according to the pressure value image.

Preferably, in order to provide a pressure value corresponding to the point of pressure, the processor is further configured for calculating a pressure value corresponding to each of the points of pressure according to the pressure value image.

Preferably, in order to provide points of pressure in lower resolution, wherein any given two of the first electrodes being provided with the driving signals are not adjacent to each other.

Preferably, in order to provide points of pressure in highest resolution, wherein the first electrodes being provided with the driving signals are all the first electrodes.

Preferably, the processor is further configured for reporting the one or more points of pressure to a host.

Preferably, in order to simultaneously provide a position of active stylus corresponding to the touch panel, wherein the pressure value array sensing step further comprises: sensing electrical signals via the second circuits, respectively, to get an electrical signal value array, wherein the electrical signals and the driving signals have different frequencies, the processor is further configured for: composing an electrical signal value image based on all the electrical signal value arrays according to positions of the third circuits corresponding to the electrical signal value arrays; and calculating one or more positions of transmitters according to the electrical signal value image.

Preferably, the processor is further configured for reporting the one or more positions of transmitters to a host.

According to an embodiment of the present application, a touch sensitive processing apparatus is provided. Applicable to the touch panel, the touch sensitive processing apparatus comprising: an interconnection network for connecting the first electrodes, the second circuits, and the third circuits, respectively; a driving circuit for connecting to the interconnection network; a sensing circuit for connecting to the interconnection network; and a processor, configured to execute instructions stored in a non-volatile memory for: performing multiple approaching or touching value array sensing steps corresponding to each of the third circuits, wherein the approaching or touching value array sensing step further comprises: controlling the switch circuits coupled to the corresponding third circuit being closed and controlling the switch circuits which are not coupled to the corresponding third circuit being opened; providing driving signals to at least a part of the first electrodes; and sensing the induced driving signals via the second circuits which are covered by the first electrodes which are not being provided with the driving signals, respectively, to get an interlace approaching or touching value array; composing an interlace approaching or touching value image by all the interlace approaching or touching value arrays according to positions of the third circuits corresponding to the interlace approaching or touching value arrays; and calculating one or more points of approaching or touching according to the interlace approaching or touching value image.

Preferably, in order to provide a pressure value corresponding to the point of approaching or touching, the processor is further configured for calculating a pressure value corresponding to each of the points of approaching or touching according to the interlace approaching or touching value image.

Preferably, in order to provide points of approaching or touching in lower resolution, wherein any given two of the first electrodes being provided with the driving signals are not adjacent to each other.

Preferably, wherein the processor is further configured for reporting the one or more points of approaching or touching to a host.

Preferably, in order to simultaneously provide a position of active stylus corresponding to the touch panel, wherein the approaching or touching value array sensing step further comprises: sensing electrical signals via the second circuits, respectively, to get an electrical signal value array, wherein the electrical signals and the driving signals have different frequencies, the processor is further configured for: composing an electrical signal value image based on all the electrical signal value arrays according to positions of the third circuits corresponding to the electrical signal value arrays; and calculating one or more positions of transmitters according to the electrical signal value image.

Preferably, wherein the processor is further configured for reporting the one or more positions of transmitters to a host.

According to an embodiment of the present application, a touch sensitive processing apparatus is provided. Applicable to the touch panel, the touch sensitive processing apparatus comprising: an interconnection network for connecting the first electrodes, the second circuits, and the third circuits, respectively; a driving circuit for connecting to the interconnection network; a sensing circuit for connecting to the interconnection network; and a processor, configured to execute instructions stored in a non-volatile memory for: performing multiple sensing steps corresponding to each of the third circuits, wherein the sensing step further comprises: controlling the switch circuits coupled to the corresponding third circuit being closed and controlling the switch circuits which are not coupled to the corresponding third circuit being opened; providing driving signals to at least a part of the first electrodes; sensing the induced driving signals via the second circuits which are covered by the first electrodes which are being provided with the driving signals, respectively, to get an interlace pressure value array; and sensing the induced driving signals via the second circuits which are covered by the first electrodes which are not being provided with the driving signals, respectively, to get an interlace approaching or touching value array; composing an interlace pressure value image by all the interlace pressure value arrays according to positions of the third circuits corresponding to the interlace pressure value arrays; composing an interlace approaching or touching value image by all the interlace approaching or touching value arrays according to positions of the third circuits corresponding to the interlace approaching or touching value arrays; calculating one or more points of pressure according to the interlace pressure value image; and calculating one or more points of approaching or touching according to the interlace approaching or touching value image.

Preferably, in order to provide a pressure value corresponding to the point of pressure and a pressure value corresponding to the point of approaching or touching, the processor is further configured for calculating a pressure value corresponding to each of the points of pressure according to the interlace pressure value image; and calculating a pressure value corresponding to each of the points of approaching or touching according to the interlace approaching or touching value image.

Preferably, in order to provide points of pressure and points of approaching or touching in lower resolution, wherein any given two of the first electrodes being provided with the driving signals are not adjacent to each other.

Preferably, in order to make resolutions of the point of approaching or touching and the point of pressure similar, wherein an absolute value of a difference of a number of the elements of the interlace approaching or touching value array and a number of the elements of the interlace pressure value array is zero or one.

Preferably, the processor is further configured for reporting the one or more points of pressure and the one or more points of approaching or touching to a host.

Preferably, in order to simultaneously provide a position of active stylus corresponding to the touch panel, wherein the sensing step further comprises: sensing electrical signals via the second circuits, respectively, to get an electrical signal value array, wherein the electrical signals and the driving signals have different frequencies, the processor is further configured for: composing an electrical signal value image based on all the electrical signal value arrays according to positions of the third circuits corresponding to the electrical signal value arrays; and calculating one or more positions of transmitters according to the electrical signal value image.

Preferably, wherein the processor is further configured for reporting the one or more positions of transmitters to a host.

According to an embodiment of the present application, a touch sensitive processing apparatus is provided. Applicable to the touch panel, the touch sensitive processing apparatus comprising: an interconnection network for connecting the first electrodes, the second circuits, and the third circuits, respectively; a driving circuit for connecting to the interconnection network; a sensing circuit for connecting to the interconnection network; and a processor, configured to execute instructions stored in a non-volatile memory for: setting a positive number i as 1, designating multiple non-adjacent ones of the first electrodes as a first set, designating rest of the first electrodes as a second set, performing multiple interlace image sensing steps, wherein an i-th interlace image sensing step of the interlace image sensing steps comprises performing multiple sensing steps corresponding to each of the third circuits, wherein the sensing step further comprises: controlling the switch circuits coupled to the corresponding third circuit being closed and controlling the switch circuits which are not coupled to the corresponding third circuit being opened; providing driving signals to the first set; sensing the induced driving signals via the second circuits which are covered by the first electrodes which are being provided with the driving signals, respectively, to get an interlace pressure value array; sensing the induced driving signals via the second circuits which are covered by the first electrodes which are not being provided with the driving signals, respectively, to get an interlace approaching or touching value array; composing an i-th interlace pressure value image by all the interlace pressure value arrays according to positions of the third circuits corresponding to the interlace pressure value arrays; composing an i-th interlace approaching or touching value image by all the interlace approaching or touching value arrays according to positions of the third circuits corresponding to the interlace approaching or touching value arrays; increasing the positive integer i by 1 and exchanging the first set and the second set; and when a value of the positive integer i is larger than 2, forming a complete pressure value image based on an (i−1)-th interlace pressure value image and an (i−2)-th interlace pressure value image and forming a complete approaching or touching value image based on an (i−1)-th interlace approaching or touching value image and an (i−2)-th interlace approaching or touching value image; calculating one or more points of pressure according to the pressure value image; and calculating one or more points of approaching or touching according to the approaching or touching value image.

Preferably, in order to provide a pressure value corresponding to the point of pressure and a pressure value corresponding to the point of approaching or touching, wherein the i-th interlace image sensing step further comprises: calculating a pressure value corresponding to each of the points of pressure according to the pressure value image; and calculating a pressure value corresponding to each of the points of approaching or touching according to the approaching or touching value image.

Preferably, in order to make resolutions of the points of pressure and points of approaching or touching similar, wherein an absolute value of a difference of a number of the elements of the interlace approaching or touching value array and a number of the elements of the interlace pressure value array is zero or one.

Preferably, wherein the processor is further configured for reporting the one or more points of pressure and the points of approaching or touching to a host.

Preferably, in order to simultaneously provide a position of active stylus corresponding to the touch panel, wherein the sensing step further comprises: sensing electrical signals via the second circuits, respectively, to get an electrical signal value array, wherein the electrical signals and the driving signals have different frequencies, the i-th interlace image sensing step further comprises: composing an electrical signal value image based on all the electrical signal value arrays according to positions of the third circuits corresponding to the electrical signal value arrays; and calculating one or more positions of transmitters according to the electrical signal value image.

Preferably, wherein the processor is further configured for reporting the one or more positions of transmitters to a host.

According to an embodiment of the present application, a touch sensitive processing apparatus is provided. Applicable to the touch panel, the touch sensitive processing apparatus, comprising: an interconnection network for connecting the first electrodes, the second circuits, and the third circuits, respectively; a driving circuit for connecting to the interconnection network; a sensing circuit for connecting to the interconnection network; and a processor, configured to execute instructions stored in a non-volatile memory for: performing multiple electrical signal value array sensing steps corresponding to each of the third circuits, wherein the electrical signal value array sensing step further comprises: controlling the switch circuits coupled to the corresponding third circuit being closed and controlling the switch circuits which are not coupled to the corresponding third circuit being opened; sensing electrical signals via the second circuits, respectively, to get an electrical signal value array; composing an electrical signal value image based on all the electrical signal value arrays according to positions of the third circuits corresponding to the electrical signal value arrays; and calculating one or more positions of transmitters according to the electrical signal value image.

Preferably, wherein the processor is further configured for reporting the one or more positions of transmitters to a host.

According to an embodiment of the present application, a touch sensitive processing apparatus is provided. Applicable to the touch panel, the touch sensitive processing apparatus, comprising: an interconnection network for connecting the first electrodes, the second circuits, and the third circuits, respectively; a driving circuit for connecting to the interconnection network; a sensing circuit for connecting to the interconnection network; and a processor, configured to execute instructions stored in a non-volatile memory for: controlling potentials of all the first electrodes floating; providing first driving signals to all the third circuits so as that all the switch circuits being opened; providing second driving signals to all the third circuits and sensing variations of the second driving signals on each of the third circuits to get a first axis sensing array; providing the second driving signals to all the second circuits and sensing variations of the second driving signals on each of the second circuits to get a second axis sensing array; calculating one or more first axis coordinate values corresponding to one or more external conductive objects according to the first axis sensing array; and calculating one or more second axis coordinate values corresponding to the one or more external conductive objects according to the second axis sensing array.

According to an embodiment of the present application, a touch sensitive processing apparatus is provided. Applicable to the touch panel, the touch sensitive processing apparatus, comprising: an interconnection network for connecting the first electrodes, the second circuits, and the third circuits, respectively; a driving circuit for connecting to the interconnection network; a sensing circuit for connecting to the interconnection network; and a processor, configured to execute instructions stored in a non-volatile memory for: controlling potentials of all the first electrodes floating; providing first driving signals to all the third circuits so as that all the switch circuits being closed; providing second driving signals to all the third circuits and sensing variations of the second driving signals on each of the third circuits to get a first axis sensing array; providing the second driving signals to all the second circuits and sensing variations of the second driving signals on each of the second circuits to get a second axis sensing array; calculating one or more first axis coordinate values corresponding to one or more external conductive objects according to the first axis sensing array; and calculating one or more second axis coordinate values corresponding to the one or more external conductive objects according to the second axis sensing array.

According to an embodiment of the present application, a touch sensitive processing apparatus is provided. Applicable to the touch panel, the touch sensitive processing apparatus, comprising: an interconnection network for connecting the first electrodes, the second circuits, and the third circuits, respectively; a driving circuit for connecting to the interconnection network; a sensing circuit for connecting to the interconnection network; and a processor, configured to execute instructions stored in a non-volatile memory for: controlling potentials of all the first electrodes floating; providing first driving signals to all the third circuits so as that all the switch circuits being opened; providing second driving signals to all the third circuits and sensing variations of the second driving signals on each of the third circuits to get a first axis sensing array; providing third driving signals to all the second circuits and sensing variations of the third driving signals on each of the second circuits to get a second axis sensing array; calculating one or more first axis coordinate values corresponding to one or more external conductive objects according to the first axis sensing array; and calculating one or more second axis coordinate values corresponding to the one or more external conductive objects according to the second axis sensing array.

According to an embodiment of the present application, a touch sensitive processing apparatus is provided. Applicable to the touch panel, the touch sensitive processing apparatus, comprising: an interconnection network for connecting the first electrodes, the second circuits, and the third circuits, respectively; a driving circuit for connecting to the interconnection network; a sensing circuit for connecting to the interconnection network; and a processor, configured to execute instructions stored in a non-volatile memory for: controlling potentials of all the first electrodes floating; providing first driving signals to all the third circuits so as that all the switch circuits being closed; providing second driving signals to all the third circuits and sensing variations of the second driving signals on each of the third circuits to get a first axis sensing array; providing third driving signals to all the second circuits and sensing variations of the third driving signals on each of the second circuits to get a second axis sensing array; calculating one or more first axis coordinate values corresponding to one or more external conductive objects according to the first axis sensing array; and calculating one or more second axis coordinate values corresponding to the one or more external conductive objects according to the second axis sensing array.

Preferably, the processor is further configured for reporting the one or more first axis coordinate values and one or more second axis coordinate values to a host.

According to an embodiment of the present application, a touch system is provided. The touch system comprises aforementioned touch panel, touch sensitive processing apparatus, and host.

One object of the present application is to provide a structure of touch panel. Based on the provided structure, it may use mutual-capacitance sensing principles to sense and to calculate points of pressure where external objects press on the touch panel and their pressure values or points of approaching or touching by the external objects and their possible pressure values. It may also use self-capacitance sensing principles to sense and to calculate points of approaching or touching by the external objects. Moreover, while the mutual-capacitance sensing is performed or in a time-sharing manner, it may detect positions of transmitters, such as active styli, where the transmitters sit on the touch panel.

Objects of the present application are to provide various touch sensitive processing methods applicable to the structure of touch panel. They may use mutual-capacitance sensing principles to sense and to calculate points of pressure where external objects press on the touch panel and their pressure values or points of approaching or touching by the external objects and their possible pressure values. It may also use self-capacitance sensing principles to sense and to calculate points of approaching or touching by the external objects.

One object of the present application is to detect positions of transmitters, such as active styli, where the transmitters sit on the touch panel, while the mutual-capacitance sensing is performed or in a time-sharing manner.

One of advantages provided by the present application is to use the switch circuits controlled by the third circuits to prevent or to limit electric charges of the driving signals nearby the points of pressure flow through irrelevant second circuits via the third circuits and the corresponding second circuit so as error in the sensing of induced driving signals can be reduced. Hence, points of pressure and points of approaching or touching can be calculated more precisely or more accurately based on better sensing results.

Another one of advantages provided by the present application is to provide a new structure of touch panel for measuring one or any combination of following information: 1) central points of pressure where external object press on the touch panel and their pressure values; 2) central points of approaching or touching where external object approaches or touches the touch panel; 3) central positions of transmitters where styli or board erasers, which actively transmit electrical signals, hover or touch the touch panel;

and in case the entire or a large part of the touch panel is covered by conductive liquid, measuring the aforementioned 1) and 2) information.

BRIEF DESCRIPTION OF THE DRAWINGS

The advantages and spirit related to the present invention can be further understood via the following detailed description and drawings.

DETAILED DESCRIPTION OF THE PREFERRED EMBODIMENT

Figure 1A:
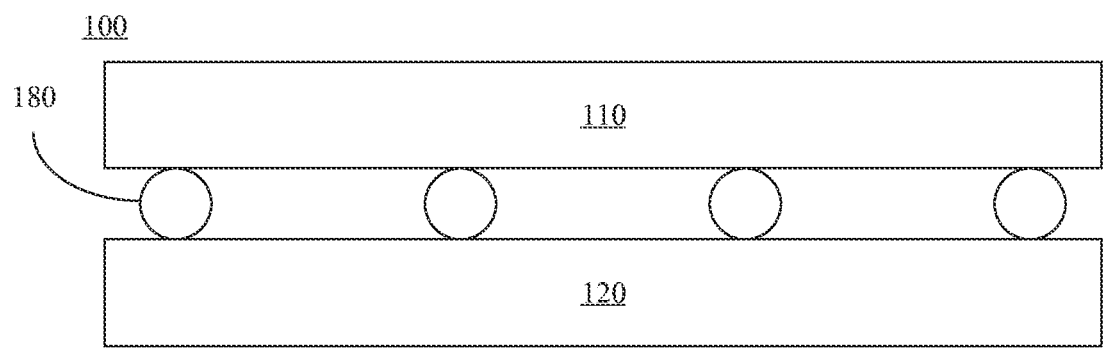
FIGS. 1A through 1C show sectional diagrams of touch panel structures 100 in accordance with various embodiments of the present application, respectively.

Some embodiments of the present application are described in details below. However, in addition to the description given below, the present invention can be applicable to other embodiments, and the scope of the present invention is not limited by such rather by the scope of the claims. Moreover, for better understanding and clarity of the description, some components in the drawings may not necessary be drawn to scale, in which some may be exaggerated related to others, and irrelevant. If no relation of two steps is described, their execution order is not bound by the sequence as shown in the flowchart diagram.

The terms "first", "second", "third" and etc. recited in the specification, claims and drawings of the instant application are used to distinguish similar objects, not to specify a sequence or an order. It may be understood that the objects being described in that manner can be interchangeable under appropriate circumstances. In the specification of the instant application, the meaning of "a plurality" explicitly refers to two or more, unless they are specifically defined. In addition, the terms "comprise" and "include" and any other equivalents of these terms are intended to be non-exclusively. Some blocks as shown in the drawings may be functional entities, which may not directly correspond to physical or logical entities. The function entities may be implemented in a form of software, in one or more hardware circuits or integrated circuits, or in different networks, different processor devices or different micro controllers.

In the description of the instant application, it is noted that the terms "installed", "coupled" and "connecting" should be interpreted in the broadest reasonable way, unless they are otherwise defined or limited explicitly. For examples, two may be fixed connected, attachable connected, or jointly connected; mechanically connected, electrically coupled, or communicably connected; directly connected or indirectly connected via intermediates; or interconnected inside the two components or interactively correspondence of the two components. For persons having ordinary skill in the art, he/she can understand what the terms mean substantially in the specification based on the circumstances.

In order to make the purpose, features and advantages of the present application more obvious and easier to understand, below in conjunction with the figures and the specific embodiments are described in further detail to the present application.

Figure 1B:
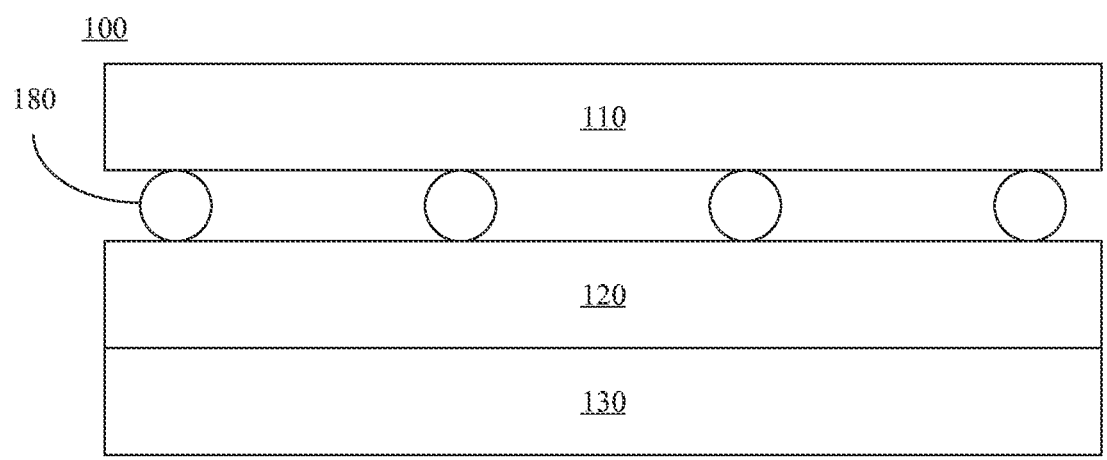
Figure 1C:
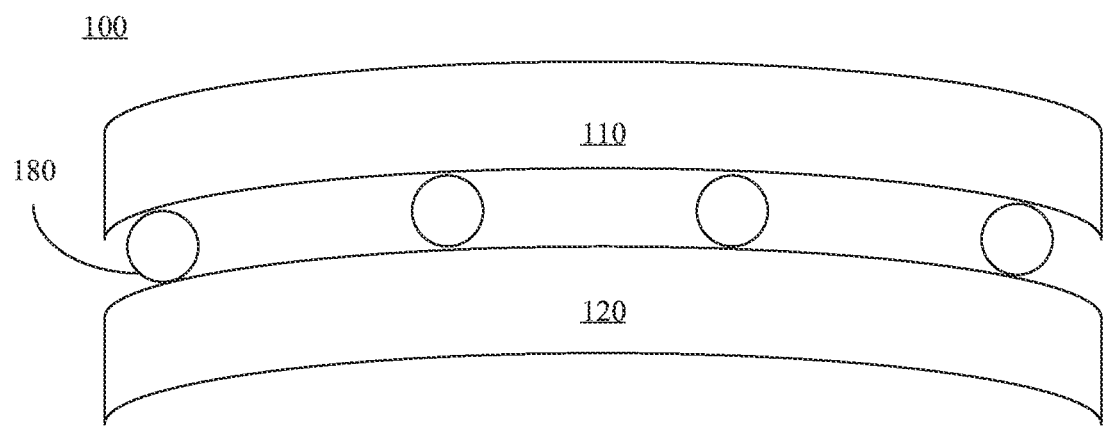

Please refer to FIGS. 1A through 1C, which show sectional diagrams of touch panel structures 100 in accordance with various embodiments of the present application, respectively. Pease refer to FIG. 2, which illustrates a top view of a touch panel structure 100 in accordance with an embodiment of the present application. As shown in FIG. 1A, the touch panel structure 100 comprises three layers. Sequentially, they are a first electrode layer 110, an elastic dielectric layer 180, and a second electrode layer 120. The elastic dielectric layer 180 may comprises multiple elastic objects evenly distributed for being sandwiched between the first electrode layer 110 and the second electrode layer 120. The elastic object may be cylindrical, cuboid, or ellipsoid and etc. When the touch panel structure 100 is pressed, the elastic objects of the elastic dielectric layer 180 would be compressed, so do spaces between the elastic objects, such that the electric capacitances in between the electrodes of the first electrode layer 110 and the electrodes of the second electrode layer 120 are changed consequently. As a result, based on the variation of sensed electric capacitances, the pressure value can be derived accordingly.

Figure 2:
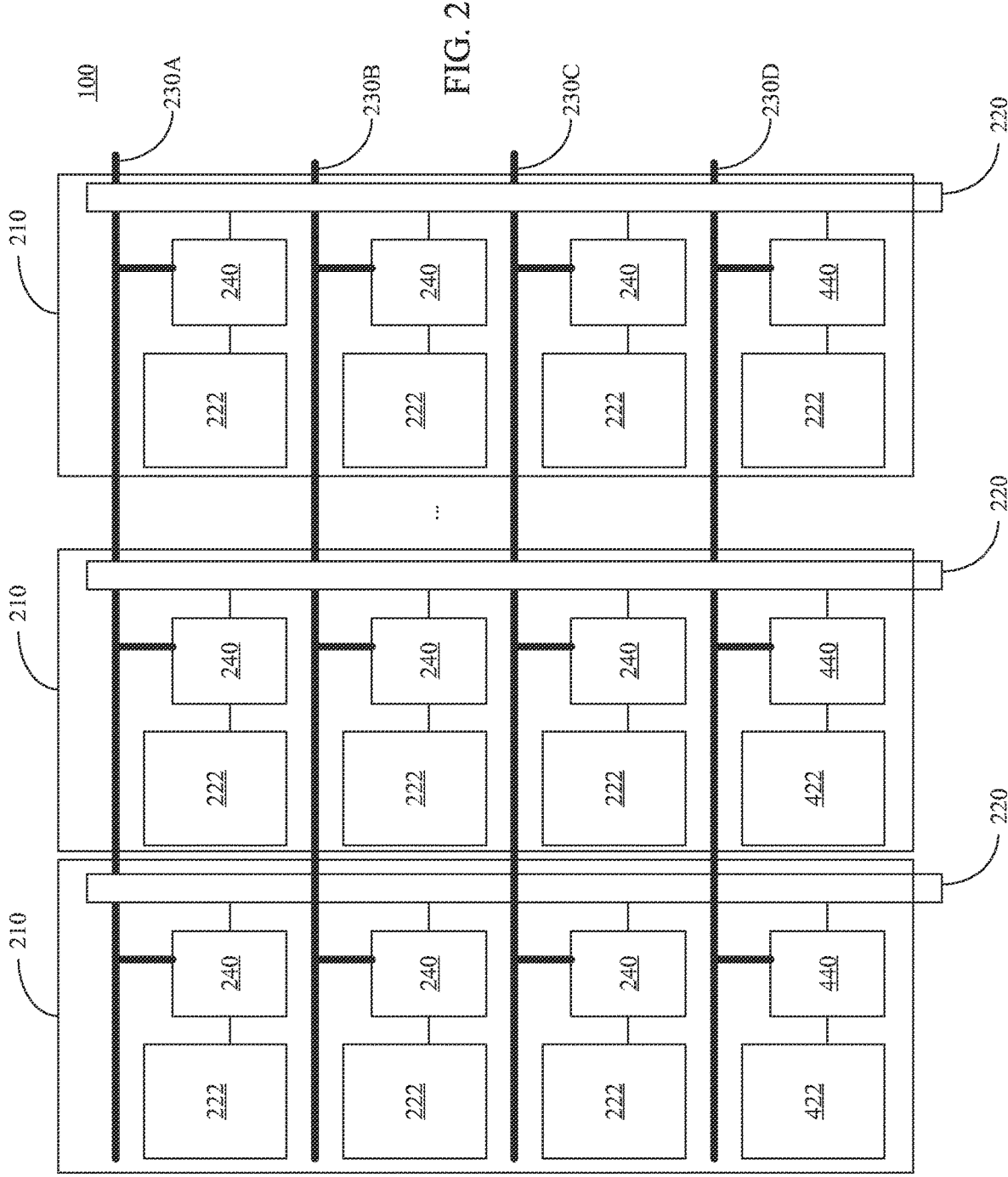
FIG. 2 illustrates a top view of a touch panel structure 100 in accordance with an embodiment of the present application.

The first electrode layer 110 may comprise one or more first electrodes. As shown in FIG. 2, the first electrode layer 110 comprises multiple first electrodes in parallel to a vertical axis. The second electrode layer 120 may comprise multiple second circuits 220 in parallel to the vertical axis, multiple third circuits 230 in parallel to a horizontal axis, multiple second electrodes 222, and multiple switch circuits 240. In other words, the first electrodes 210 and the second circuits 220 are in parallel to the same axis. Each of the first electrodes 210 is corresponding to one of the second circuits 220 and intersects with all of the second electrodes 220 which are connected to its corresponding second circuit 220.

The first electrode layer 110 may be a slim film or an elastic substrate so as that the first electrodes 210 are imposed on or inside the first electrode layer 110 in order to prevent contacting the second electrodes 222 when being pressed. The second electrode layer 120 may be a slim film, a glass sheet, a printed circuit board and etc. The present application does not limit the material made of the first electrode layer 110 and the second electrode layer 120 if the circuit components can be arranged as described.

In one embodiment, the second electrodes 222 and the second circuits 220 may be arranged on a first surface of the second electrode layer 120, the third circuits 230 and the switch circuits 240 may be arranged on a second interface. The second electrode layer 120 may comprises conductive vias connecting the second electrodes 222 and the switch circuits 240. The first surface is opposite to the second surface. In an alternative embodiment, the second circuits 220, the third circuits 230, the second electrodes, and the switch circuits 240 may be arranged inside a multi-layered printed circuit board, respectively.

Please refer to FIG. 1B, the touch panel structure 100 may further comprise a third electrode layer 130 underneath the second electrode layer 120. In this embodiment, the second electrodes 222 and the second circuits 220 may be arranged in the second electrode layer 120, the third circuits 230 and the switch circuits 230 may be arranged in the third electrode layer 130. There are interconnection circuits between the second electrode layer 120 and the third electrode layer 130.

Please refer to FIG. 1C, if the material made of the first electrode layer 110 and the second electrode layer 120 are elastic, the touch panel structure 110 can be bent or curved. For example, the touch panel structure 100 may be configured on a curve surface with a fixed curvature.

The third circuit 230 may be used to simultaneously control multiple switch circuits 240 which are arranged along a first axis. When the switch circuit 240 is closed, the second electrode 222 is coupled to its corresponding second circuit 220. When the switch circuit 240 is opened, the second electrode 222 is not coupled to its corresponding second circuit 220. The switch circuit 240 may include at least one transistor component, e.g., a field effect transistor.

The first electrodes 210 and the third circuits 230 connect to a driving circuit module of a touch sensitive processing apparatus, respectively. The second circuits 220 connect to a sensing circuit module of the touch sensitive processing apparatus, respectively. If it is desired to sense pressure on an area around a third circuit 230, it may control the multiple circuit switches 240 corresponding to the third circuit 230 so as the second electrodes 222 corresponding to the third circuit 230 connect to the second circuits 220 via their corresponding switch circuits 240. Meanwhile, driving signals are provided to all of the first electrodes 210. Since there are capacitances in between the first electrodes 210 and the second electrodes 222, the second electrodes 222 can transmit the induced driving signals to the sensing circuit module via the second circuits 220. When the sensing circuit module detects that there are variations of the sensed driving signals, it implies that there is an object pressed to the position of the second electrodes 222 or nearby.

After finishing pressure sensing corresponding to one of the third circuits 230, a pressure value array can be derived. A number of elements of the pressure value array is the number of the second circuits 220. Next, another one of the third circuits 230 can be selected to conduct another round of pressure sensing for deriving another pressure value array. When pressure sensing of all of the third circuits 230 are all done, it represents that the pressure sensing is performed to the entirety of the whole pressure sensitive array structure. Next, a pressure value image may be formed according to the pressure value arrays corresponding to their positions of corresponding third circuits 230. The dimension of a vertical axis of the pressure value image is the number of the third circuits 230. The dimension of a horizontal axis of the pressure value image is the number of the first electrodes 210 or the number of the second circuits 220.

The pressure value image can be compared with a baseline image which is sensed without being pressed to find a difference image. The baseline image is a sensed pressure value image when the touch panel is not being pressed. Next, according to the difference image, one or more areas of pressure may be found. As a result, a gravity center or a center of each of the areas of pressure can be found as a point of pressure corresponding to the area of pressure. At final, according to the sensed pressure values around the point of pressure, a weighted average value can be calculated according to the distances between the point of pressure and the sensing points, respectively, as a pressure value of the point of pressure. Person having ordinary skill in the art can understand that aforementioned method for calculating the point of pressure and its pressure value according to the pressure value image is well-known. Existing algorithms may be applied here.

Either the pressure value image or the difference image is a full-sized image which is gathered by all of the second circuits 220. The image is of maximum resolution. In other words, the driving signals have to be supplied to all of the first electrodes 210. When it does not need an image which is of maximum resolution, the driving signals may be provided to a half or less of the first electrodes 210. For the sake of convenience, each of the first electrodes 210, the second circuits 222, and the third circuits 230 can be numbered in order.

In an example, the driving signals may be provided to first electrodes 210 with odd numbers, and the second circuits 220 with odd numbers are used to sense. As a result, a pressure value array corresponding to odd numbers is derived. The number of elements of a pressure value array corresponding to odd numbers is a half of the number of elements of a normal pressure value array.

Similarly, the driving signals may be provided to first electrodes 210 with even numbers, and the second circuits 220 with even numbers are used to sense. As a result, a pressure value array corresponding to even numbers is derived. The number of elements of a pressure value array corresponding to even numbers is a half of the number of elements of a normal pressure value array.

The pressure value arrays corresponding to odd numbers can be used to form a pressure value image corresponding to odd numbers having a half number of elements. Or the pressure value arrays corresponding to even numbers can be used to form a pressure value image corresponding to even numbers having a half number of elements. Based on the pressure value images having a half number of elements, points of pressure with half resolution can be derived.

In an example, the driving signals may be provided to the (3i+x)-th first electrodes 210, where i is a natural number and x is an integer between 0 to 2. And the (3i+x)-th second circuits 220 are used to sense. As a result, the pressure value array having one third size is derived. The number of elements of the pressure array is one third of the number of elements of normal pressure value array.

These pressure value arrays with one-third elements can form a pressure value image with one-third elements. According to the pressure value image with one-third elements, points of pressure with one-third resolution can be derived.

In an alternative embodiment, a full-sized pressure value image can be obtained by implementing a pipeline. First at all, it may gather a first pressure value image corresponding to odd numbers in a first round of sensing. A second pressure value image corresponding to even numbers is gathered in a second round of sensing. And a full-sized pressure value image is formed by composing the first pressure value image and the second pressure value image in interlace. Points of pressure and their corresponding pressure values can be derived according to the full-sized complete pressure value image.

In a third round of sensing, a third pressure value image corresponding to odd numbers can be gathered. And another full-sized pressure value image is formed by composing the second pressure value image and the third pressure value image in interlace. Points of pressure and their corresponding pressure values can be derived according to the new full-sized pressure value image. Following this method, except for the first sensing round which obtains a lower resolution result, a full-sized pressure value image can be obtained after each round of lower resolution of sensing and points of pressure and their corresponding pressure values can be derived further.

The previous mentioned method is to obtain a full-sized pressure value image according to multiple lower resolution pressure value images and to obtain points of pressure and their corresponding pressure values. Next, the present application intends to disclose obtaining approaching or touching points according to a full-sized approaching or touching value image, which is based on multiple lower resolution approaching or touching value images obtained at the same time of obtaining multiple lower resolution pressure value images.

At the moment that the driving signals are provided to the first electrodes 210 with odd numbers, it makes potentials of the first electrodes with even numbers floating. As a result, electric field lines corresponding to the driving signals would depart from the first electrodes with odd numbers, pass through space above the touch panel, and arrive the second electrodes 222 with even numbers via the adjacent first electrodes 210 with even numbers. When an external object appears in the space above the touch panel, the electric field lines corresponding to the driving signals would be interfered so as the potentials of the second circuits 220 with even numbers are varied accordingly. Therefore, an approaching or touching value image corresponding to even numbers can be derived. In a similar manner, points of approaching or touching with lower resolution and pressure values corresponding to the approaching or touching points can be derived in a similar way.

Comparably, at the moment that the driving signals are provided to the first electrodes 210 with even numbers, it makes potentials of the first electrodes with odd numbers floating. As a result, electric field lines corresponding to the driving signals would depart from the first electrodes with even numbers, pass through space above the touch panel, and arrive the second electrodes 222 with odd numbers via the adjacent first electrodes 210 with odd numbers. When an external object is placed the space above the touch panel, the electric field lines corresponding to the driving signals would be interfered so as the potentials of the second circuits 220 with odd numbers are varied accordingly. Therefore, an approaching or touching value image corresponding to odd numbers can be derived. In a similar manner, points of approaching or touching with lower resolution and pressure values corresponding to the approaching or touching points can be derived in a similar way.

In an alternative embodiment, full-sized pressure value images and approaching or touching value images can be gathered by implementing a pipeline. First at all, during a first sensing round, a first pressure value image corresponding to odd numbers and a first approaching or touching value image corresponding to even numbers can be gathered. During a second sensing round, a second pressure value image corresponding to even numbers and a second approaching or touching value image corresponding to odd numbers can be gathered. A full-sized pressure value image can be formed by composing the first and the second pressure value images in interlace. According to the full-sized pressure value image, points of pressure and their corresponding pressure value can be obtained. A full-sized approaching or touching value image can be formed by composing the first and the second approaching or touching value images in interlace. According to the full-sized approaching or touching value image, points of approaching or touching and their corresponding pressure values can be obtained.

During a third sensing round, a third pressure value image corresponding to odd numbers and a third approaching or touching value image corresponding to even numbers can be gathered. Another full-sized pressure value image can be formed by composing the second and the third pressure value images in interlace. Another full-sized approaching or touching value image can be formed by composing the second and the third approaching or touching value images in interlace. According to the new full-sized pressure value image, points of pressure and their corresponding pressure value can be obtained. According to the new full-sized approaching or touching value image, points of approaching or touching and their corresponding pressure values can be obtained. Following this method, except for the first sensing round which obtains a lower resolution result, a full-sized pressure value image and a full-sized approaching or touching value image can be obtained after each round of lower resolution of sensing and points of pressure and their corresponding pressure values as well as points of approaching or touching and their corresponding pressure values can be derived further.

In one embodiment, it does not need to simultaneously obtain a pressure value image and an approaching or touching value image. It may be interleaved to obtain a pressure value image and an approaching or touching value image.

And in a similar way, one of full-sized pressure value images and approaching or touching value images can be composed in each round of the pipeline.

Except for detecting passive external object, when it is desired to detect active stylus or active board eraser which emits electrical signals, the electrical signals are required to comprises signals with a frequency which is different from the frequency of the driving signals. For example, in case the driving signals include signals with a first frequency, the electrical signals emitted by either the stylus or the board eraser include signals with a second frequency. The first and the second frequencies may not be mutual resonant frequencies.

The electrical signals can propagate to the second electrodes 222 via the first electrodes 210 and further arrive to the second circuits 220 via the switch circuits 240. At the mean time when the second circuits 220 are used to sense the driving signals with the first frequency to obtain a pressure value image and an approaching or touching value image with lower resolution, the second circuits 220 may be further used to sense the electrical signals with the second frequency. Because each of the second circuits 220 can be used to sense signals with the first and the second frequencies simultaneously, the sensed electrical values corresponding to the second frequency with respect to each of the second circuits 220 can form a non-loss resolution electrical signal value array. A full-sized electrical signal value image can be formed according to the multiple electrical signal value arrays. Based on the full-sized electrical signal value image, a point of approaching or touching corresponding to the active stylus can be derived accordingly.

In case it is desired to detect multiple active styli, it may require that the styli actively emit electrical signals with different frequencies, respectively. Each of the second circuits 220 can be used to sense signals with N frequencies simultaneously, where N is a natural number. The sensed electrical signal values corresponding to the (N−1) frequencies emitted from the styli from each of the second circuits 220 can form (N−1) no-loss resolution electrical signal value arrays, respectively. (N−1) full-sized electrical signal value images can be formed based on multiple electrical signal value arrays. And based on the (N−1) full-sized electrical signal value images, (N−1) approaching or touching points corresponding to the (N−1) styli can be calculated.

Even in case that there are M active styli emitting signals with the same second frequency, since the switch circuits 240 are controlled by the third circuits 230, the sensing can be performed per each of the third circuits 230. Hence, M points of approaching or touching corresponding to M styli still can be found in the electrical signal value image, where M is a positive integer which is larger than 1.

When a part of the touch panel is covered by conductive liquid, it may adopt another sensing method to detect external objects. However, the present application does not limit the applicable scenarios to use this sensing method. It may control potentials of all the first electrodes 210 floating and control all the switch circuits 240 opened, then perform sensing on each of the third circuits 230 and each of the second circuits 220, respectively. Sensing results corresponding to each of the third circuits 230 can form an approaching or touching value array corresponding to the vertical axis. Sensing results corresponding to each of the second circuits 220 can form an approaching or touching value array corresponding to the horizontal axis. Frequency of the signals emitted from the third circuits 230 does not affect the openness state of the switch circuits 240.

When external conductive objects are hovering or approaching some of the third circuits 230 and some of the second circuits 220, the potentials of these third circuits 230 and these second circuits 220 would be influenced. Hence, the sensed approaching or touching values would be varied accordingly. If there is only one external conductive object hovering or approaching, a vertical position can be calculated according to the approaching or touching value array corresponding to the vertical axis, and a horizontal position can be calculated according to the approaching or touching value array corresponding to the horizontal axis. These two positions of the vertical axis and the horizontal axis are corresponding to a point where the external conductive object projects to the touch panel. If there are two external objects hovering or approaching, one or two vertical positions can be calculated according to the approaching or touching value array corresponding to the vertical axis, and one or two horizontal positions can be calculated according to the approaching or touching value array corresponding to the horizontal axis. These two positions of the vertical axis and the horizontal axis, respectively, are corresponding to four possible points where the two external conductive object projects to the touch panel. These four possible points can form a rectangle. One of the two pairs of diagonal vertices of the rectangle may be the true points where the two external conductive objects project to the touch panel.

In other words, by implementing the sensing method, a single point where one external conductive object projects to the touch panel or a rectangle where two external conductive objects project to the touch panel can be obtained. Either shape or size variation of the rectangle reflects distance variation of the two external conductive objects, which may be used as inputs of gestures, such as zoom and pinch gestures. Moreover, when one of the vertices of the rectangle can be correlated to previous point of projection, it can be determined that its diagonal vertex is a point of projection corresponding to newly appeared external conductive object. Thus, two true points where the two external conductive objects project to the touch panel can be firmly determined. Or alternatively, the true points of projection can be determined by comparing with the approaching or touching value image or with points of approaching or touching.

Figure 3:
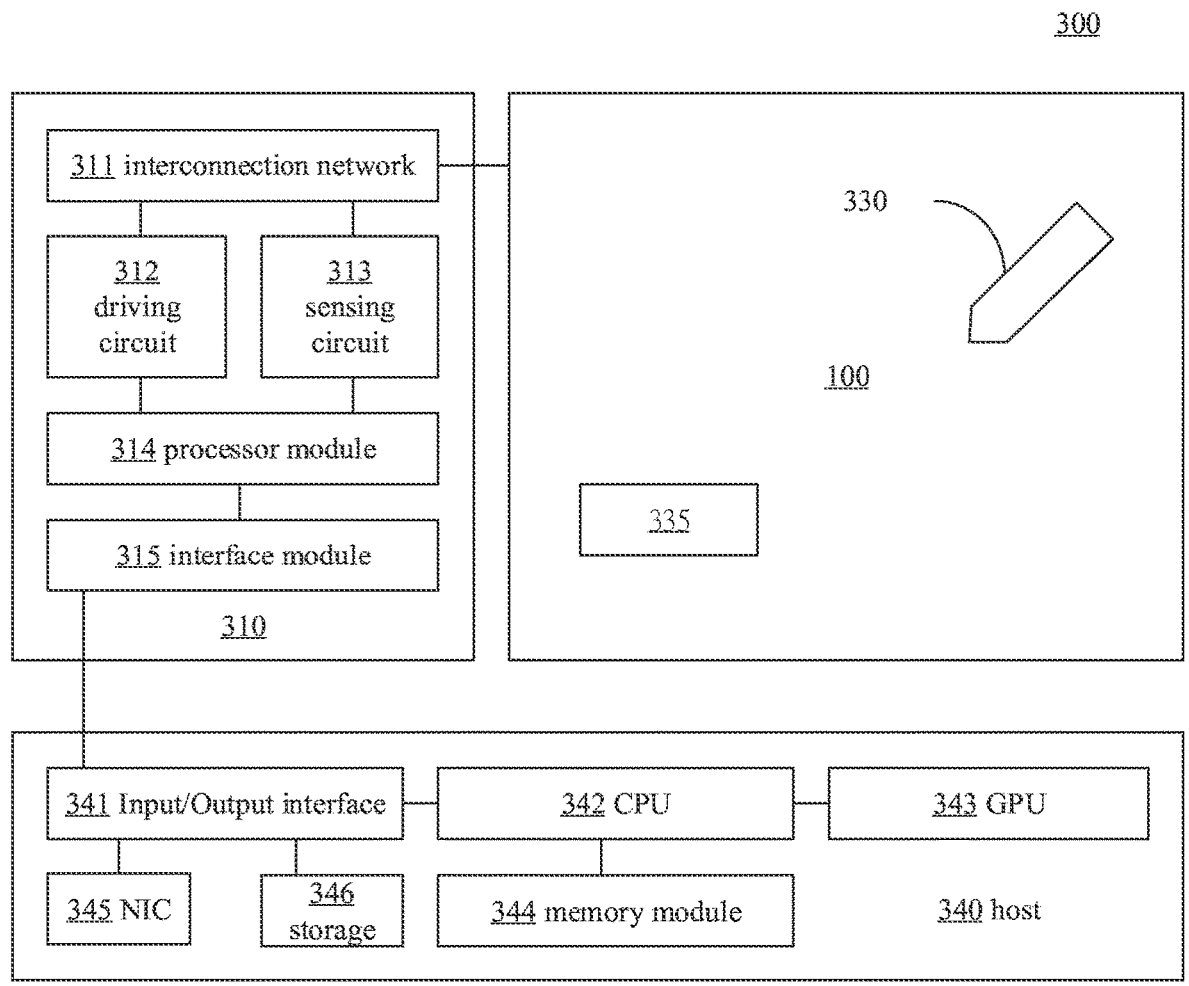
FIG. 3 depicts a block diagram of a touch system 300 in accordance with an embodiment of the present application.

Please refer to FIG. 3, which depicts a block diagram of a touch system 300 in accordance with an embodiment of the present application. The touch system 300 may be a common desktop, laptop, tablet personal computer, industrial control computer, smartphone or any other computer system fulfilling touch sensitive functions.

The touch system 300 may comprise a touch sensitive processing apparatus 310, a touch panel or screen 100 which connects to the touch sensitive processing apparatus 310, and a host 340 which connects to the touch sensitive processing apparatus 310. The touch system 300 may further comprise one or more styli 330 and/or one or more touch board erasers 335. Hereinafter, the touch panel and screen 100 may be collectively referred as the touch panel 100. However, when in an embodiment capable of display function, a person having ordinary skill in the art can understand that the touch panel recited in the application is referred to a touch screen.

The touch sensitive processing apparatus 310 may comprise following hardware circuit modules: an interconnection network module 311, a driving circuit module 312, a sensing circuit module 313, a processor module 314, and an interface module 315. The touch sensitive processing apparatus 310 may be implemented in a single chip of integrated circuits, which may encapsulate one or more dies. The touch sensitive processing apparatus 310 may be implemented by multiple chips of integrated circuits and a circuit board connecting these chips. The touch sensitive processing apparatus 310 may be implemented in the same chip which comprise the host 340. In other words, the application does not limit how the touch sensitive processing apparatus 310 implements.

The interconnection network module 311 is configured to connect the first electrodes 210, the second circuits 220, and the third circuits 230 of the touch panel 100, respectively. The interconnection network module 311 may receive control commands of the processor module 314 for connecting the driving circuit module 312 with any one or more circuits or electrodes, for connecting the sensing circuit module 313 with any one or more circuits or electrodes, too. The interconnection network module 311 may comprise a combination of one or more multiplexers to fulfill the mentioned functions.

The driving circuit module 312 may comprise clock generator, frequency divider, frequency multiplier, phase lock loop, power amplifier, DC-DC voltage converter, regulator and/or filter, which is configured to provide driving signal to any one or more touch electrodes via the interconnection network module 311 according to control commands of the processor module 314. The driving signal may be modulated by kinds of analog or digital modulations for carrying some messages. The modulations include but not limit to frequency modulation (FM), phase modulation, amplitude modulation, dual sideband modulation (DSB), single sideband module (SSB-AM), vestigial sideband modulation, amplitude shift keying (ASK), phase shift keying (PSK), quadrature amplitude modulation (QAM), frequency shift keying (FSK), continuous phase modulation (CPM), code division multiple (CDMA), time division multiple access (TDMA), orthogonal frequency division multiplexing (OFDM), pulse width modulation (PWM) and etc. The driving signal may include one or more square waves, sinuous waves or any modulated waves. The driving circuit module 312 may include one or more channel. Each channel may be connected to any one or more touch electrodes via the interconnection network module 311.

The sensing circuit module 113 may comprise integrator, sampler, clock generator, frequency divider, frequency multiplier, phase lock loop, power amplifier, operational amplifier, DC-DC voltage converter, regulator and/or filter, which is configured to sense on any one or more touch electrodes via the interconnection network module 311 according to control commands of the processor module 314. When the touch signal is transmitted from one of the touch electrodes, another touch electrode may induce the touch signal. And the sensing circuit module 330 may demodulate the induced touch signal by the another touch electrode in accordance with the modulation method performed on the driving signal by the driving circuit module 312 in order to restore the messages carried by the driving signal. The sensing circuit module 313 may include one or more channels. Each channel may be connected to any one or more touch electrodes via the interconnection network module 311. At the same time, each channel may simultaneously perform sensing and demodulation.

In one embodiment, the driving circuit module 312 and the sensing circuit module 313 may include analog front-end (AFE) circuits. In another embodiment, in additional to the AFE circuits, the driving circuit module 312 and the sensing circuit module 313 may include digital back-end (DBE) circuits. If the driving circuit module 312 and the sensing circuit module 313 include only the AFE circuits, the DBE circuits may be implemented in the processor module 314.

The processor module 314 may include a digital signal processor for connecting the AFE circuits or the DBE circuits of the driving circuit module 312 and the sensing circuit module 313, respectively. The processor module 314 may include an embedded processor, non-volatile memories and volatile memories. Normal or real-time operating system (OS) and their application programs may be stored in the non-volatile memories. The OS and the application programs include multiple instructions and data. The processor (including the embedded processor and the digital signal processor) may execute the instructions for controlling other modules including the interconnection network module 311, the driving circuit module 312, the sensing circuit module 313 and the interface module 315 of the touch sensitive processing apparatus 310. For examples, the processor 314 may comprises processors widely adopted in the industry such as 8051 series, Intel i960 series, ARM Cortex-M series and etc. The present application does not limit types and numbers of processor cores included in the processor module 314.

The instructions and data may be used to implement each of steps mentioned in the present application and flows and methods constructed by the steps. Some instructions may be executed independently inside the processor module 314, for examples, arithmetic and log operation instructions. Other instructions may be used to control other circuits of the touch sensitive processing apparatus 310. These instructions may include input/output interfaces of the processor module 314 to control other circuits. Other circuits may provide information via the input/output interface of the processor module 314 to the OS and/or application programs executed by the processor module 314. Persons having ordinary skill in the art should have common knowledge of computer organization and architecture which enabling them to understand that the flows and methods provided by the present application can be realized by the circuits and the instructions.

The interface module 315 may include kinds of serial or parallel bus, such as universal serial bus (USB), I2C, peripheral component interconnect (PCI), PCI-Express, IEEE 1394 and other industrial standard input/output interface. The touch sensitive processing apparatus 310 connects to the host 340 via the interface module 315.

The touch system 300 may comprise one or more styli 330 and/or touch board erasers 335. The stylus 330 and touch board eraser 335 may be transmitters which emit electrical signals. The transmitters may include active transmitter which actively emits electrical signals or passive transmitters which emit electrical signals in response to external electrical signals. The stylus 330 and touch board eraser 335 may comprise one or more electrodes which is configured to receive electrical signals from the touch screen 100 synchronously or asynchronously, or to transmit electrical signals to the touch screen 100 synchronously or asynchronously. The electrical signals may be modulated according to one or more of the aforementioned modulation methods.

The stylus 330 or touch board eraser 335 may be conductor which is configured to transmit driving signals or to be grounded via user's hand or body. The stylus 330 or touch board eraser 335 may be physically or wirelessly connected to an I/O interface 341 of the host 340 or any other interfacing circuits of the I/O interface 341.

The touch sensitive processing apparatus 310 may detect one or more external objects such as fingers, palms or passive styli 330 or touch board erasers 335, or active styli 330 or touch board erasers 335 emitting electrical signals via the touch screen 100. The touch sensitive processing apparatus 110 may utilize mutual-capacitance sensing or self-capacitance sensing to detect external conductive objects. The styli 330 or touch board erasers 335 and touch sensitive processing apparatus 310 may use the aforementioned modulation and demodulation methods to transmit message via the electrical signals. The touch sensitive processing apparatus 310 may detect one or more positions where the styli 330 or touch board erasers 335 touch or approach the touch screen 100, status or sensors (pressure sensor or button) onboard the stylus 330 or touch board eraser 335, orientation angle or inclination angle of the stylus 330 or touch board eraser 335 with respect to the touch screen 100, and etc. according to the electrical signals.

The host 340 is a main apparatus for controlling the touch system 100. It may comprise an input/output interface module 341 for connecting the interface module 315, a central processing unit (CPU) module 342, a graphics processor module 343, a memory module 344 connects to the CPU module 342, a network interface module 345 and a storage module 346 connect to the input/output interface module 341.

The storage module 346 comprises non-volatile memory. Common examples are hard disks, electronic erasable rewritable read only memory (EEPROM), or flash memory. The storage module 346 may store normal operating system and application programs executable under the operating system. The network interface module 345 may comprise wired or wireless hardware network interface. The network interface module 345 may be compliant to common industrial standards such as IEEE 802.11 Wireless Local Area Network, IEEE 802.3 Local Area Network, 3G, 4G and/or 5G wireless telecommunication standards, Bluetooth wireless communication standards, and etc.

The CPU module 342 may directly or indirectly connects to the input/output interface module 341, the graphics processor module 343, the memory module 344, the network interface module 345 and the storage module 346. The CPU module 342 may comprise one or more processor or processor cores. Common processors may include Intel, AMD, VIA's x86 and x64 instruction set architecture (ISA) processors, Apple, Qualcomm, MediaTek's ARM ISA processors, or any other types of complex instruction set computer (CISC) or reduced instruction set computer (RISC) processors. The OS and application programs include multiple instructions and data corresponding to the instruction set. By executing these instructions, the CPU module 342 is able to control other circuits of the touch system 300.

The optional graphics processor (GPU) module 343 is usually configured to handle computations with respect to graphics outputs. The graphics processor module 343 may connect to the touch screen 100 for controlling outputs of the touch screen 100. In some applications, the host 340 may have the CPU module 342 execute the computations with respect to graphics outputs, without dedicated handling of the graphics processor module 343.

The host 340 may comprise components or apparatus not shown in FIG. 3, for example, audio input/output interface, keyboard input interface, mouse input interface, track-ball input interface and/or any other hardware circuits. Persons having ordinary skill in the art should have common knowledge of computer organization and architecture. They can understand the touch system 300 disclosed by the present application is exemplary. Parts regarding to the inventive feature provided by the present application should be referred to the specification and the claim.

Figure 4:
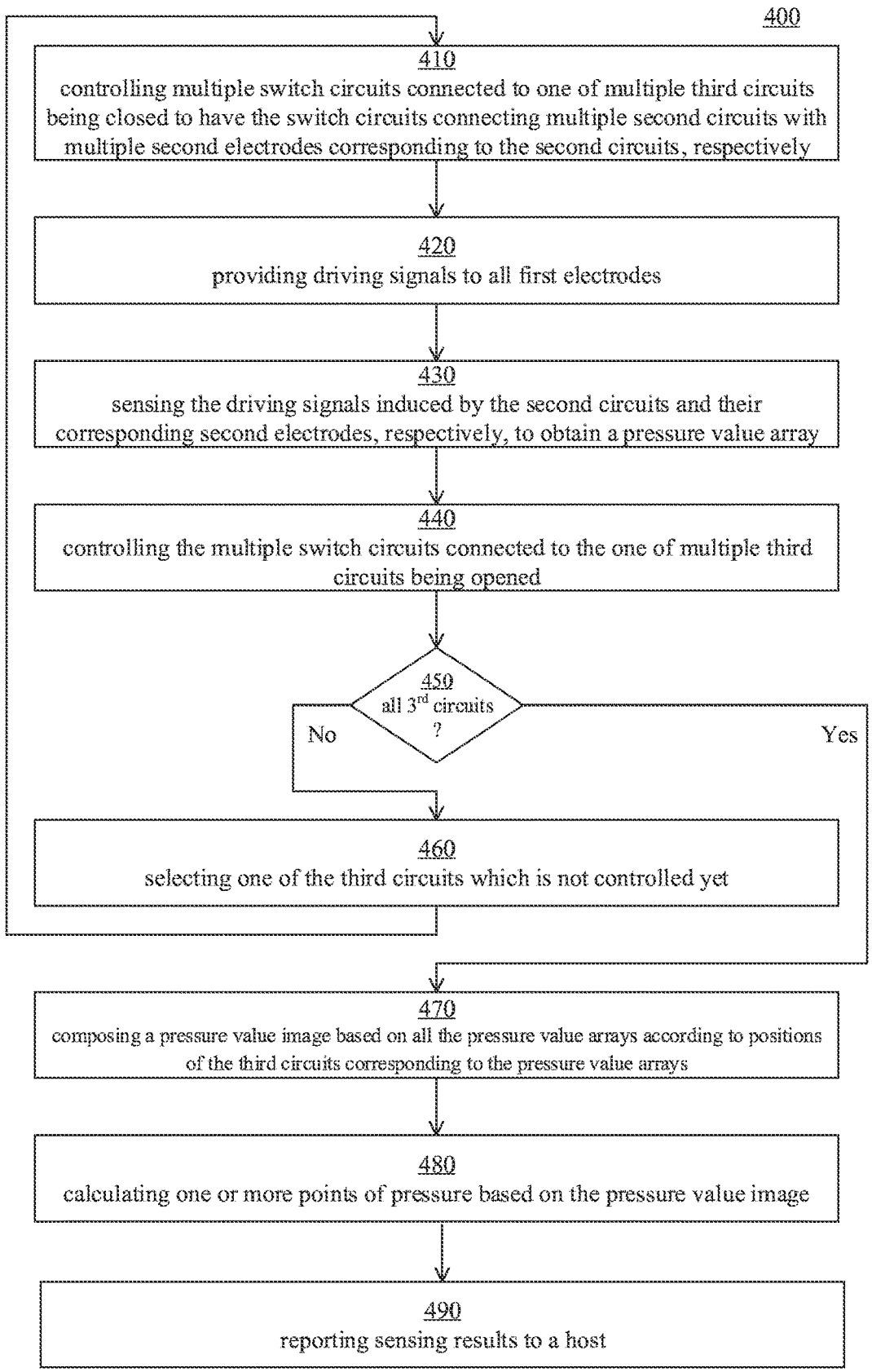
FIG. 4 depicts a flowchart diagram of a touch sensitive processing method 400 in accordance with an embodiment of the present application.

Please refer to FIG. 4, which depicts a flowchart diagram of a touch sensitive processing method 400 in accordance with an embodiment of the present application. The touch sensitive processing method 400 may be applied to the touch system as shown in FIG. 3, especially applicable to the processor module 314 of the touch sensitive processing apparatus 310. The processor module 314 may execute the instructions and data stored in non-volatile memories to realize the touch sensitive processing method 400. If there is no causal relation between any two steps, the present application does not limit the execution sequence of these two steps. The touch sensitive processing method 400 begins at step 410.

Step 410: controlling multiple switch circuits connected to one of multiple third circuits being closed to have the switch circuits connecting multiple second circuits with multiple second electrodes corresponding to the second circuits, respectively.

Step 420: providing driving signals to all first electrodes.

Step 430: sensing the driving signals induced by the second circuits and their corresponding second electrodes, respectively, to obtain a pressure value array. At least a part of the execution time periods of the step 420 and the step 430 are overlapped.

Step 440: controlling the multiple switch circuits connected to the one of multiple third circuits being opened.

Step 450: determining whether all the third circuits being controlled, i.e., whether the measuring steps are performed on all the third circuits. If the result of the determination is negative, the flow proceeds to step 460. If the result of the determination is true, the flow proceeds to step 470.

Step 460: selecting one of the third circuits which is not controlled yet. Next, the flow returns to step 410 for measuring via the second electrodes connecting to the selected one of the third circuits.

Step 470: composing a pressure value image based on all the pressure value arrays according to positions of the third circuits corresponding to the pressure value arrays.

Step 480: calculating one or more points of pressure based on the pressure value image. The step may further comprises calculating a weighted pressure value of each of the points of pressure.

Step 490: reporting sensing results to a host. The sensing results may include one or any combination of following information: the points of pressure, the pressure values of the points of pressure, and the pressure value image.

Figure 5:
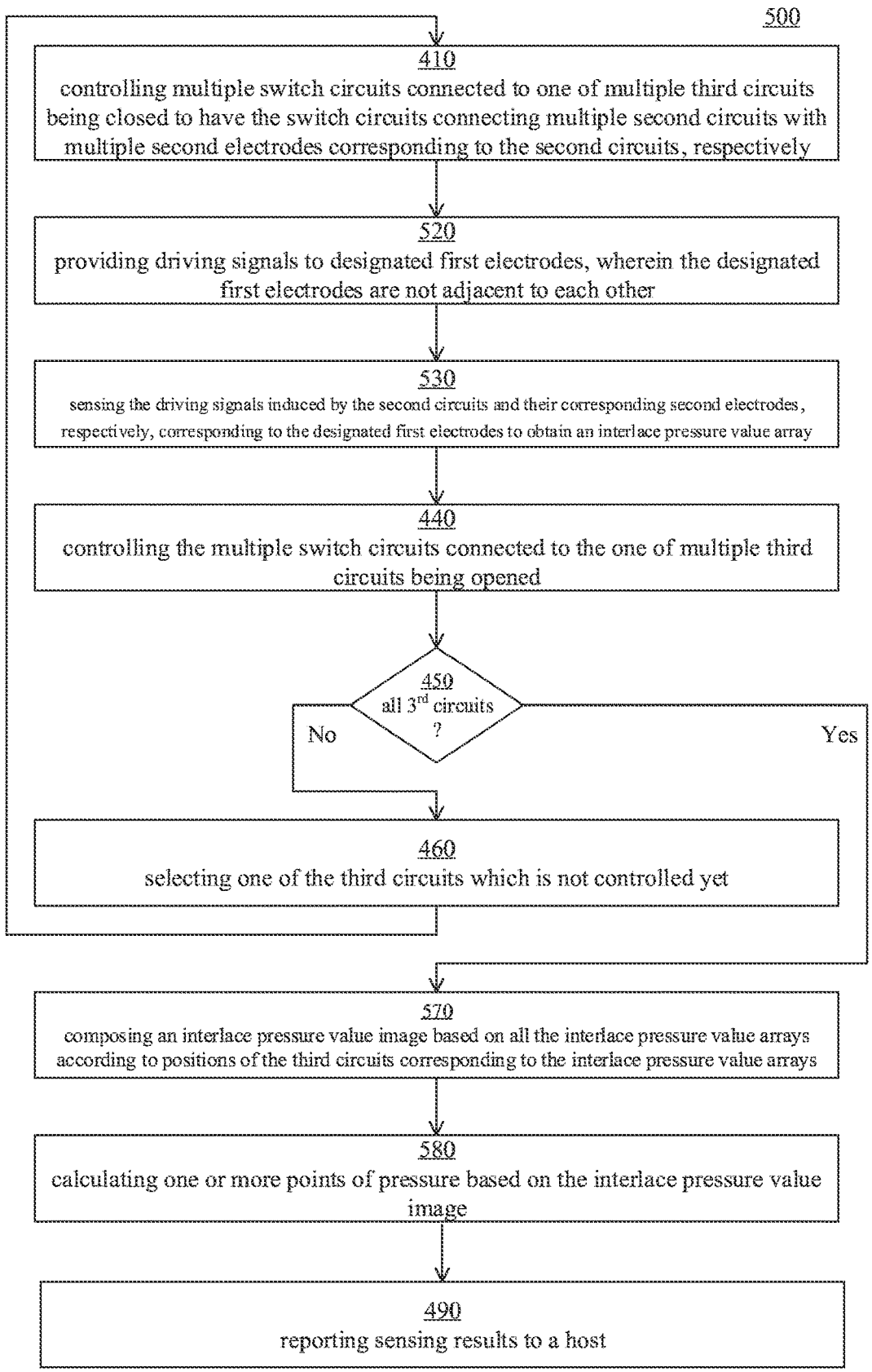
FIG. 5 depicts a flowchart diagram of a touch sensitive processing method 500 in accordance with an embodiment of the present application.

Please refer to FIG. 5, which depicts a flowchart diagram of a touch sensitive processing method 500 in accordance with an embodiment of the present application. The touch sensitive processing method 500 may be applied to the touch system 300 as shown in FIG. 3, especially applicable to the processor module 314 of the touch sensitive processing apparatus 310. The processor module 314 may execute the instructions and data stored in non-volatile memories to realize the touch sensitive processing method 500. If there is no causal relation between any two steps, the present application does not limit the execution sequence of these two steps. Comparing with the touch sensitive processing method 400, the touch sensitive processing method 500 is configured to gather an interlace pressure value image with fewer elements in order to calculate points of pressure and pressure values of the points of pressure with lower resolution. The touch sensitive processing method 500 may use some steps which are already recited in the touch sensitive processing method 400. Hence, no duplicated description is elaborated. The touch sensitive processing method 500 begins at step 410.

Step 520: providing driving signals to designated first electrodes, wherein the designated first electrodes are not adjacent to each other. For examples, the designated first electrodes are odd numbered or even numbered. Or all the (P×i+Q)th first electrodes are designated, where i, P, and Q are positive integers, 0<Q<P.

Step 530: sensing the driving signals induced by the second circuits and their corresponding second electrodes, respectively, corresponding to the designated first electrodes to obtain an interlace pressure value array. At least a part of the execution time periods of the step 520 and the step 530 are overlapped.

Step 570: composing an interlace pressure value image based on all the interlace pressure value arrays according to positions of the third circuits corresponding to the interlace pressure value arrays.

Step 580: calculating one or more points of pressure based on the interlace pressure value image. The step may further comprises calculating a weighted pressure value of each of the points of pressure.

Figure 6:
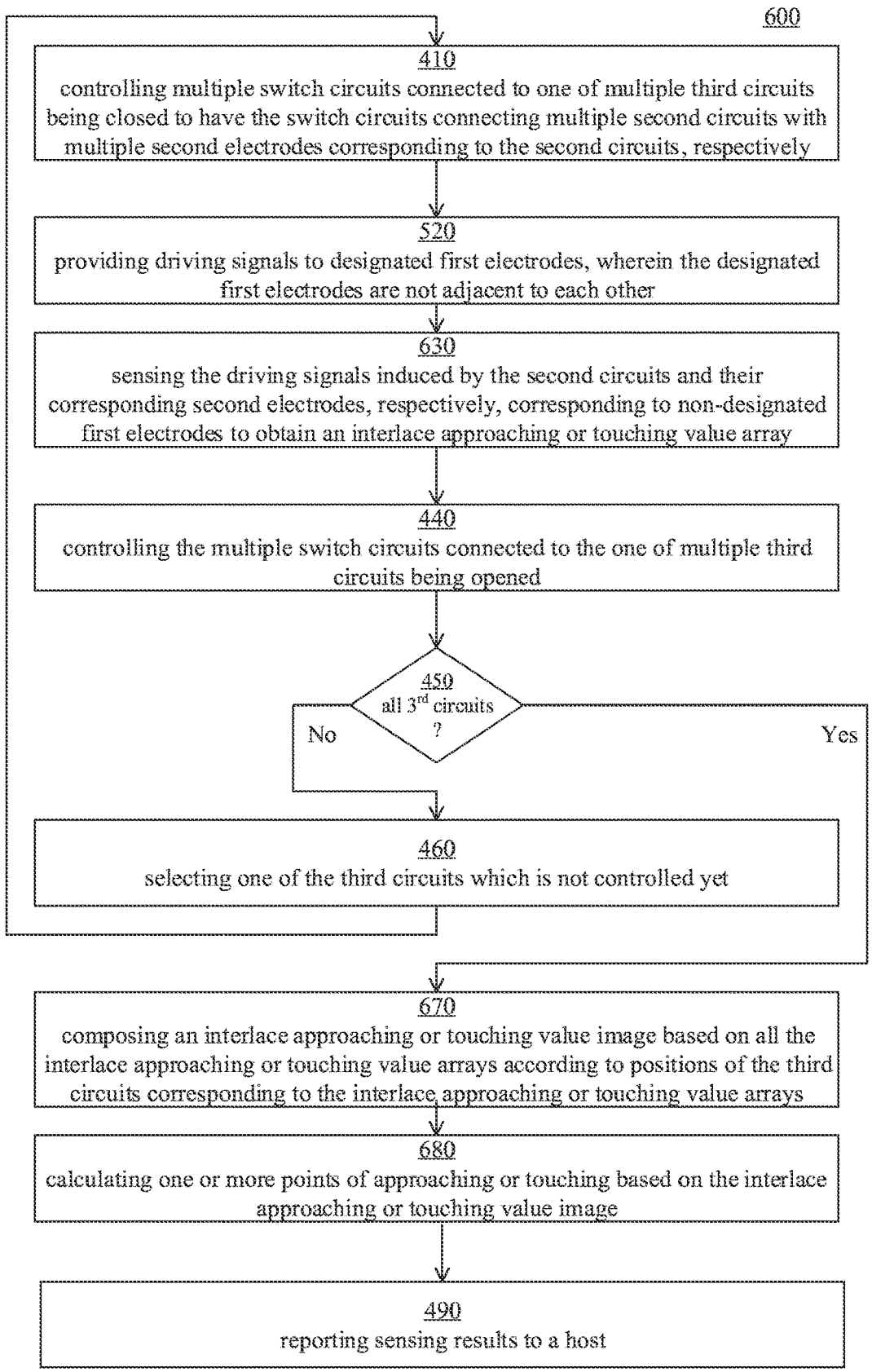
FIG. 6 depicts a flowchart diagram of a touch sensitive processing method 600 in accordance with an embodiment of the present application.

Please refer to FIG. 6, which depicts a flowchart diagram of a touch sensitive processing method 600 in accordance with an embodiment of the present application. The touch sensitive processing method 600 may be applied to the touch system as shown in FIG. 3, especially applicable to the processor module 314 of the touch sensitive processing apparatus 310. The processor module 314 may execute the instructions and data stored in non-volatile memories to realize the touch sensitive processing method 600. If there is no causal relation between any two steps, the present application does not limit the execution sequence of these two steps. Comparing with the touch sensitive processing method 500, the touch sensitive processing method 600 is configured to gather an interlace approaching or touching value image with fewer elements in order to calculate points of approaching or touching and pressure values of the points of approaching or touching with lower resolution. The touch sensitive processing method 600 may use some steps which are already recited in the touch sensitive processing methods 400 and 500. Hence, no duplicated description is elaborated. The designated first electrodes at step 520 of the touch sensitive processing method 600 may be odd numbered or even numbered. The touch sensitive processing method 600 begins at step 410.

Step 630: sensing the driving signals induced by the second circuits and their corresponding second electrodes, respectively, corresponding to non-designated first electrodes to obtain an interlace approaching or touching value array. At least a part of the execution time periods of the step 520 and the step 630 are overlapped.

Step 670: composing an interlace approaching or touching value image based on all the interlace approaching or touching value arrays according to positions of the third circuits corresponding to the interlace approaching value arrays.

Step 680: calculating one or more points of approaching or touching based on the interlace approaching or touching value image. The step may further comprises calculating a weighted pressure value of each of the points of approaching or touching.

Figure 7:
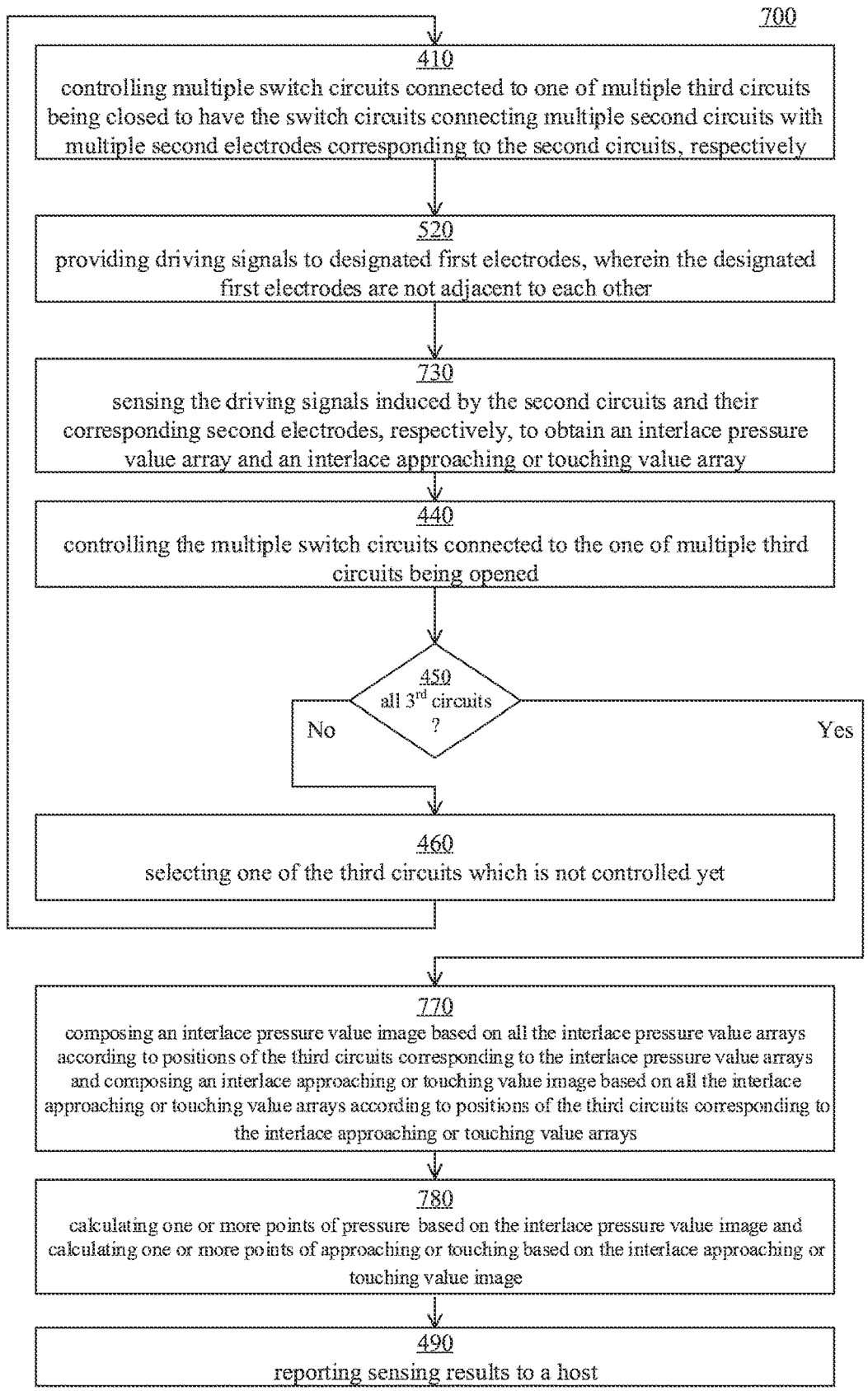
FIG. 7 depicts a flowchart diagram of a touch sensitive processing method 700 in accordance with an embodiment of the present application.

Please refer to FIG. 7, which depicts a flowchart diagram of a touch sensitive processing method 700 in accordance with an embodiment of the present application. The touch sensitive processing method 600 may be applied to the touch system 300 as shown in FIG. 3, especially applicable to the processor module 314 of the touch sensitive processing apparatus 310. The processor module 314 may execute the instructions and data stored in non-volatile memories to realize the touch sensitive processing method 700. If there is no causal relation between any two steps, the present application does not limit the execution sequence of these two steps. By reusing the touch sensitive processing methods 500 and 600, the touch sensitive processing method 700 is configured to gather an interlace approaching or touching value image and an interlace pressure value image with fewer elements in order to calculate points of approaching or touching and pressure values of the points of approaching or touching with lower resolution and to calculate points of pressure and pressure values of the points of pressure with lower resolution. The touch sensitive processing method 700 may use some steps which are already recited in the touch sensitive processing methods 400 through 600. Hence, no duplicated description is elaborated. The designated first electrodes at step 520 of the touch sensitive processing method 700 may be odd numbered or even numbered. The touch sensitive processing method 700 begins at step 410.

Step 730: sensing the driving signals induced by the second circuits and their corresponding second electrodes, respectively, to obtain an interlace pressure value array and an interlace approaching or touching value array. The interlace pressure value array is corresponding to the sensing results corresponding to the designated first electrodes. The interlace approaching or touching value array is corresponding to the sensing results corresponding to the non-designated first electrodes. At least a part of the execution time periods of the step 520 and the step 730 are overlapped.

Step 770: composing an interlace pressure value image based on all the interlace pressure value arrays according to positions of the third circuits corresponding to the interlace pressure value arrays and composing an interlace approaching or touching value image based on all the interlace approaching or touching value arrays according to positions of the third circuits corresponding to the interlace approaching or touching value arrays.

Step 780: calculating one or more points of pressure based on the interlace pressure value image and calculating one or more points of approaching or touching based on the interlace approaching or touching value image. The step may further comprises calculating a weighted pressure value of each of the points of pressure and calculating a weighted pressure value of each of the points of approaching or touching.

At step 780, because the point of approaching or touching and the point of pressure may be within a certain distance, it may report the point of the approaching or touching and the pressure value of the point of pressure to the host. In case that the point of approaching or touching and the point of pressure are not within a certain distance, it implies that there is another external conductive object hovering above the point of approaching or touching. Thus, it may not need to report the pressure value of the point of approaching or touching.

Figure 8A:
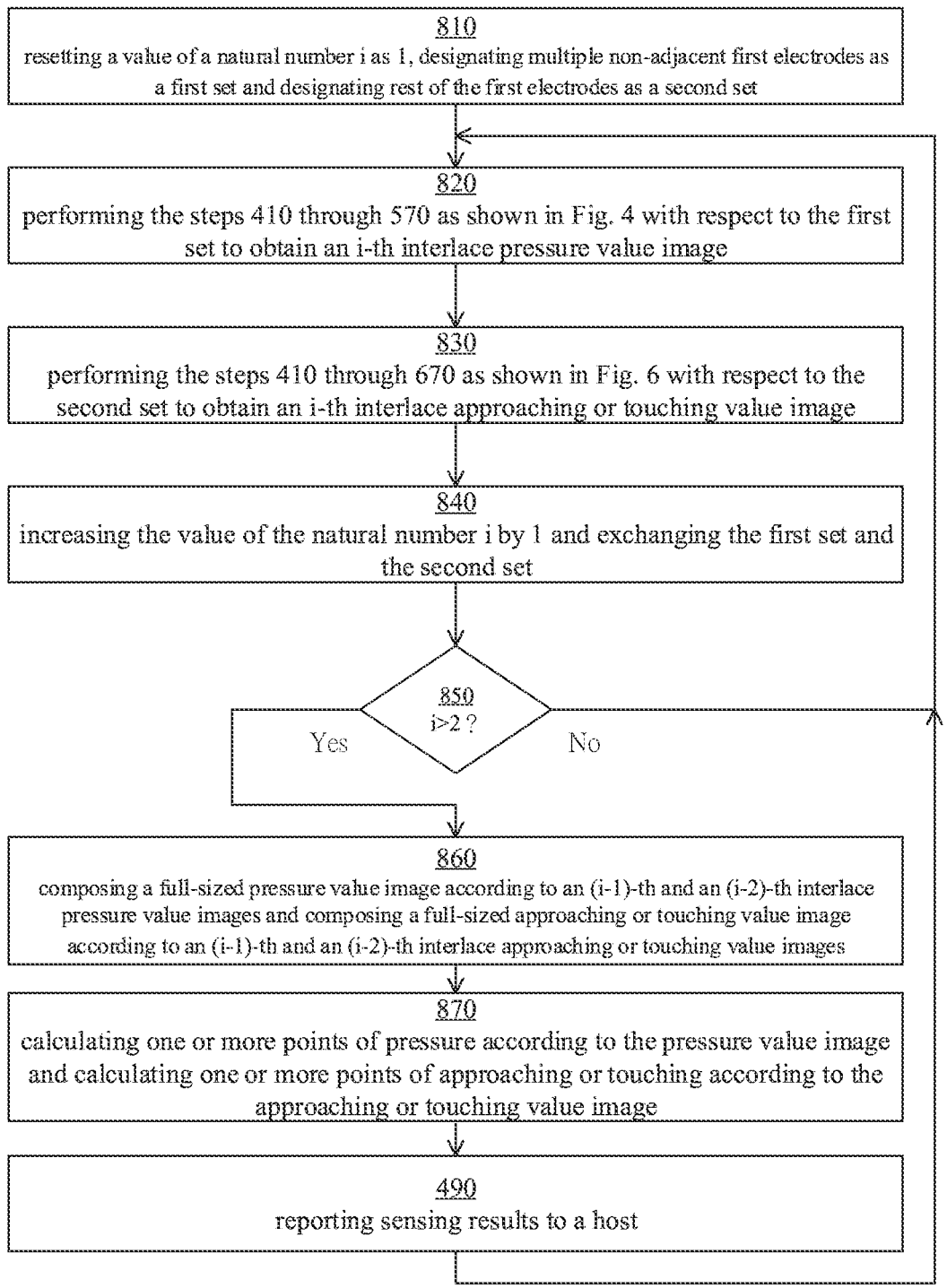
FIG. 8A depicts a flowchart diagram of a touch sensitive processing method 800A in accordance with an embodiment of the present application.

Please refer to FIG. 8A, which depicts a flowchart diagram of a touch sensitive processing method 800A in accordance with an embodiment of the present application. The touch sensitive processing method 800A may be applied to the touch system 300 as shown in FIG. 3, especially applicable to the processor module 314 of the touch sensitive processing apparatus 310. The processor module 314 may execute the instructions and data stored in non-volatile memories to realize the touch sensitive processing method 800A. If there is no causal relation between any two steps, the present application does not limit the execution sequence of these two steps. By reusing the touch sensitive processing methods 500 and 600, the touch sensitive processing method 800A is configured to gather consecutively interlace approaching or touching value images and interlace pressure value images with fewer elements, and to compose a full-sized approaching or touching value image by two consecutive and interlace approaching or touching value images and to compose a full-sized pressure value image by two consecutive and interlace pressure value images. Because two consecutive and interlace approaching or touching value images are sensed with respect to different sets of the first electrodes, the full-sized approaching or touching value image can be formed by the two consecutive and interlace approaching or touching value images in interlace, and the full-sized pressure image can be formed by the two consecutive and interlace pressure images in interlace. The touch sensitive processing method 800A may use some steps which are already recited in the touch sensitive processing methods 400 through 700. Hence, no duplicated description is elaborated. The touch sensitive processing method 800A begins at step 810.

Step 810: resetting a value of a natural number i as 1, designating multiple non-adjacent first electrodes as a first set and designating rest of the first electrodes as a second set. In one embodiment, the first set includes the first electrodes which are odd numbered, the second set includes the first electrodes which are even numbered. In an alternative embodiment, the first set includes the first electrodes which are even numbered, the second set includes the first electrodes which are odd numbered. The present application does not limit that what the first electrodes designated at step 810 are odd numbered or even numbered.

Step 820: performing the steps 410 through 570 as shown in FIG. 4 with respect to the first set to obtain an i-th interlace pressure value image. For example, in case that the first set includes the first electrodes which are odd numbered, the i-th interlace pressure value image comprises sensing results of odd-numbered second electrodes which corresponding to the first electrodes which are odd numbered, respectively.

Step 830: performing the steps 410 through 670 as shown in FIG. 6 with respect to the second set to obtain an i-th interlace approaching or touching value image. For example, in case that the second set includes the first electrodes which are even numbered, the i-th interlace approaching or touching value image comprises sensing results of even-numbered second electrodes which corresponding to the first electrodes which are even numbered, respectively.

Step 840: increasing the value of the natural number i by 1 and exchanging the first set and the second set.

Step 850: determining whether the value of the natural number i is larger than 2. Only when the step 850 is executed at the first time, the determination result would be false. When the determination result is true, it implies that there are two consecutively sensed and interlace approaching or touching value image and two consecutively sensed and interlace pressure images, the flow proceeds to step 860. Otherwise, the flow returns to step 820.

Step 860: composing a full-sized pressure value image according to an (i−1)-th and an (i−2)-th interlace pressure value images and composing a full-sized approaching or touching value image according to an (i−1)-th and an (i−2)-th interlace approaching or touching value images. Because the value of the natural number i is already increased at step 840, the value of (i−1) at step 860 equals to the value of the natural number i at step 830. Since the (i−1)-th and the (i−2)-th interlace pressure value images are corresponding to the first and the second sets, respectively, the elements of the (i−1)-th and the (i−2)-th interlace pressure value images can be used in interlace to compose the full-sized pressure value image. Similarly, since the (i−1)-th and the (i−2)-th interlace approaching or touching value images are corresponding to the first and the second sets, respectively, the elements of the (i−1)-th and the (i−2)-th interlace approaching or touching value images can be used in interlace to compose the full-sized approaching or touching value image.

Step 870: calculating one or more points of pressure according to the pressure value image and calculating one or more points of approaching or touching according to the approaching or touching value image. In one embodiment, it may further calculate a pressure value of each of the points of pressure according to the pressure value image. In one embodiment, it may further calculate a pressure value of each of the points of approaching or touching according to the approaching or touching value image.

Figure 8B:
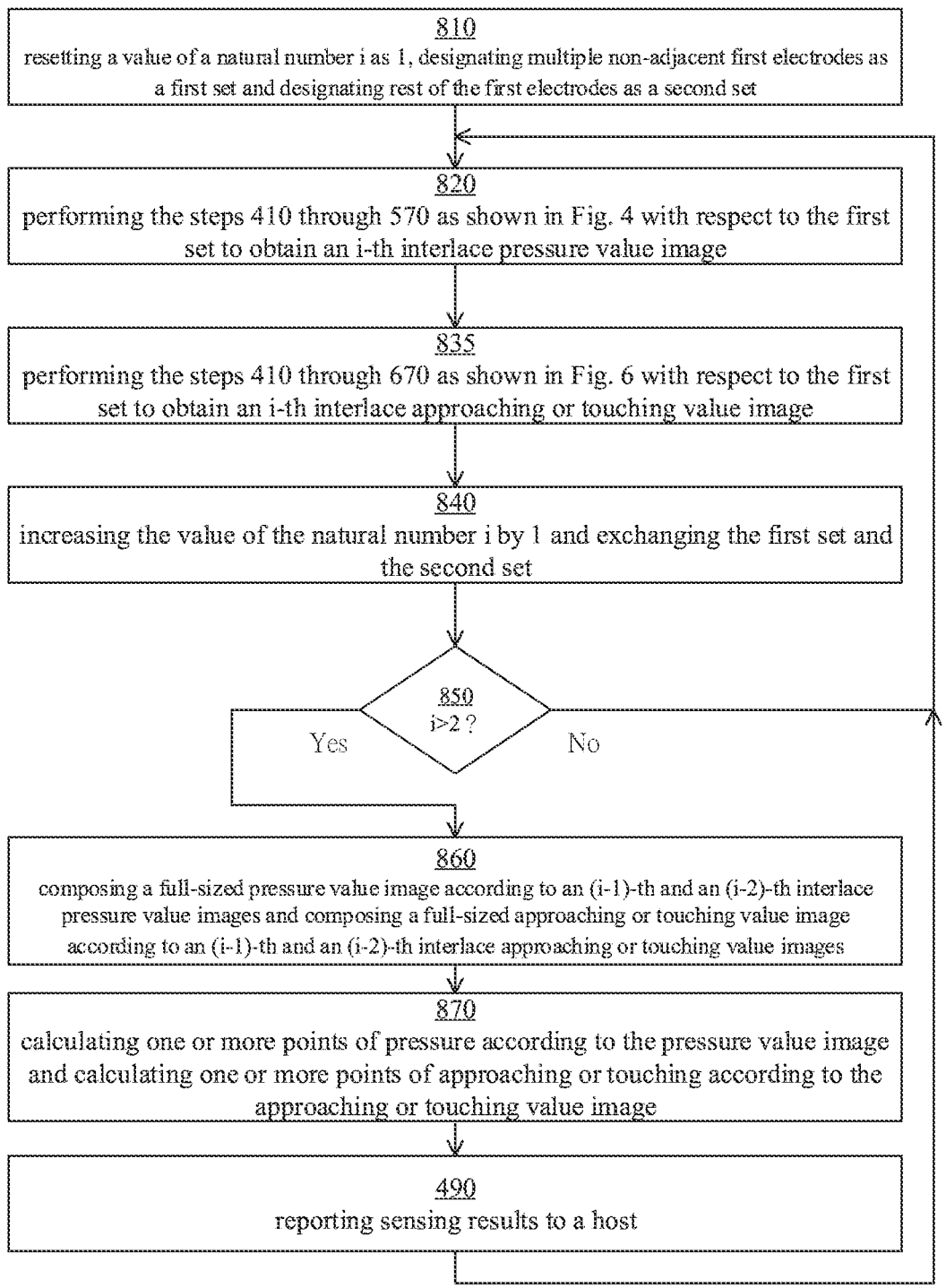
FIG. 8B depicts a flowchart diagram of a touch sensitive processing method 800B in accordance with an embodiment of the present application.

Please refer to FIG. 8B, which depicts a flowchart diagram of a touch sensitive processing method 800B in accordance with an embodiment of the present application. The embodiment as shown in FIG. 8B is a variant of the embodiment as shown in FIG. 8A. The difference in between is that step 830 is replaced by step 835. It only requires that two consecutive sensing are corresponding to the first set and the second set, respectively, the order of these two consecutive sensing can be altered.

Step 835: performing the steps 410 through 670 as shown in FIG. 6 with respect to the first set to obtain an i-th interlace approaching or touching value image.

Figure 9A:
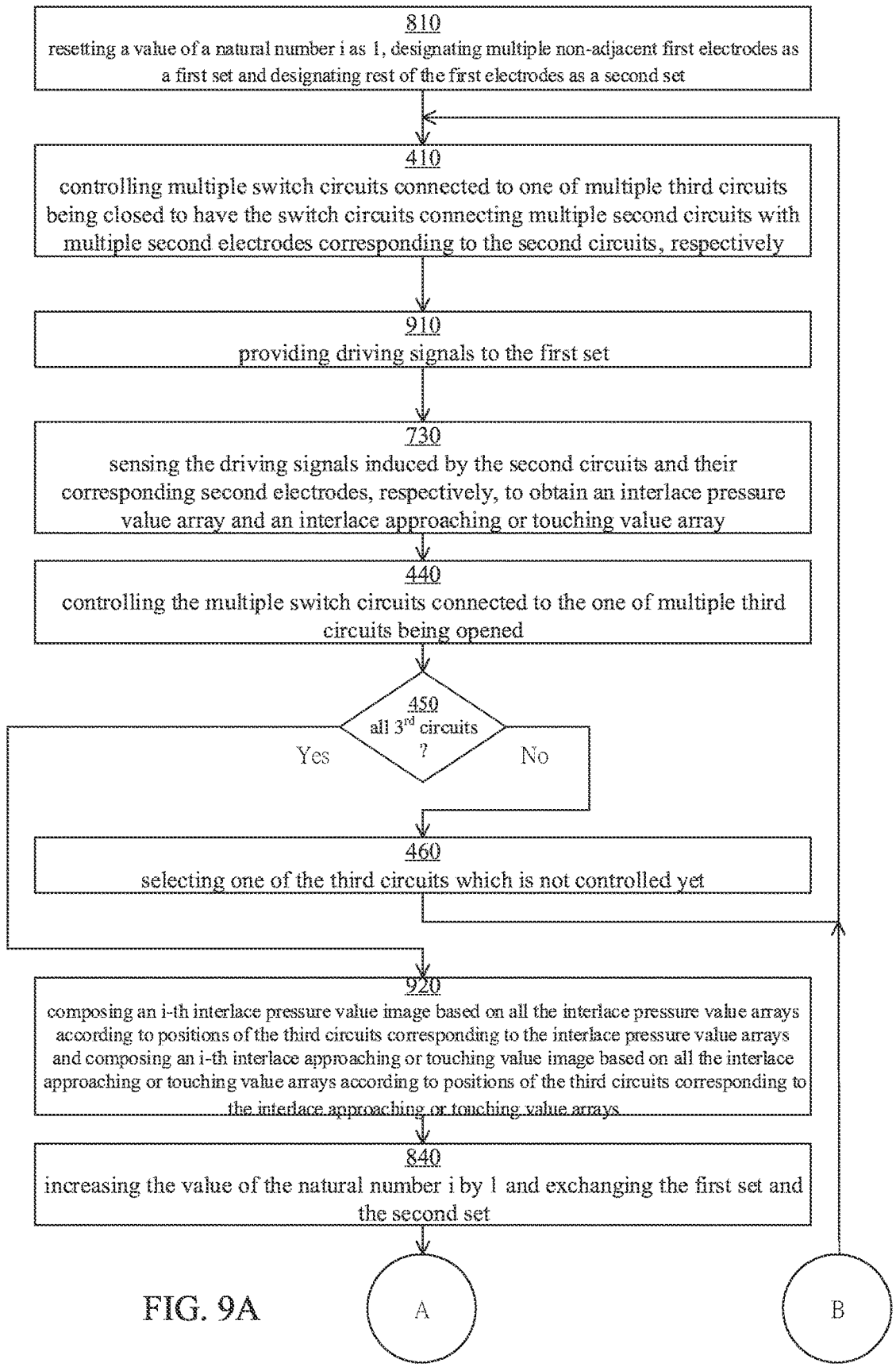
FIGS. 9A and 9B illustrate a flowchart diagram of a touch sensitive processing method 900 in accordance with an embodiment of the present application.
Figure 9B:
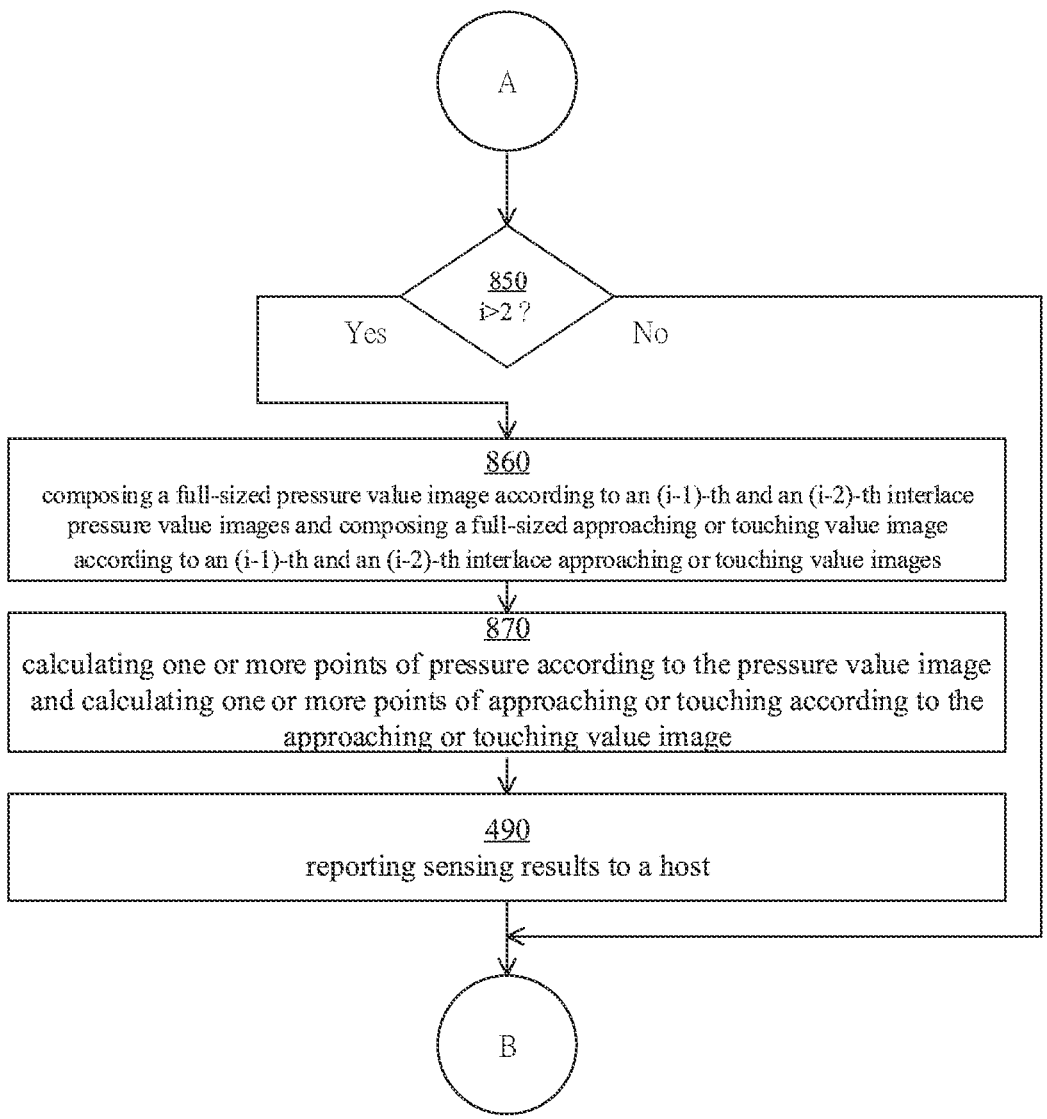

Please refer to FIGS. 9A and 9B, which illustrate a flowchart diagram of a touch sensitive processing method 900 in accordance with an embodiment of the present application. The touch sensitive processing method 900 may be applied to the touch system 300 as shown in FIG. 3, especially applicable to the processor module 314 of the touch sensitive processing apparatus 310. The processor module 314 may execute the instructions and data stored in non-volatile memories to realize the touch sensitive processing method 900. If there is no causal relation between any two steps, the present application does not limit the execution sequence of these two steps. Like the touch sensitive processing methods 800A and 800B, the touch sensitive processing method 900 is configured to gather consecutive and interlace approaching or touching value images and interlace pressure value images with fewer elements, and to compose a full-sized approaching or touching value image by two consecutive and interlace approaching or touching value images and to compose a full-sized pressure value image by two consecutive and interlace pressure value images. Because two consecutive and interlace approaching or touching value images are sensed with respect to different sets of the first electrodes, the full-sized approaching or touching value image can be formed by the two consecutive and interlace approaching or touching value images in interlace, and the full-sized pressure image can be formed by the two consecutive and interlace pressure images in interlace. The differences to the touch sensitive processing methods 800A and 800B reside that the touch sensitive processing method 900 gathers an interlace approaching or touching value image and an interlace pressure value image in one sensing. The touch sensitive processing method 900 may use some steps which are already recited in the touch sensitive processing methods 400 through 800A and 800B. Hence, no duplicated description is elaborated. The touch sensitive processing method 900 begins at step 810.

Step 910: providing driving signals to the first set.

Step 920: composing an i-th interlace pressure value image based on all the interlace pressure value arrays according to positions of the third circuits corresponding to the interlace pressure value arrays and composing an i-th interlace approaching or touching value image based on all the interlace approaching or touching value arrays according to positions of the third circuits corresponding to the interlace approaching or touching value arrays.

Figure 10:
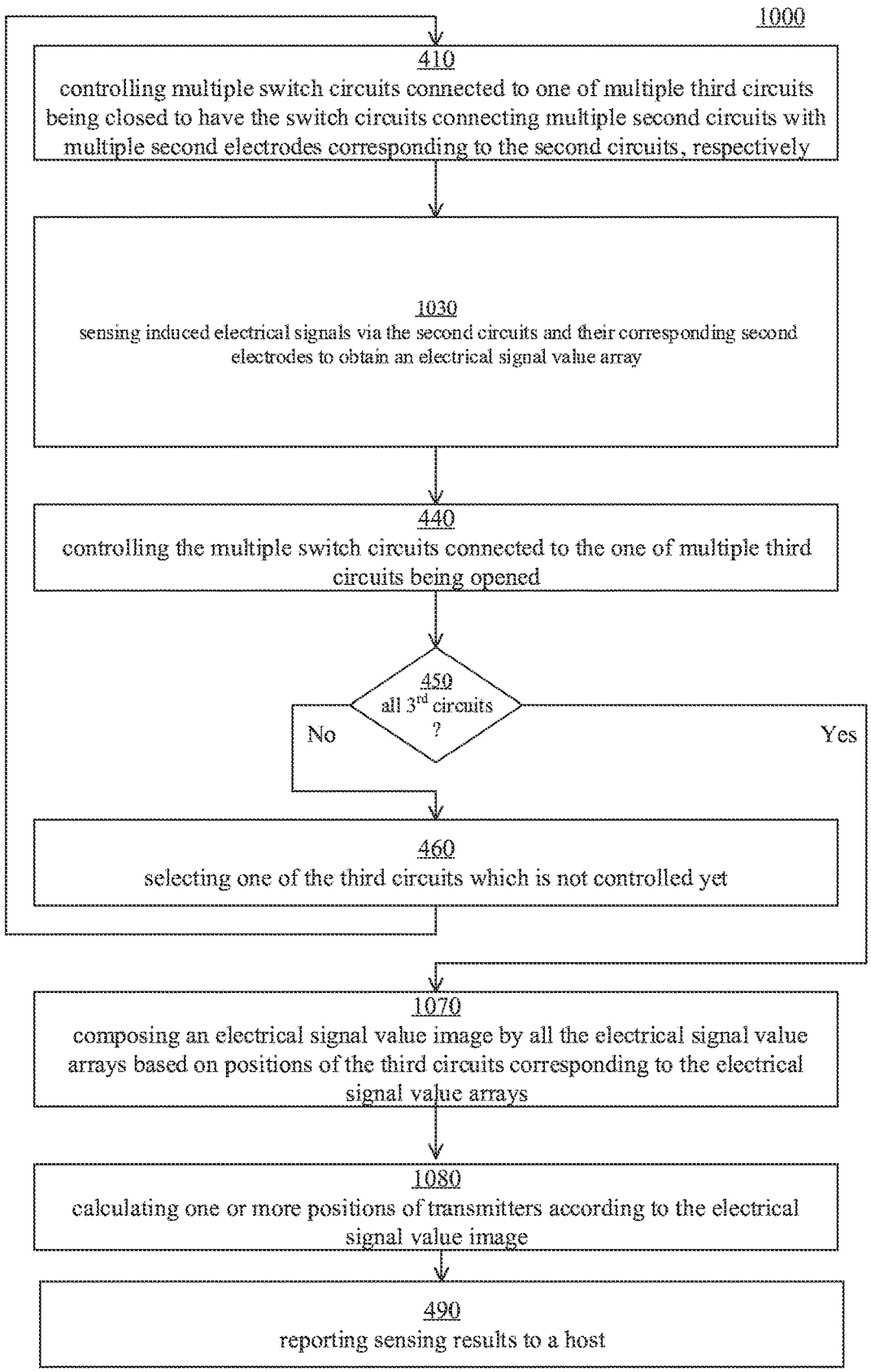
FIG. 10 depicts a flowchart diagram of a touch sensitive processing method 1000 in accordance with an embodiment of the present application.

Please refer to FIG. 10, which illustrates a flowchart diagram of a touch sensitive processing method 1000 in accordance with an embodiment of the present application. The touch sensitive processing method 1000 may be applied to the touch system 300 as shown in FIG. 3, especially applicable to the processor module 314 of the touch sensitive processing apparatus 310. The processor module 314 may execute the instructions and data stored in non-volatile memories to realize the touch sensitive processing method 1000. If there is no causal relation between any two steps, the present application does not limit the execution sequence of these two steps. By using some steps recited in the touch sensitive processing method 400, the touch sensitive processing method 1000 is configured to detect electrical signals emitted by a transmitter such as a stylus or a touch board eraser. The touch sensitive processing method 1000 may use some steps which are already recited in the touch sensitive processing method 400. Hence, no duplicated description is elaborated. The touch sensitive processing method 1000 begins at step 410.

Step 1030: sensing induced electrical signals via the second circuits and their corresponding second electrodes to obtain an electrical signal value array.

Step 1070: composing an electrical signal value image by all the electrical signal value arrays based on positions of the third circuits corresponding to the electrical signal value arrays.

Step 1080: calculating one or more positions of transmitters according to the electrical signal value image.

Figure 11:
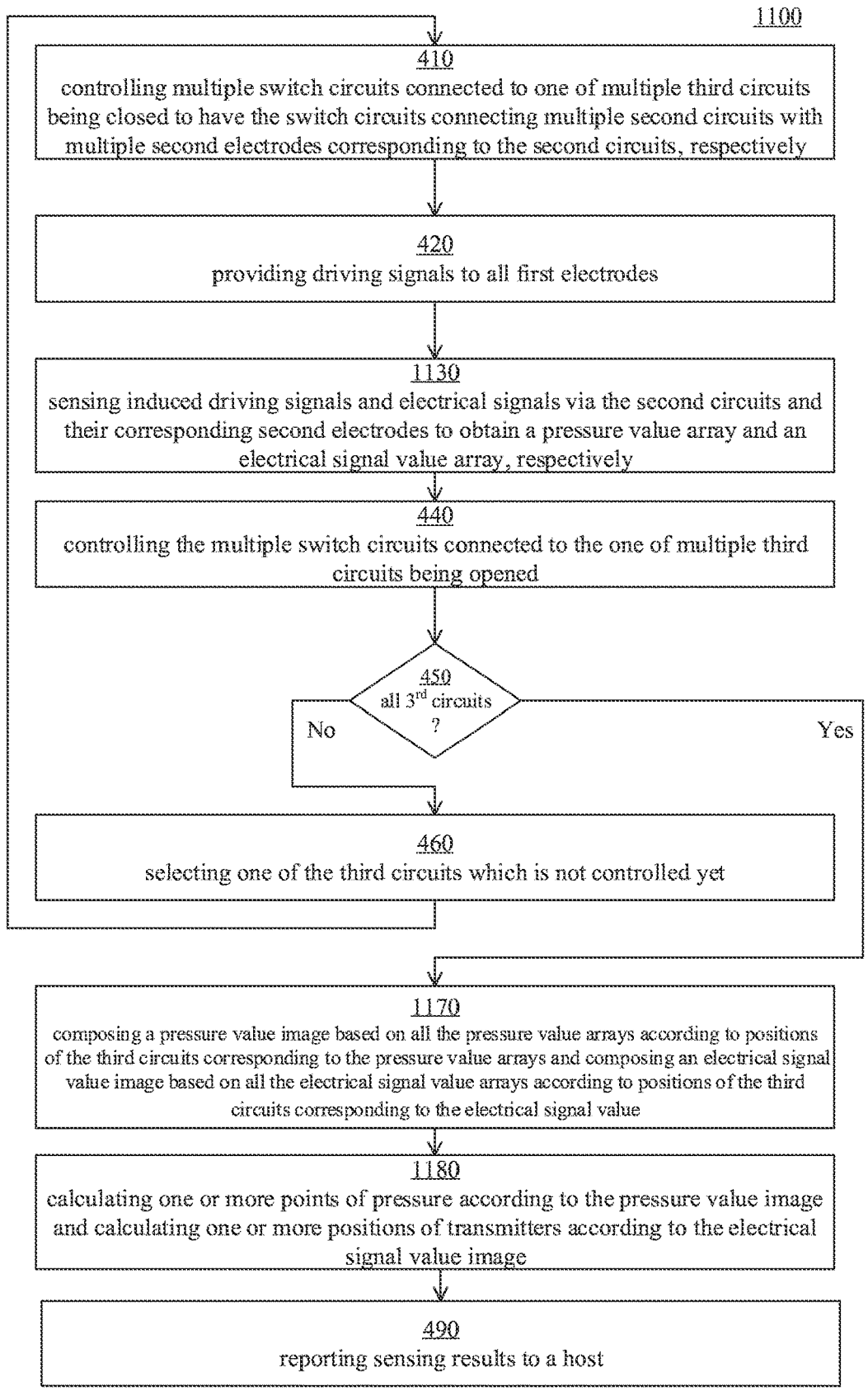
FIG. 11 illustrates a flowchart diagram of a touch sensitive processing method 1100 in accordance with an embodiment of the present application.

Please refer to FIG. 11, which illustrates a flowchart diagram of a touch sensitive processing method 1100 in accordance with an embodiment of the present application. The touch sensitive processing method 1100 may be applied to the touch system 300 as shown in FIG. 3, especially applicable to the processor module 314 of the touch sensitive processing apparatus 310. The processor module 314 may execute the instructions and data stored in non-volatile memories to realize the touch sensitive processing method 1100. If there is no causal relation between any two steps, the present application does not limit the execution sequence of these two steps. Similar to the touch sensitive processing method 1000 as shown in FIG. 10, the touch sensitive processing method 1100 is configured to detect electrical signals actively emitted by a transmitter such as a stylus or a touch sensitive board eraser. The difference in between is that in case that the frequency of the electrical signals is not identical to the frequency of the driving signals and the sensing circuit module 313 is capable to detect the frequencies of the electrical signals and the driving signals simultaneously, it is possible to calculate positions of pressure and positions of transmitter in one round of sensing. The touch sensitive processing method 1100 may use some steps which are already recited in the touch sensitive processing method 400. Hence, no duplicated description is elaborated. The touch sensitive processing method 1100 begins at step 410.

Step 1130: sensing induced driving signals and electrical signals via the second circuits and their corresponding second electrodes to obtain a pressure value array and an electrical signal value array, respectively.

Step 1170: composing a pressure value image based on all the pressure value arrays according to positions of the third circuits corresponding to the pressure value arrays and composing an electrical signal value image based on all the electrical signal value arrays according to positions of the third circuits corresponding to the electrical signal value.

Step 1180: calculating one or more points of pressure according to the pressure value image and calculating one or more positions of transmitters according to the electrical signal value image.

Figure 12:
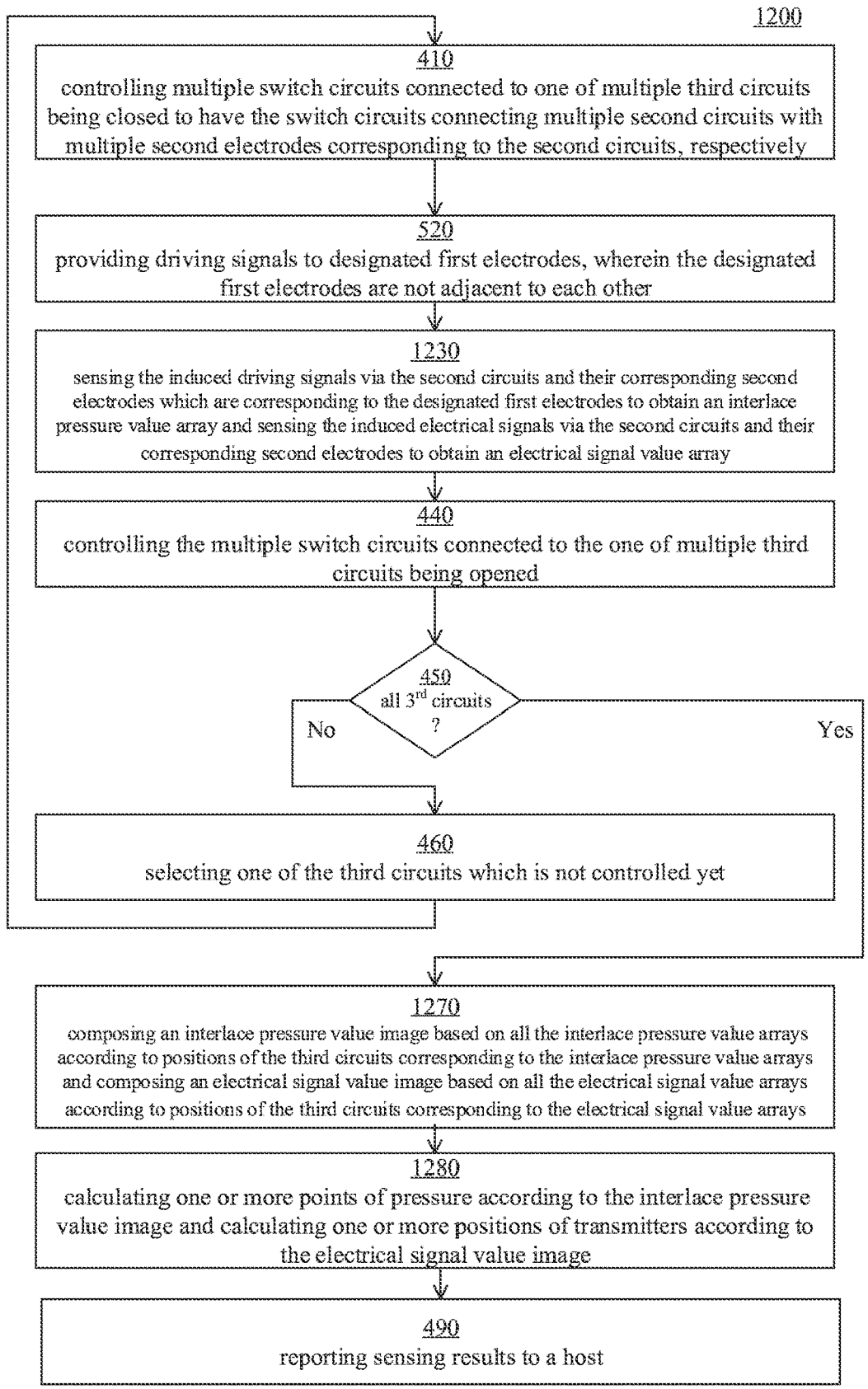
FIG. 12 illustrates a flowchart diagram of a touch sensitive processing method 1200 in accordance with an embodiment of the present application.

Please refer to FIG. 12, which illustrates a flowchart diagram of a touch sensitive processing method 1200 in accordance with an embodiment of the present application. The touch sensitive processing method 1200 may be applied to the touch system 300 as shown in FIG. 3, especially applicable to the processor module 314 of the touch sensitive processing apparatus 310. The processor module 314 may execute the instructions and data stored in non-volatile memories to realize the touch sensitive processing method 1200. If there is no causal relation between any two steps, the present application does not limit the execution sequence of these two steps. Similar to the touch sensitive processing method 1000 as shown in FIG. 10, the touch sensitive processing method 1200 is configured to detect electrical signals actively emitted by a transmitter such as a stylus or a touch sensitive board eraser. The difference in between is that in case that the frequency of the electrical signals is not identical to the frequency of the driving signals and the sensing circuit module 313 is capable to detect the frequencies of the electrical signals and the driving signals simultaneously, it is possible to calculate points of pressure and positions of transmitter in one round of sensing. The points of pressure with lower resolution and the positions of transmitters with normal resolution are calculated. The touch sensitive processing method 1200 may use some steps which are already recited in the touch sensitive processing method 500. Hence, no duplicated description is elaborated. The touch sensitive processing method 1200 begins at step 410.

Step 1230: sensing the induced driving signals via the second circuits and their corresponding second electrodes which are corresponding to the designated first electrodes to obtain an interlace pressure value array and sensing the induced electrical signals via the second circuits and their corresponding second electrodes to obtain an electrical signal value array. In one embodiment, the number of elements of the electrical signal value array is about twice of the number of elements of the interlace pressure value array.

Step 1270: composing an interlace pressure value image based on all the interlace pressure value arrays according to positions of the third circuits corresponding to the interlace pressure value arrays and composing an electrical signal value image based on all the electrical signal value arrays according to positions of the third circuits corresponding to the electrical signal value arrays. In one embodiment, the number of elements of the electrical signal value image is about twice of the number of elements of the interlace pressure value image.

Step 1280: calculating one or more points of pressure according to the interlace pressure value image and calculating one or more positions of transmitters according to the electrical signal value image.

Figure 13:
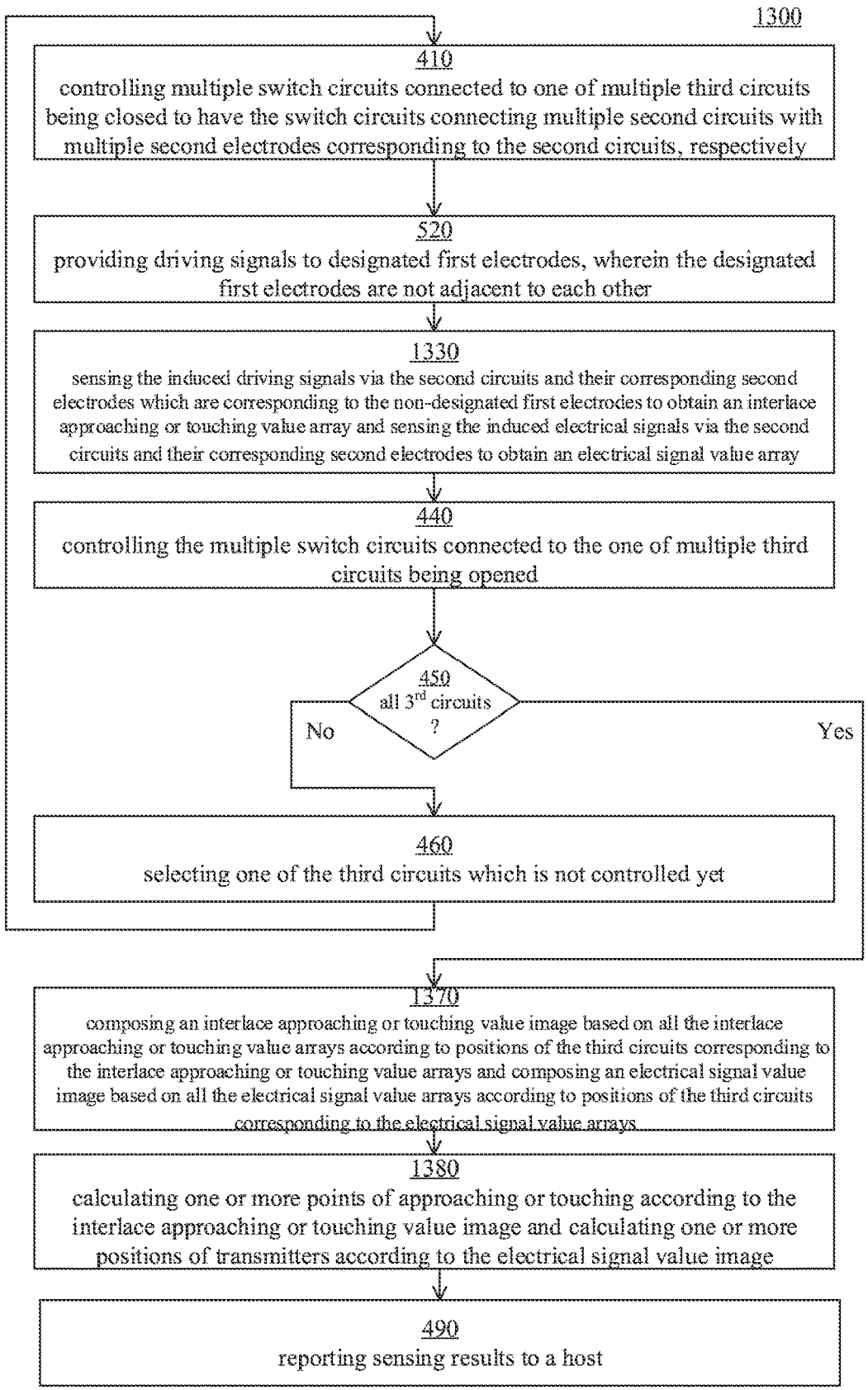
FIG. 13 illustrates a flowchart diagram of a touch sensitive processing method 1300 in accordance with an embodiment of the present application.

Please refer to FIG. 13, which illustrates a flowchart diagram of a touch sensitive processing method 1300 in accordance with an embodiment of the present application. The touch sensitive processing method 1300 may be applied to the touch system 300 as shown in FIG. 3, especially applicable to the processor module 314 of the touch sensitive processing apparatus 310. The processor module 314 may execute the instructions and data stored in non-volatile memories to realize the touch sensitive processing method 1300. If there is no causal relation between any two steps, the present application does not limit the execution sequence of these two steps. Similar to the touch sensitive processing method 1000 as shown in FIG. 10, the touch sensitive processing method 1300 is configured to detect electrical signals actively emitted by a transmitter such as a stylus or a touch sensitive board eraser. The difference in between is that in case that the frequency of the electrical signals is not identical to the frequency of the driving signals and the sensing circuit module 313 is capable to detect the frequencies of the electrical signals and the driving signals simultaneously, it is possible to calculate points of approaching or touching and positions of transmitter in one round of sensing. The points of approaching or touching with lower resolution and the positions of transmitters with normal resolution are calculated. The touch sensitive processing method 1300 may use some steps which are already recited in the touch sensitive processing method 600. Hence, no duplicated description is elaborated. The touch sensitive processing method 1300 begins at step 410.

Step 1330: sensing the induced driving signals via the second circuits and their corresponding second electrodes which are corresponding to the non-designated first electrodes to obtain an interlace approaching or touching value array and sensing the induced electrical signals via the second circuits and their corresponding second electrodes to obtain an electrical signal value array. In one embodiment, the number of elements of the electrical signal value array is about twice of the number of elements of the interlace approaching or touching value array.

Step 1370: composing an interlace approaching or touching value image based on all the interlace approaching or touching value arrays according to positions of the third circuits corresponding to the interlace approaching or touching value arrays and composing an electrical signal value image based on all the electrical signal value arrays according to positions of the third circuits corresponding to the electrical signal value arrays. In one embodiment, the number of elements of the electrical signal value image is about twice of the number of elements of the interlace approaching or touching value image.

Step 1380: calculating one or more points of approaching or touching according to the interlace approaching or touching value image and calculating one or more positions of transmitters according to the electrical signal value image.

Figure 14:
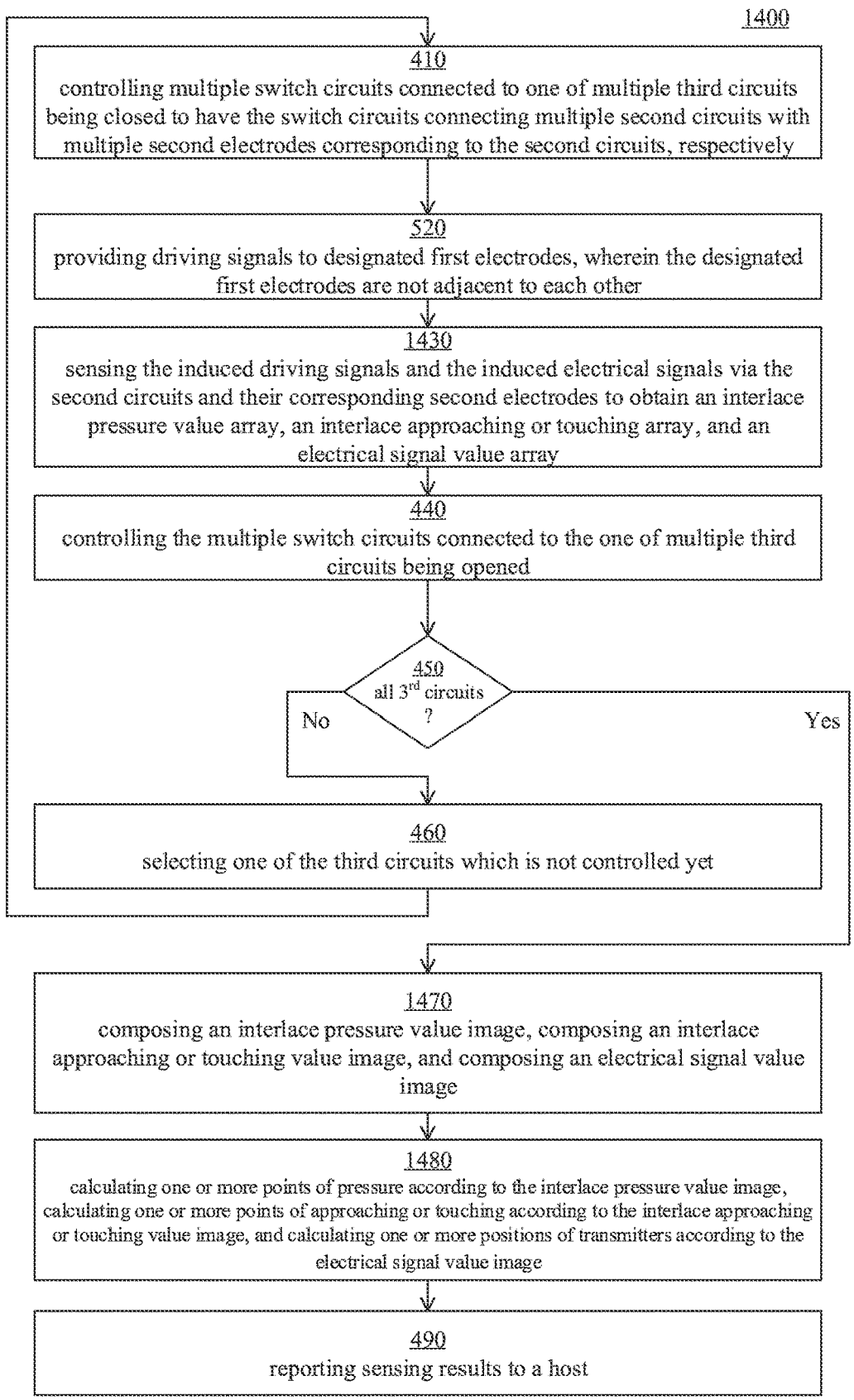
FIG. 14 illustrates a flowchart diagram of a touch sensitive processing method 1400 in accordance with an embodiment of the present application.

Please refer to FIG. 14, which illustrates a flowchart diagram of a touch sensitive processing method 1400 in accordance with an embodiment of the present application. The touch sensitive processing method 1400 may be applied to the touch system 300 as shown in FIG. 3, especially applicable to the processor module 314 of the touch sensitive processing apparatus 310. The processor module 314 may execute the instructions and data stored in non-volatile memories to realize the touch sensitive processing method 1400. If there is no causal relation between any two steps, the present application does not limit the execution sequence of these two steps. Similar to the touch sensitive processing method 1000 as shown in FIG. 10, the touch sensitive processing method 1400 is configured to detect electrical signals actively emitted by a transmitter such as a stylus or a touch sensitive board eraser. The difference in between is that in case that the frequency of the electrical signals is not identical to the frequency of the driving signals and the sensing circuit module 313 is capable to detect the frequencies of the electrical signals and the driving signals simultaneously, it is possible to calculate positions of pressure, points of approaching or touching, and positions of transmitter in one round of sensing. The positions of pressure with lower resolution, points of approaching or touching with lower resolution, and the positions of transmitters with normal resolution are calculated. The touch sensitive processing method 1400 may use some steps which are already recited in the touch sensitive processing method 700. Hence, no duplicated description is elaborated. The touch sensitive processing method 1300 begins at step 410.

Step 1430: sensing the induced driving signals and the induced electrical signals via the second circuits and their corresponding second electrodes to obtain an interlace pressure value array, an interlace approaching or touching array, and an electrical signal value array. In one embodiment, the number of elements of the electrical signal value array is about twice of the number of elements of the interlace pressure value array or about twice of the number of elements of the interlace approaching or touching value array.

Step 1470: composing an interlace pressure value image based on all the interlace pressure value arrays according to positions of the third circuits corresponding to the interlace pressure value arrays, composing an interlace approaching or touching value image based on all the interlace approaching or touching value arrays according to positions of the third circuits corresponding to the interlace approaching or touching value arrays, and composing an electrical signal value image based on all the electrical signal value arrays according to positions of the third circuits corresponding to the electrical signal value arrays. In one embodiment, the number of elements of the electrical signal value image is about twice of the number of elements of the interlace pressure value image or about twice of the number of elements of the interlace approaching or touching value image.

Step 1480: calculating one or more points of pressure according to the interlace pressure value image, calculating one or more points of approaching or touching according to the interlace approaching or touching value image, and calculating one or more positions of transmitters according to the electrical signal value image.

Figure 15A:
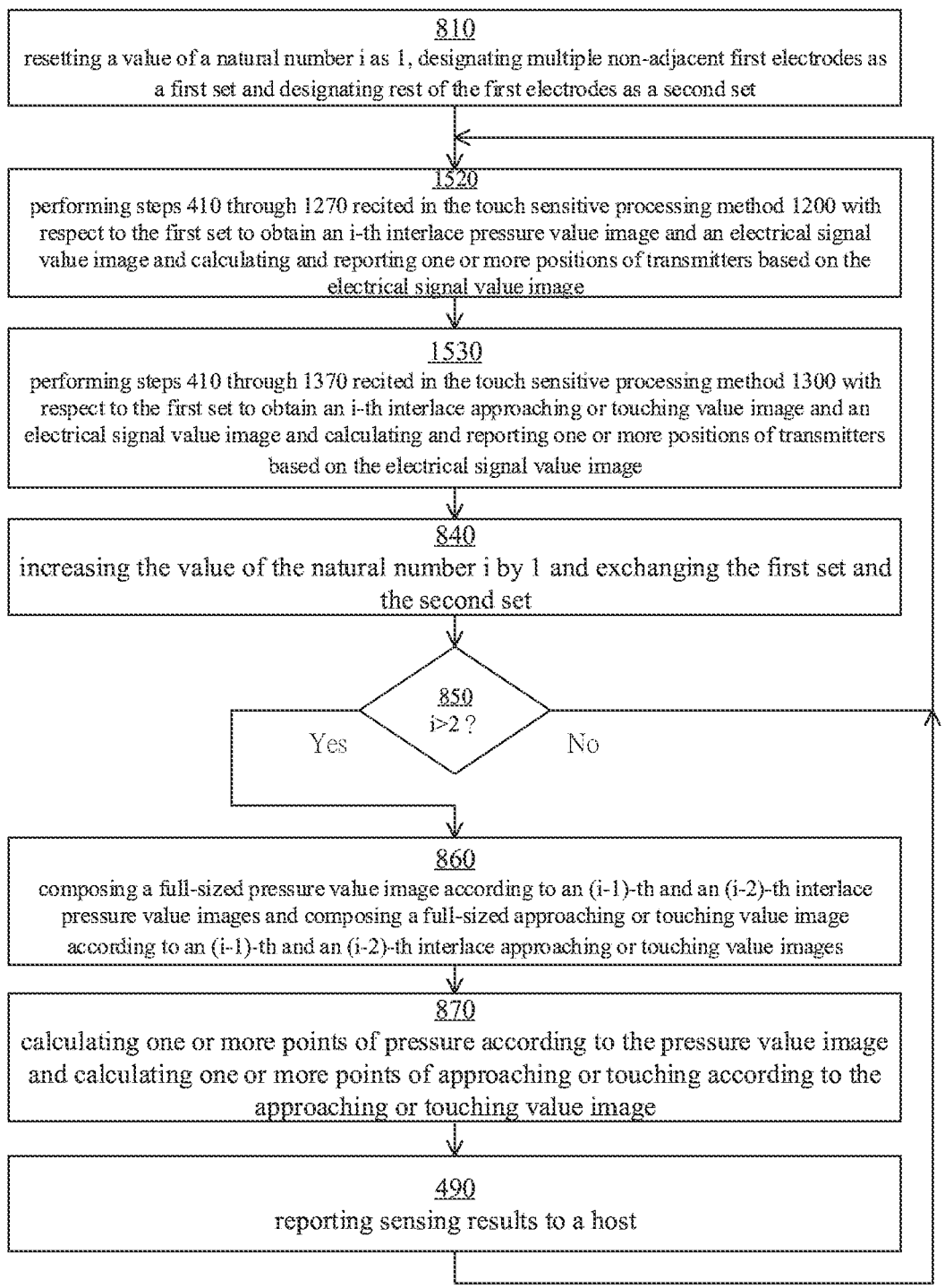
FIG. 15A illustrates a flowchart diagram of a touch sensitive processing method 1500A in accordance with an embodiment of the present application.

Please refer to FIG. 15A, which illustrates a flowchart diagram of a touch sensitive processing method 1500A in accordance with an embodiment of the present application. The touch sensitive processing method 1500A may be applied to the touch system 300 as shown in FIG. 3, especially applicable to the processor module 314 of the touch sensitive processing apparatus 310. The processor module 314 may execute the instructions and data stored in non-volatile memories to realize the touch sensitive processing method 1500A. If there is no causal relation between any two steps, the present application does not limit the execution sequence of these two steps. Similar to the touch sensitive processing method 1000 as shown in FIG. 10, the touch sensitive processing method 1500A is configured to detect electrical signals actively emitted by a transmitter such as a stylus or a touch sensitive board eraser. The difference in between is that in case that the frequency of the electrical signals is not identical to the frequency of the driving signals and the sensing circuit module 313 is capable to detect the frequencies of the electrical signals and the driving signals simultaneously, it is possible to obtain an interlace pressure value image, an interlace approaching or touching value image, and an electrical signal value image in one round of sensing. And it may be also configured to calculate and to report one or more positions of transmitters according to the electrical signal value image. After multiple rounds of sensing, in a pipeline process, a pressure value image and an approaching or touching value image can be composed by two consecutive and interlace pressure value images and two consecutive and interlace approaching or touching value images. Thus, in each round of sensing, points of pressure and points of approaching or touching can be calculated. The touch sensitive processing method 1500A may use some steps which are already recited in the touch sensitive processing methods 800, 1200 and 1300. Hence, no duplicated description is elaborated. The touch sensitive processing method 1500A begins at step 810.

S1520: performing steps 410 through 1270 recited in the touch sensitive processing method 1200 with respect to the first set to obtain an i-th interlace pressure value image and an electrical signal value image and calculating and reporting one or more positions of transmitters based on the electrical signal value image.

Step 1530: performing steps 410 through 1370 recited in the touch sensitive processing method 1300 with respect to the first set to obtain an i-th interlace approaching or touching value image and an electrical signal value image and calculating and reporting one or more positions of transmitters based on the electrical signal value image.

Figure 15B:
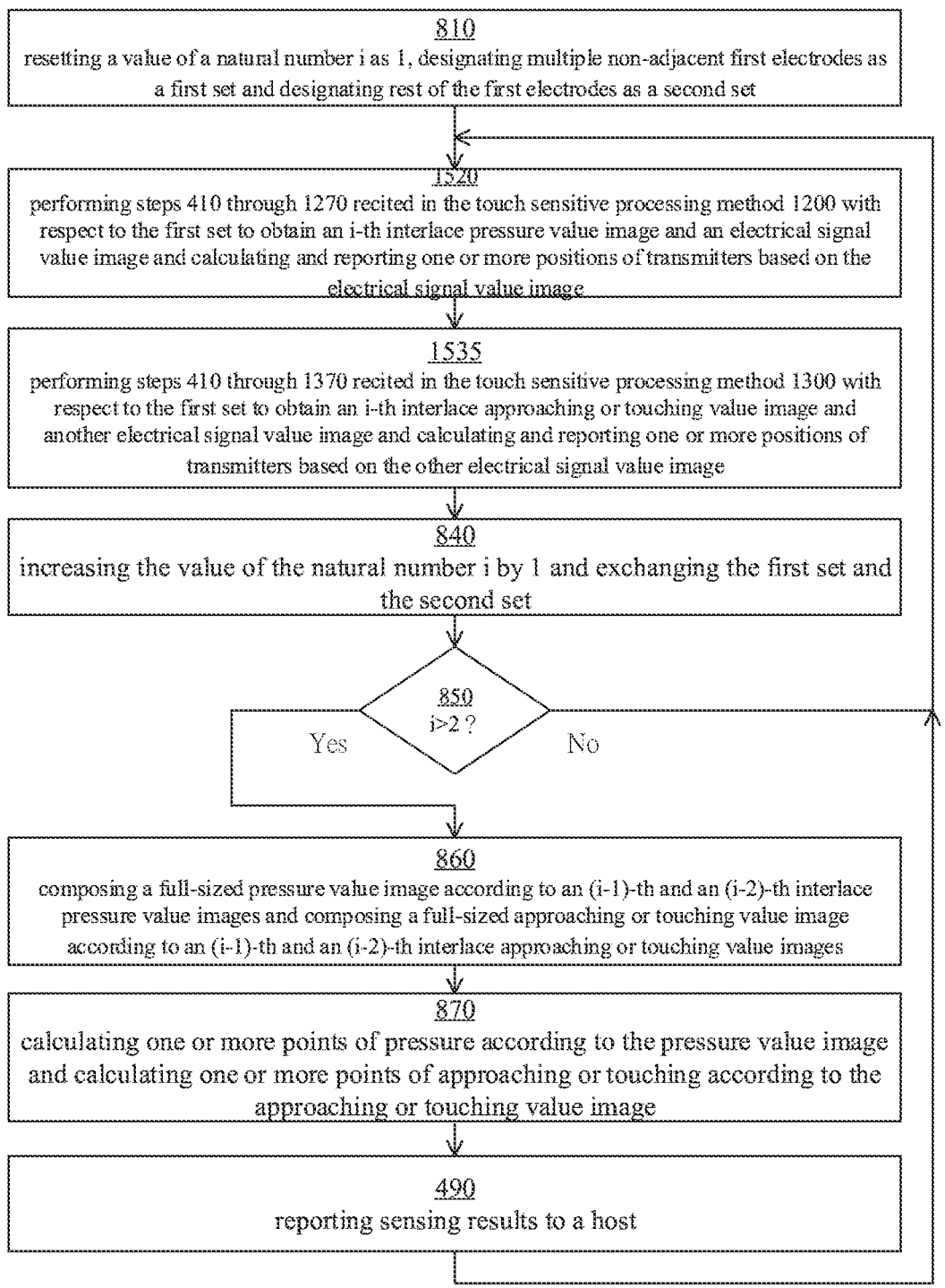
FIG. 15B illustrates a flowchart diagram of a touch sensitive processing method 1500B in accordance with an embodiment of the present application.

Please refer to FIG. 15B, which illustrates a flowchart diagram of a touch sensitive processing method 1500B in accordance with an embodiment of the present application. The embodiment as shown in FIG. 15B is a variant of the embodiment as shown in FIG. 15A. The difference in between is that step 1530 is replaced by step 1535. It only requires that two of consecutive sensing are corresponding to the first and the second sets, respectively, the order of these two consecutive sensing can be altered.

Step 1535: performing steps 410 through 1370 recited in the touch sensitive processing method 1300 with respect to the first set to obtain an i-th interlace approaching or touching value image and another electrical signal value image and calculating and reporting one or more positions of transmitters based on the other electrical signal value image.

Figure 16A:
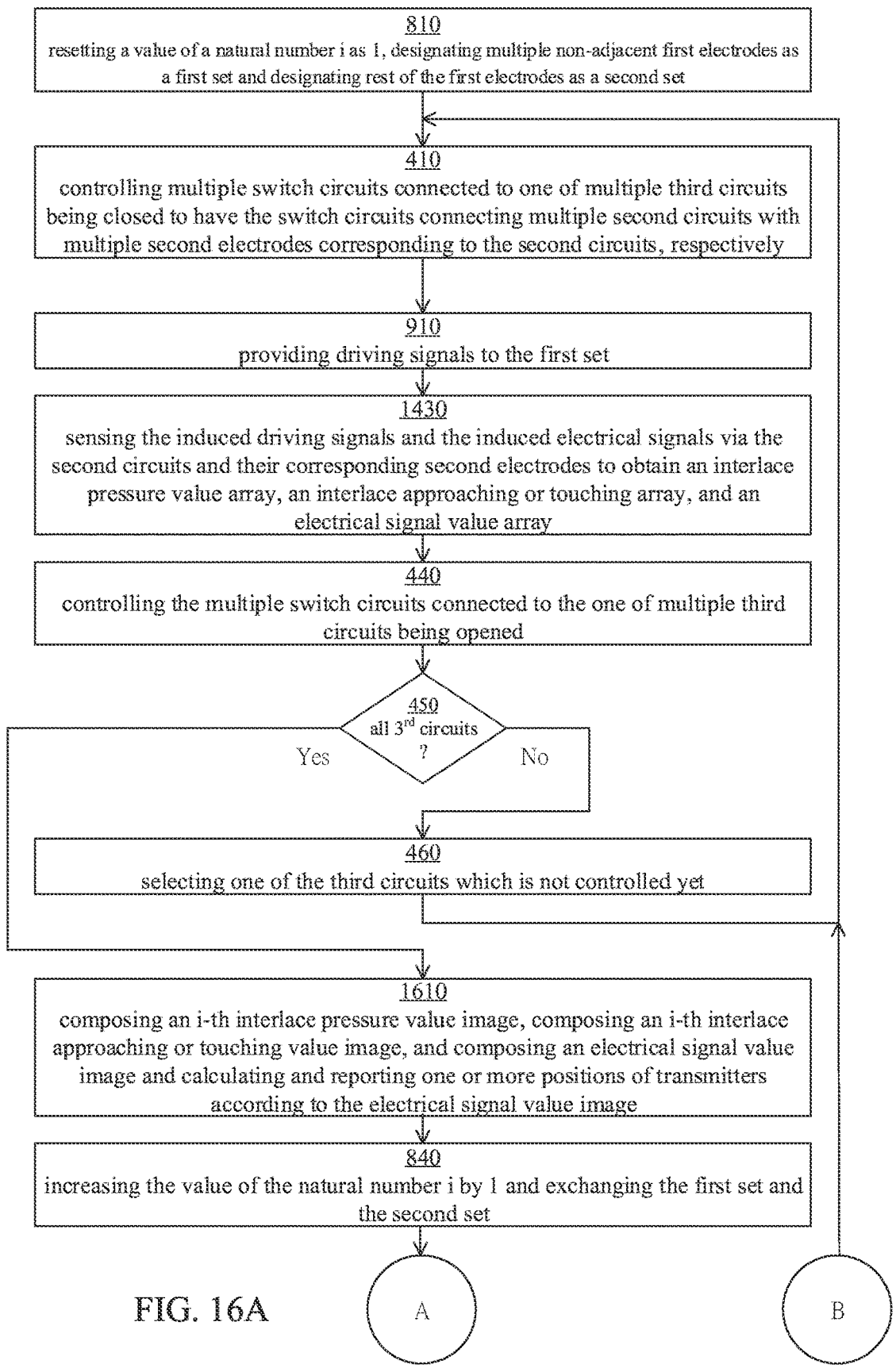
FIGS. 16A and 16B depict a flowchart diagram of a touch sensitive processing method 1600 in accordance with an embodiment of the present application.
Figure 16B:
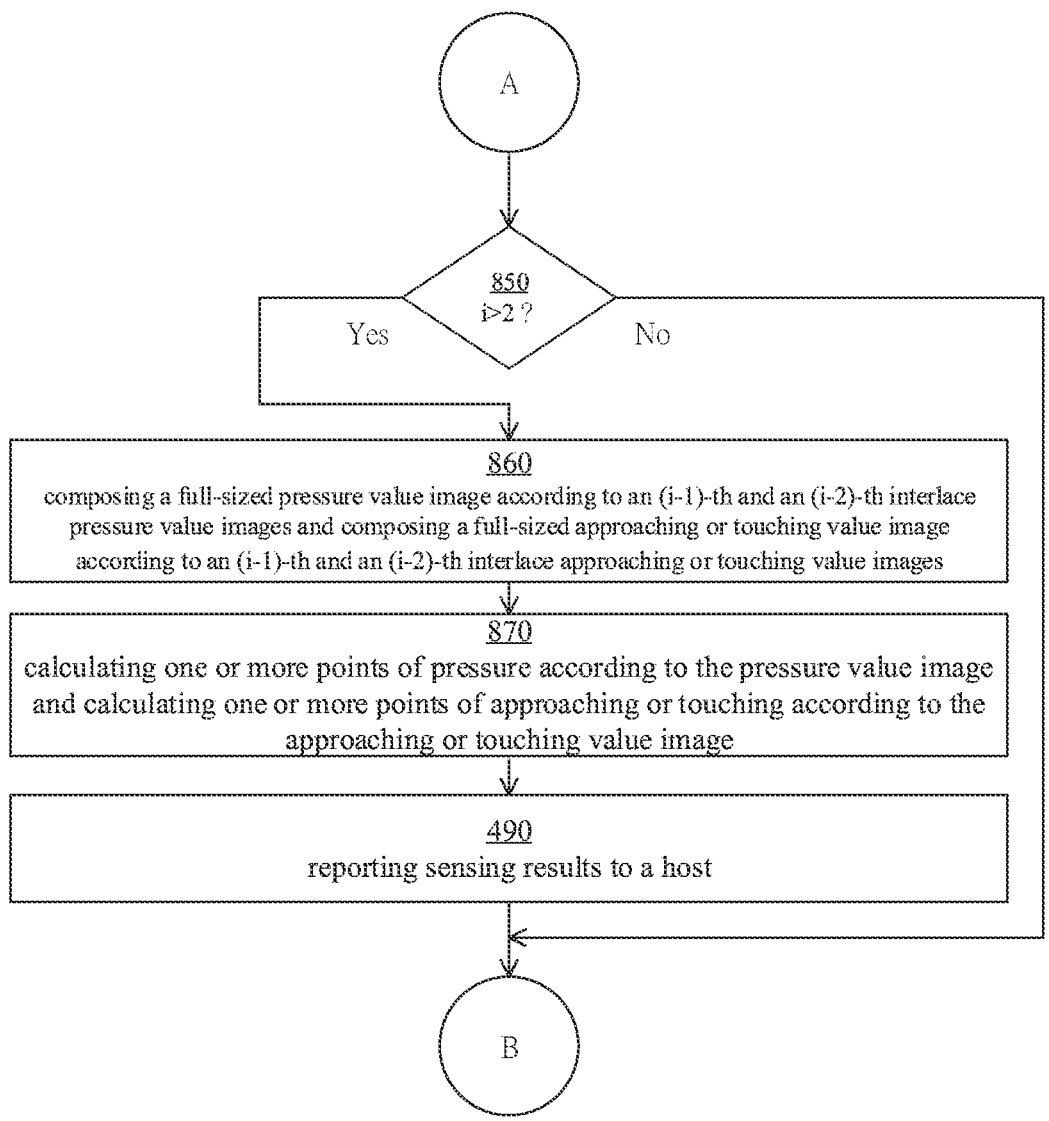

Please refer to FIGS. 16A and 16B, which depict a flowchart diagram of a touch sensitive processing method 1600 in accordance with an embodiment of the present application. The touch sensitive processing method 1600 may be applied to the touch system 300 as shown in FIG. 3, especially applicable to the processor module 314 of the touch sensitive processing apparatus 310. The processor module 314 may execute the instructions and data stored in non-volatile memories to realize the touch sensitive processing method 1600. If there is no causal relation between any two steps, the present application does not limit the execution sequence of these two steps. Similar to the touch sensitive processing method 900, the touch sensitive processing method 1600 is configured to obtain consecutively interlace approaching or touching value images with fewer elements, interlace pressure value images with fewer elements and full-sized electrical signal value images. After the full-sized electrical signal value image is obtained, one or more positions of transmitters can be calculated and reported. A full-sized approaching or touching value image can be composed by two consecutive and interlace approaching or touching value images and a full-sized pressure value image can be composed by two consecutive and interlace pressure value images. Because the two consecutive and interlace approaching or touching value images are corresponding to different sets of first electrodes, a complete approaching or touching value image can be composed in interlace based on the two consecutive and interlace approaching or touching value images and a complete pressure value image can be composed in interlace based on the two consecutive and interlace pressure value images. The touch sensitive processing method 1600 may use some steps which are already recited in the touch sensitive processing method 900. Hence, no duplicated description is elaborated. The touch sensitive processing method 1600 begins at step 810.

It is worthy noted that the flow of the touch sensitive processing method 1600 proceeds to step 1430 instead of step 730 after step 910. After step 1430, the flow returns to step 440. The flow proceeds to step 1610 after step 450.

Step 1610: composing an i-th interlace pressure value image based on all the interlace pressure value arrays according to positions of the third circuits corresponding to the interlace pressure value arrays, composing an i-th interlace approaching or touching value image based on all the interlace approaching or touching value arrays according to positions of the third circuits corresponding to the interlace approaching or touching value arrays, and composing an electrical signal value image based on all the electrical signal value arrays according to positions of the third circuits corresponding to the electrical signal value arrays, and calculating and reporting one or more positions of transmitters according to the electrical signal value image.

Figure 17A:
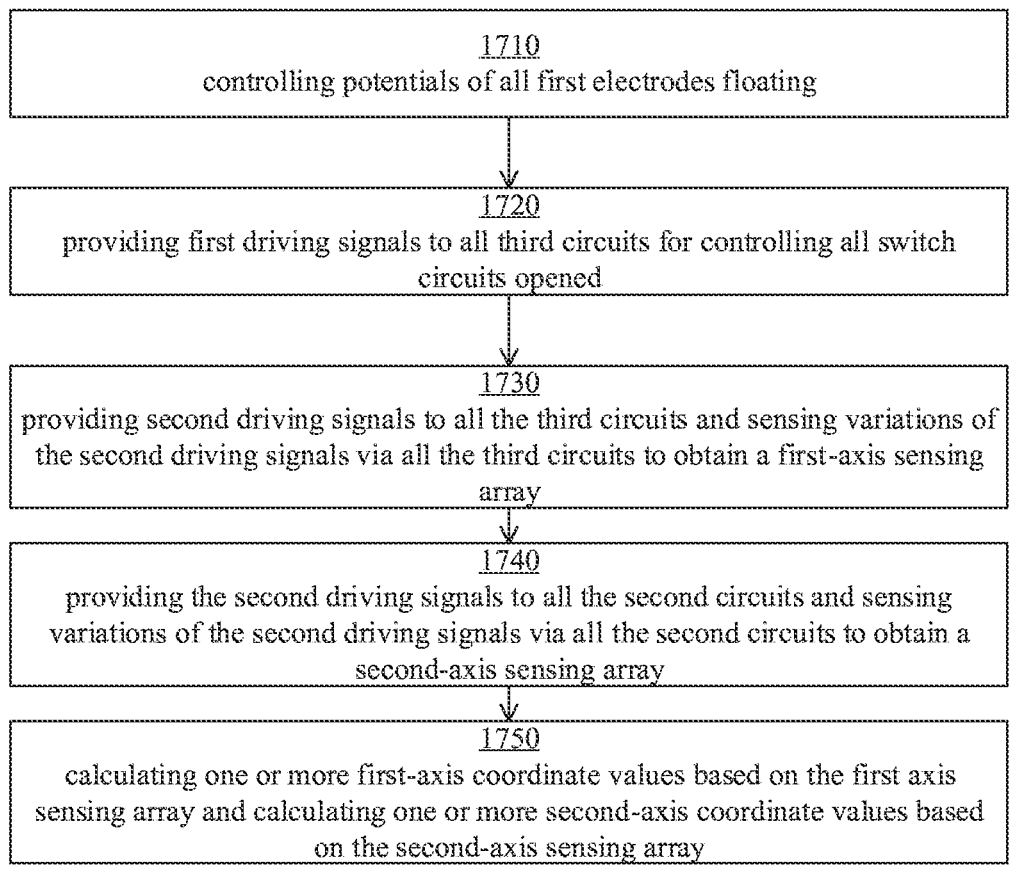
FIG. 17A depicts a flowchart diagram of a touch sensitive processing method 1700A in accordance with an embodiment of the present application.

Please refer to FIG. 17A, which depicts a flowchart diagram of a touch sensitive processing method 1700A in accordance with an embodiment of the present application. The touch sensitive processing method 1700A may be applied to the touch system 300 as shown in FIG. 3, especially applicable to the processor module 314 of the touch sensitive processing apparatus 310. The processor module 314 may execute the instructions and data stored in non-volatile memories to realize the touch sensitive processing method 1700A. If there is no causal relation between any two steps, the present application does not limit the execution sequence of these two steps.

By utilizing self-capacitance sensing principle, the touch sensitive processing method 1700A have potentials of the first circuits above the second circuits, the second electrodes and the third circuits floating. In case that an external object approaches, the second circuits and the third circuits would be influenced. Hence, one or more coordinate values of an axis may be calculated based on the self-capacitance sensing results corresponding to all the second circuits. Another one or more coordinate values of another axis may be calculated based on the self-capacitance sensing results corresponding to all the third circuits. The touch sensitive processing method 1700A begins at step 1710A. The execution time periods of steps 1730 and 1740 may be duplicated.

Step 1710: controlling potentials of all first electrodes floating.

Step 1720: providing first driving signals to all third circuits for controlling all switch circuits opened.

Step 1730: providing second driving signals to all the third circuits and sensing variations of the second driving signals via all the third circuits to obtain a first-axis sensing array. The frequency of the second driving signals does not affect the open state or the close state of the switch circuits.

Step 1740: providing the second driving signals to all the second circuits and sensing variations of the second driving signals via all the second circuits to obtain a second-axis sensing array.

Step 1750: calculating one or more first-axis coordinate values based on the first axis sensing array and calculating one or more second-axis coordinate values based on the second-axis sensing array.

Figure 17B:
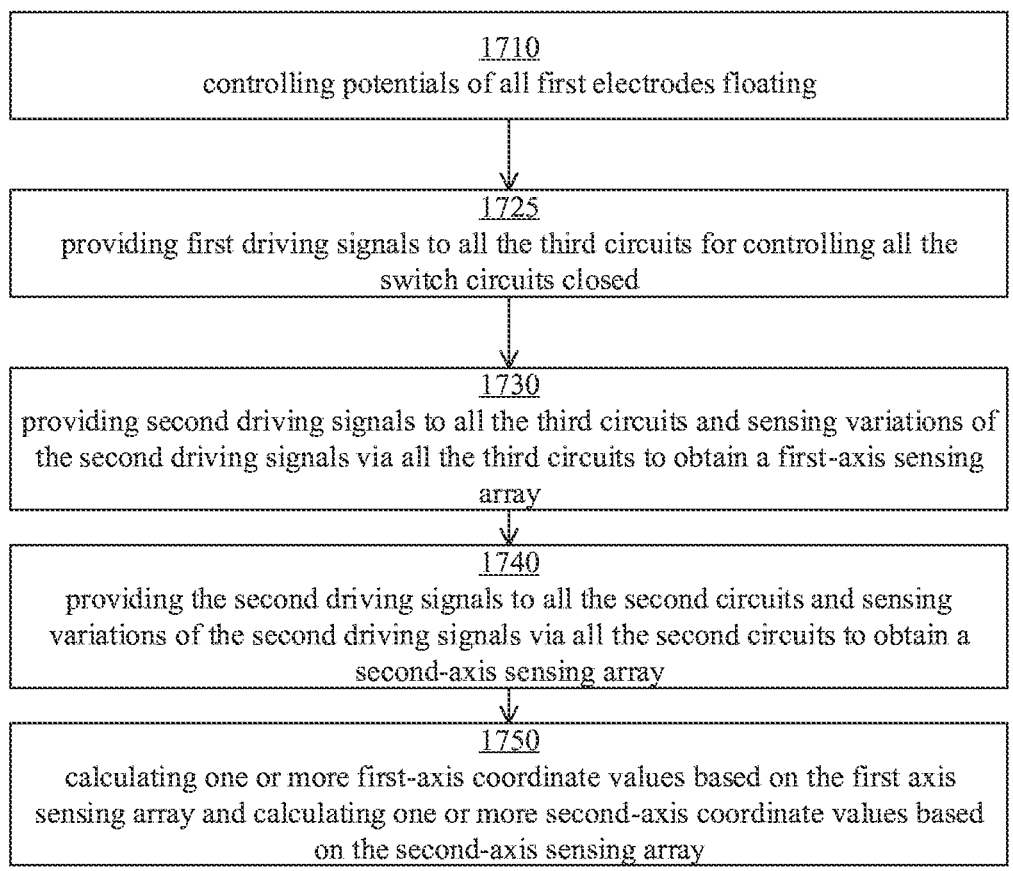
FIG. 17B depicts a flowchart diagram of a touch sensitive processing method 1700B in accordance with an embodiment of the present application.

Please refer to FIG. 17B, which depicts a flowchart diagram of a touch sensitive processing method 1700B in accordance with an embodiment of the present application. The embodiment as shown in FIG. 17B is a variant of the embodiment as shown in FIG. 17A. The difference is that step 1720 is replaced by step 1725.

Step 1725: providing first driving signals to all the third circuits for controlling all the switch circuits closed, i.e., the second electrodes are further included in additional to the second circuits for the sensing at step 1740.

Figure 17C:
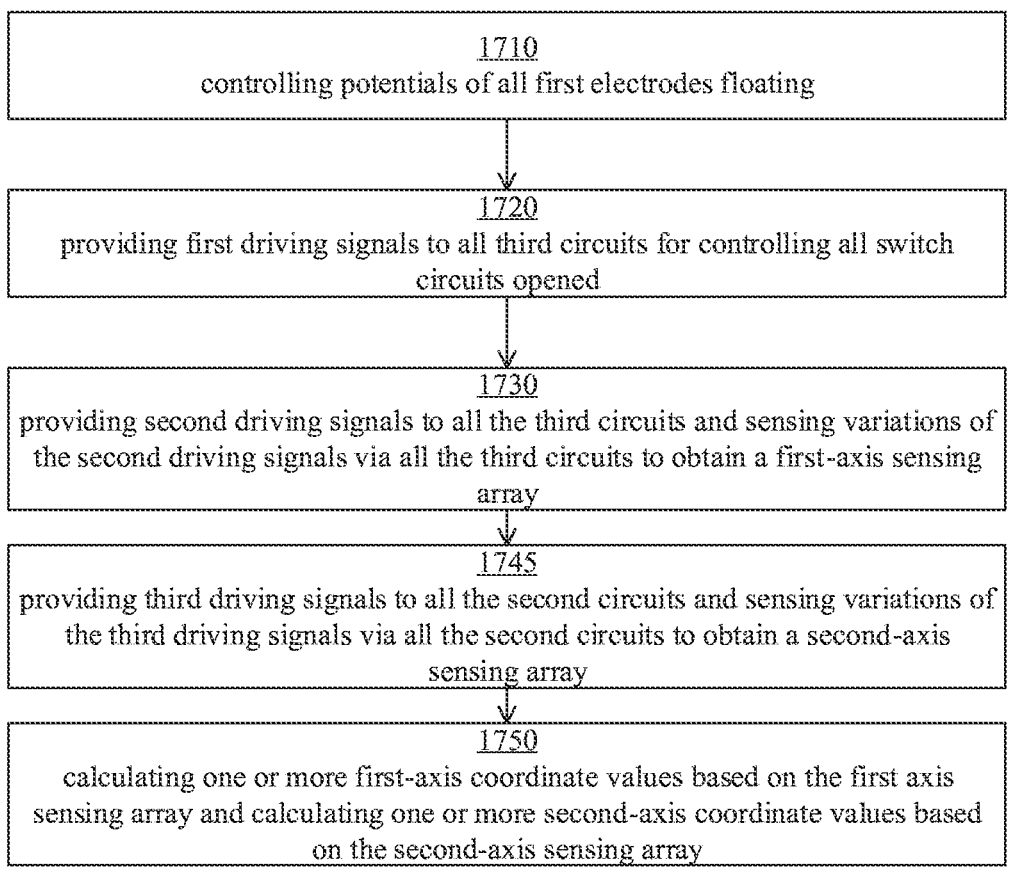
FIG. 17C depicts a flowchart diagram of a touch sensitive processing method 1700C in accordance with an embodiment of the present application.

Please refer to FIG. 17C, which depicts a flowchart diagram of a touch sensitive processing method 1700C in accordance with an embodiment of the present application. The embodiment as shown in FIG. 17C is a variant of the embodiment as shown in FIG. 17A. The difference is that step 1740 is replaced by step 1745.

Step 1745: providing third driving signals to all the second circuits and sensing variations of the third driving signals via all the second circuits to obtain a second-axis sensing array. In order to prevent interferences when applying the same second driving signals to the second and the third circuits, different driving signals may be applied to the second and the third circuits. For examples, the applied different driving signals may have different frequencies in order to lower electromagnetic interferences and to increase sensing accuracy.

In various embodiments provided by the present application, the sensing of the pressure values depends on variations of distance in between the first electrodes and their underlying second electrodes at the points of pressure; and the sensing of the approaching or touching values relies on the interruptions of electric field lines originated from adjacent first electrodes near the points of approaching or touching to the second electrodes underlying the points of approaching or touching. The capacitance variations corresponding to these two kinds of sensing may not be in the same magnitude of order. Thus, the amplification gain value of the sensing circuit module 313 when sensing the pressure value may be different from the one when sensing the approaching or touching value. In other words, the amplification gain values corresponding to adjacent second circuits may be different in the embodied touch sensitive processing methods 700, 900, 1400 and 1600. Similarly, the amplification gain values for sensing the driving signals may be different to the ones for sensing the electrical signals.

A summary and comparison table of the embodiments provided by the present application is shown below:

| | | Resolution | | | |
|---|---|---|---|---|---|
| FIG. | Numeral | Pressure | Approaching or touching | Transmitter | Features |
| 4 | 400 | High | | | calculating points of pressure according to a full-sized pressure value image |
| 5 | 500 | Low | | | calculating points of pressure according to an interlace pressure value image corresponding to designated non-adjacent $1^{st}$ electrodes |
| 6 | 600 | | Low | | calculating points of approaching or touching according to an interlace approaching or touching value image corresponding to designated non-adjacent $1^{st}$ electrodes |
| 7 | 700 | Low | Low | | calculating points of pressure and points of approaching or touching according to an interlace pressure value image and an interlace approaching or touching value image corresponding to designated non-adjacent $1^{st}$ electrodes, respectively |
| 8A | 800A | High | High | | gathering complemented interlace pressure value images and complemented interlace approaching or touching value images; composing a full-sized pressure value image and a full-sized approaching or touching value image in a pipeline; and calculating points of pressure and points of approaching or touching, respectively. |

-continued

| FIG. | Numeral | Resolution | | Transmitter | Features |
| | | Pressure | Approaching or touching | | |
|---|---|---|---|---|---|
| 8B | 800B | High | High | | see above |
| 9A and 9B | 900 | High | High | | see above |
| 10 | 1000 | | | High | calculating positions of transmitters according to a full-sized electrical signal value image |
| 11 | 1100 | High | | High | calculating points of pressure and positions of transmitters according to a full-sized pressure value image and a full-sized electrical signal value image, respectively |
| 12 | 1200 | Low | | High | calculating points of pressure according to an interlace pressure value image corresponding to designated non-adjacent $1^{st}$ electrodes; and calculating positions of transmitters according to a full-sized electrical signal value image |
| 13 | 1300 | | Low | High | calculating points of approaching or touching according to an interlace approaching or touching value image corresponding to designated non-adjacent $1^{st}$ electrodes; and calculating positions of transmitters according to a full-sized electrical signal value image |
| 14 | 1400 | Low | Low | High | calculating points of pressure and points of approaching or touching according to an interlace pressure value image and an interlace approaching or touching value image corresponding to designated non-adjacent $1^{st}$ electrodes, respectively; and calculating positions of transmitters according to a full-sized electrical signal value image |
| 15A | 1500A | High | High | High | gathering complemented interlace pressure value images and complemented interlace approaching or touching value images and full-sized electrical signal value image; calculating and reporting positions of transmitter; composing a full-sized pressure value image and a full-sized approaching or touching value image in a pipeline; and calculating points of pressure and points of approaching or touching, respectively. |
| 15B | 1500B | High | High | High | See above |
| 16A and 16B | 1600 | High | High | High | See above |
| 17A | 1700A | | High | | performing self-capacitance sensing via $2^{nd}$ circuits and $3^{rd}$ circuits, respectively, for two axes |

| FIG. | Numeral | Resolution Pressure | Approaching or touching | Transmitter | Features |
|---|---|---|---|---|---|
| 17B | 1700B | | High | | performing self-capacitance sensing via $2^{nd}$ circuits and $2^{nd}$ electrodes and $3^{rd}$ circuits, respectively, for two axes |
| 17C | 1700C | | High | | performing self-capacitance sensing via $2^{nd}$ circuits and $3^{rd}$ circuits by different driving signals, respectively, for two axes |

According to one embodiment of the present application, a touch panel is provided. The touch panel sequentially comprising: a first electrode layer, which comprises multiple first electrodes in parallel to a first axis; an elastic dielectric layer; and a second structure, which further comprises: multiple second circuits in parallel to the first axis; multiple third circuits in parallel to a second axis; multiple second electrodes; and multiple switch circuits, wherein that each of the switch circuits is coupled to one of the second electrodes and one of the second circuits, wherein that each of the switch circuits is configured to be selectively closed or opened according to signals transmitted from one of the third circuits, wherein each of the first electrodes covers on top of one of the second circuits and the switch circuits and the second electrodes which are coupled to the one of the second circuits.

Preferably, in order to reduce thickness of the touch panel or to increase transparency of the touch panel, wherein the second structure comprises a second electrode layer, wherein the second electrodes and the second circuits are arranged on a first surface of the second electrode layer, wherein the third circuits and the switch circuits are arranged on a second surface of the second electrode layer, wherein the first surface is opposite to the second surface, the first surface is closer to the first electrode layer than the second surface.

Preferably, in order to provide flexible designs of touch system, which includes a flexible touch panel or screen, wherein the first electrode layer, the dielectric layer and the second structure are all flexible.

Preferably, in order to reduce manufacturing complexity and cost, wherein the second structure sequentially comprises a second electrode layer and a third electrode layer, wherein the second electrode layer further comprises the second circuits and the second electrodes, wherein the third electrode layer further comprises the third circuits and the switch circuits, wherein the second electrode layer is closer to the first electrode layer than the third electrode layer.

According to an embodiment of the present application, a touch sensitive processing method is provided. Applicable to the touch panel, the touch sensitive processing method comprising: performing multiple pressure value array sensing steps corresponding to each of the third circuits, wherein the pressure value array sensing step further comprises: controlling the switch circuits coupled to the corresponding third circuit being closed and controlling the switch circuits which are not coupled to the corresponding third circuit being opened; providing driving signals to at least a part of the first electrodes; and sensing the induced driving signals via the second circuits which are covered by the first electrodes which are being provided with the driving signals, respectively, to get a pressure value array; composing a pressure value image by all the pressure value arrays according to positions of the third circuits corresponding to the pressure value arrays; and calculating one or more points of pressure according to the pressure value image.

Preferably, in order to provide a pressure value corresponding to the point of pressure, the touch sensitive processing method further comprises: calculating a pressure value corresponding to each of the points of pressure according to the pressure value image.

Preferably, in order to provide points of pressure in lower resolution, wherein any given two of the first electrodes being provided with the driving signals are not adjacent to each other.

Preferably, in order to provide points of pressure in highest resolution, wherein the first electrodes being provided with the driving signals are all the first electrodes.

Preferably, in order to simultaneously provide a position of active stylus corresponding to the touch panel, wherein the pressure value array sensing step further comprises: sensing electrical signals via the second circuits, respectively, to get an electrical signal value array, wherein the electrical signals and the driving signals have different frequencies, the touch sensitive processing method further comprises composing an electrical signal value image based on all the electrical signal value arrays according to positions of the third circuits corresponding to the electrical signal value arrays; and calculating one or more positions of transmitters according to the electrical signal value image.

According to an embodiment of the present application, a touch sensitive processing method is provided. Applicable to the touch panel, the touch sensitive processing method comprising: performing multiple approaching or touching value array sensing steps corresponding to each of the third circuits, wherein the pressure value array sensing step further comprises: controlling the switch circuits coupled to the corresponding third circuit being closed and controlling the switch circuits which are not coupled to the corresponding third circuit being opened; providing driving signals to at least a part of the first electrodes; and sensing the induced driving signals via the second circuits which are covered by the first electrodes which are not being provided with the driving signals, respectively, to get an interlace approaching or touching value array; composing an interlace approaching or touching value image by all the interlace approaching or touching value arrays according to positions of the third circuits corresponding to the interlace approaching or touching value arrays; and calculating one or more points of approaching or touching according to the interlace approaching or touching value image.

Preferably, in order to provide a pressure value corresponding to the point of approaching or touching, the touch sensitive processing method further comprises calculating a pressure value corresponding to each of the points of approaching or touching according to the interlace approaching or touching value image.

Preferably, in order to provide points of pressure in lower resolution, wherein any given two of the first electrodes being provided with the driving signals are not adjacent to each other.

Preferably, in order to simultaneously provide a position of active stylus corresponding to the touch panel, wherein the approaching or touching value array sensing step further comprises: sensing electrical signals via the second circuits, respectively, to get an electrical signal value array, wherein the electrical signals and the driving signals have different frequencies, the touch sensitive processing method further comprises composing an electrical signal value image based on all the electrical signal value arrays according to positions of the third circuits corresponding to the electrical signal value arrays; and calculating one or more positions of transmitters according to the electrical signal value image.

According to an embodiment of the present application, a touch sensitive processing method is provided. Applicable to the touch panel, the touch sensitive processing method, comprising: performing multiple sensing steps corresponding to each of the third circuits, wherein the sensing step further comprises: controlling the switch circuits coupled to the corresponding third circuit being closed and controlling the switch circuits which are not coupled to the corresponding third circuit being opened; providing driving signals to at least a part of the first electrodes; sensing the induced driving signals via the second circuits which are covered by the first electrodes which are being provided with the driving signals, respectively, to get an interlace pressure value array; sensing the induced driving signals via the second circuits which are covered by the first electrodes which are not being provided with the driving signals, respectively, to get an interlace approaching or touching value array; composing an interlace pressure value image by all the interlace pressure value arrays according to positions of the third circuits corresponding to the interlace pressure value arrays; composing an interlace approaching or touching value image by all the interlace approaching or touching value arrays according to positions of the third circuits corresponding to the interlace approaching or touching value arrays; calculating one or more points of pressure according to the interlace pressure value image; and calculating one or more points of approaching or touching according to the interlace approaching or touching value image.

Preferably, in order to provide a pressure value corresponding to the point of pressure and a pressure value corresponding to the point of approaching or touching, the touch sensitive processing method further comprises: calculating a pressure value corresponding to each of the points of pressure according to the interlace pressure value image; and calculating a pressure value corresponding to each of the points of approaching or touching according to the interlace approaching or touching value image.

Preferably, in order to provide points of pressure and points of approaching or touching in lower resolution, wherein any given two of the first electrodes being provided with the driving signals are not adjacent to each other.

Preferably, in order to make resolutions of the points of pressure and points of approaching or touching similar, wherein an absolute value of a difference of a number of the elements of the interlace approaching or touching value array and a number of the elements of the interlace pressure value array is zero or one.

Preferably, in order to simultaneously provide a position of active stylus corresponding to the touch panel, wherein the sensing step further comprises: sensing electrical signals via the second circuits, respectively, to get an electrical signal value array, wherein the electrical signals and the driving signals have different frequencies, the touch sensitive processing method further comprises composing an electrical signal value image based on all the electrical signal value arrays according to positions of the third circuits corresponding to the electrical signal value arrays; and calculating one or more positions of transmitters according to the electrical signal value image.

According to an embodiment of the present application, a touch sensitive processing method is provided. Applicable to the touch panel, the touch sensitive processing method, comprising: setting a positive number i as 1, designating multiple non-adjacent ones of the first electrodes as a first set, designating rest of the first electrodes as a second set, performing multiple interlace image sensing steps, wherein an i-th interlace image sensing step of the interlace image sensing steps comprises performing multiple sensing steps corresponding to each of the third circuits, wherein the sensing step further comprises: controlling the switch circuits coupled to the corresponding third circuit being closed and controlling the switch circuits which are not coupled to the corresponding third circuit being opened; providing driving signals to the first set; sensing the induced driving signals via the second circuits which are covered by the first electrodes which are being provided with the driving signals, respectively, to get an interlace pressure value array; sensing the induced driving signals via the second circuits which are covered by the first electrodes which are not being provided with the driving signals, respectively, to get an interlace approaching or touching value array; composing an i-th interlace pressure value image by all the interlace pressure value arrays according to positions of the third circuits corresponding to the interlace pressure value arrays; composing an i-th interlace approaching or touching value image by all the interlace approaching or touching value arrays according to positions of the third circuits corresponding to the interlace approaching or touching value arrays; increasing the positive integer i by 1 and exchanging the first set and the second set; and when value of the positive integer i is larger than 2, forming a complete pressure value image based on an (i−1)-th interlace pressure value image and an (i−2)-th interlace pressure value image and forming a complete approaching or touching value image based on an (i−1)-th interlace approaching or touching value image and an (i−2)-th interlace approaching or touching value image; calculating one or more points of pressure according to the pressure value image; and calculating one or more points of approaching or touching according to the approaching or touching value image.

Preferably, in order to provide a pressure value corresponding to the point of pressure and a pressure value corresponding to the point of approaching or touching, the touch sensitive processing method further comprises: calculating a pressure value corresponding to each of the points of pressure according to the pressure value image; and calculating a pressure value corresponding to each of the points of approaching or touching according to the approaching or touching value image.

Preferably, in order to make resolutions of the points of pressure and points of approaching or touching similar, wherein an absolute value of a difference of a number of the elements of the interlace approaching or touching value array and a number of the elements of the interlace pressure value array is zero or one.

Preferably, in order to simultaneously provide a position of active stylus corresponding to the touch panel, wherein the sensing step further comprises: sensing electrical signals via the second circuits, respectively, to get an electrical signal value array, wherein the electrical signals and the driving signals have different frequencies, wherein the i-th interlace image sensing step further comprises composing an electrical signal value image based on all the electrical signal value arrays according to positions of the third circuits corresponding to the electrical signal value arrays; and calculating one or more positions of transmitters according to the electrical signal value image.

According to an embodiment of the present application, a touch sensitive processing method is provided. Applicable to the touch panel, the touch sensitive processing method, comprising: performing multiple electrical signal value array sensing steps corresponding to each of the third circuits, wherein the electrical signal value array sensing step further comprises: controlling the switch circuits coupled to the corresponding third circuit being closed and controlling the switch circuits which are not coupled to the corresponding third circuit being opened; sensing electrical signals via the second circuits, respectively, to get an electrical signal value array; composing an electrical signal value image based on all the electrical signal value arrays according to positions of the third circuits corresponding to the electrical signal value arrays; and calculating one or more positions of transmitters according to the electrical signal value image.

According to an embodiment of the present application, a touch sensitive processing method is provided. Applicable to the touch panel, the touch sensitive processing method, comprising: controlling potentials of all the first electrodes floating; providing first driving signals to all the third circuits so as that all the switch circuits being opened; providing second driving signals to all the third circuits and sensing variations of the second driving signals on each of the third circuits to get a first axis sensing array; providing the second driving signals to all the second circuits and sensing variations of the second driving signals on each of the second circuits to get a second axis sensing array; calculating one or more first axis coordinate values corresponding to one or more external conductive objects according to the first axis sensing array; and calculating one or more second axis coordinate values corresponding to the one or more external conductive objects according to the second axis sensing array.

According to an embodiment of the present application, a touch sensitive processing method is provided. Applicable to the touch panel, the touch sensitive processing method, comprising: controlling potentials of all the first electrodes floating; providing first driving signals to all the third circuits so as that all the switch circuits being closed; providing second driving signals to all the third circuits and sensing variations of the second driving signals on each of the third circuits to get a first axis sensing array; providing the second driving signals to all the second circuits and sensing variations of the second driving signals on each of the second circuits to get a second axis sensing array; calculating one or more first axis coordinate values corresponding to one or more external conductive objects according to the first axis sensing array; and calculating one or more second axis coordinate values corresponding to the one or more external conductive objects according to the second axis sensing array.

According to an embodiment of the present application, a touch sensitive processing method is provided. Applicable to the touch panel, the touch sensitive processing method, comprising: controlling potentials of all the first electrodes floating; providing first driving signals to all the third circuits so as that all the switch circuits being opened; providing second driving signals to all the third circuits and sensing variations of the second driving signals on each of the third circuits to get a first axis sensing array; providing third driving signals to all the second circuits and sensing variations of the third driving signals on each of the second circuits to get a second axis sensing array; calculating one or more first axis coordinate values corresponding to one or more external conductive objects according to the first axis sensing array; and calculating one or more second axis coordinate values corresponding to the one or more external conductive objects according to the second axis sensing array.

According to an embodiment of the present application, a touch sensitive processing method is provided. Applicable to the touch panel, the touch sensitive processing method, comprising: controlling potentials of all the first electrodes floating; providing first driving signals to all the third circuits so as that all the switch circuits being closed; providing second driving signals to all the third circuits and sensing variations of the second driving signals on each of the third circuits to get a first axis sensing array; providing third driving signals to all the second circuits and sensing variations of the third driving signals on each of the second circuits to get a second axis sensing array; calculating one or more first axis coordinate values corresponding to one or more external conductive objects according to the first axis sensing array; and calculating one or more second axis coordinate values corresponding to the one or more external conductive objects according to the second axis sensing array.

According to an embodiment of the present application, a touch sensitive processing apparatus is provided. Applicable to the touch panel, the touch sensitive processing apparatus comprising: an interconnection network for connecting the first electrodes, the second circuits, and the third circuits, respectively; a driving circuit for connecting to the interconnection network; a sensing circuit for connecting to the interconnection network; and a processor, configured to execute instructions stored in a non-volatile memory for: performing multiple pressure value array sensing steps corresponding to each of the third circuits, wherein the pressure value array sensing step further comprises: controlling the switch circuits coupled to the corresponding third circuit being closed and controlling the switch circuits which are not coupled to the corresponding third circuit being opened; providing driving signals to at least a part of the first electrodes; and sensing the induced driving signals via the second circuits which are covered by the first electrodes which are being provided with the driving signals, respectively, to get a pressure value array; composing a pressure value image by all the pressure value arrays according to positions of the third circuits corresponding to the pressure value arrays; and calculating one or more points of pressure according to the pressure value image.

Preferably, in order to provide a pressure value corresponding to the point of pressure, the processor is further configured for calculating a pressure value corresponding to each of the points of pressure according to the pressure value image.

Preferably, in order to provide points of pressure in lower resolution, wherein any given two of the first electrodes being provided with the driving signals are not adjacent to each other.

Preferably, in order to provide points of pressure in highest resolution, wherein the first electrodes being provided with the driving signals are all the first electrodes.

Preferably, the processor is further configured for reporting the one or more points of pressure to a host.

Preferably, in order to simultaneously provide a position of active stylus corresponding to the touch panel, wherein the pressure value array sensing step further comprises: sensing electrical signals via the second circuits, respectively, to get an electrical signal value array, wherein the electrical signals and the driving signals have different frequencies, the processor is further configured for: composing an electrical signal value image based on all the electrical signal value arrays according to positions of the third circuits corresponding to the electrical signal value arrays; and calculating one or more positions of transmitters according to the electrical signal value image.

Preferably, the processor is further configured for reporting the one or more positions of transmitters to a host.

According to an embodiment of the present application, a touch sensitive processing apparatus is provided. Applicable to the touch panel, the touch sensitive processing apparatus comprising: an interconnection network for connecting the first electrodes, the second circuits, and the third circuits, respectively; a driving circuit for connecting to the interconnection network; a sensing circuit for connecting to the interconnection network; and a processor, configured to execute instructions stored in a non-volatile memory for: performing multiple approaching or touching value array sensing steps corresponding to each of the third circuits, wherein the approaching or touching value array sensing step further comprises: controlling the switch circuits coupled to the corresponding third circuit being closed and controlling the switch circuits which are not coupled to the corresponding third circuit being opened; providing driving signals to at least a part of the first electrodes; and sensing the induced driving signals via the second circuits which are covered by the first electrodes which are not being provided with the driving signals, respectively, to get an interlace approaching or touching value array; composing an interlace approaching or touching value image by all the interlace approaching or touching value arrays according to positions of the third circuits corresponding to the interlace approaching or touching value arrays; and calculating one or more points of approaching or touching according to the interlace approaching or touching value image.

Preferably, in order to provide a pressure value corresponding to the point of approaching or touching, the processor is further configured for calculating a pressure value corresponding to each of the points of approaching or touching according to the interlace approaching or touching value image.

Preferably, in order to provide points of approaching or touching in lower resolution, wherein any given two of the first electrodes being provided with the driving signals are not adjacent to each other.

Preferably, wherein the processor is further configured for reporting the one or more points of pressure and the one or more points of approaching or touching to a host.

Preferably, in order to simultaneously provide a position of active stylus corresponding to the touch panel, wherein the sensing step further comprises: sensing electrical signals via the second circuits, respectively, to get an electrical signal value array, wherein the electrical signals and the driving signals have different frequencies, the processor is further configured for: composing an electrical signal value image based on all the electrical signal value arrays according to positions of the third circuits corresponding to the electrical signal value arrays; and calculating one or more positions of transmitters according to the electrical signal value image.

Preferably, wherein the processor is further configured for reporting the one or more positions of transmitters to a host.

According to an embodiment of the present application, a touch sensitive processing apparatus is provided. Applicable to the touch panel, the touch sensitive processing apparatus comprising: an interconnection network for connecting the first electrodes, the second circuits, and the third circuits, respectively; a driving circuit for connecting to the interconnection network; a sensing circuit for connecting to the interconnection network; and a processor, configured to execute instructions stored in a non-volatile memory for: performing multiple sensing steps corresponding to each of the third circuits, wherein the sensing step further comprises: controlling the switch circuits coupled to the corresponding third circuit being closed and controlling the switch circuits which are not coupled to the corresponding third circuit being opened; providing driving signals to at least a part of the first electrodes; sensing the induced driving signals via the second circuits which are covered by the first electrodes which are being provided with the driving signals, respectively, to get an interlace pressure value array; and sensing the induced driving signals via the second circuits which are covered by the first electrodes which are not being provided with the driving signals, respectively, to get an interlace approaching or touching value array; composing an interlace pressure value image by all the interlace pressure value arrays according to positions of the third circuits corresponding to the interlace pressure value arrays; composing an interlace approaching or touching value image by all the interlace approaching or touching value arrays according to positions of the third circuits corresponding to the interlace approaching or touching value arrays; calculating one or more points of pressure according to the interlace pressure value image; and calculating one or more points of approaching or touching according to the interlace approaching or touching value image.

Preferably, in order to provide a pressure value corresponding to the point of pressure and a pressure value corresponding to the point of approaching or touching, the processor is further configured for calculating a pressure value corresponding to each of the points of pressure according to the interlace pressure value image; and calculating a pressure value corresponding to each of the points of approaching or touching according to the interlace approaching or touching value image.

Preferably, in order to provide points of pressure and points of approaching or touching in lower resolution, wherein any given two of the first electrodes being provided with the driving signals are not adjacent to each other.

Preferably, in order to make resolutions of the point of approaching or touching and the point of pressure similar, wherein an absolute value of a difference of a number of the elements of the interlace approaching or touching value array and a number of the elements of the interlace pressure value array is zero or one.

Preferably, the processor is further configured for reporting the one or more points of pressure and the one or more points of approaching or touching to a host.

Preferably, in order to simultaneously provide a position of active stylus corresponding to the touch panel, wherein the sensing step further comprises: sensing electrical signals via the second circuits, respectively, to get an electrical signal value array, wherein the electrical signals and the driving signals have different frequencies, the processor is further configured for: composing an electrical signal value image based on all the electrical signal value arrays according to positions of the third circuits corresponding to the electrical signal value arrays; and calculating one or more positions of transmitters according to the electrical signal value image.

Preferably, wherein the processor is further configured for reporting the one or more positions of transmitters to a host.

According to an embodiment of the present application, a touch sensitive processing apparatus is provided. Applicable to the touch panel, the touch sensitive processing apparatus comprising: an interconnection network for connecting the first electrodes, the second circuits, and the third circuits, respectively; a driving circuit for connecting to the interconnection network; a sensing circuit for connecting to the interconnection network; and a processor, configured to execute instructions stored in a non-volatile memory for: setting a positive number i as 1, designating multiple non-adjacent ones of the first electrodes as a first set, designating rest of the first electrodes as a second set, performing multiple interlace image sensing steps, wherein an i-th interlace image sensing step of the interlace image sensing steps comprises performing multiple sensing steps corresponding to each of the third circuits, wherein the sensing step further comprises: controlling the switch circuits coupled to the corresponding third circuit being closed and controlling the switch circuits which are not coupled to the corresponding third circuit being opened; providing driving signals to the first set; sensing the induced driving signals via the second circuits which are covered by the first electrodes which are being provided with the driving signals, respectively, to get an interlace pressure value array; sensing the induced driving signals via the second circuits which are covered by the first electrodes which are not being provided with the driving signals, respectively, to get an interlace approaching or touching value array; composing an i-th interlace pressure value image by all the interlace pressure value arrays according to positions of the third circuits corresponding to the interlace pressure value arrays; composing an i-th interlace approaching or touching value image by all the interlace approaching or touching value arrays according to positions of the third circuits corresponding to the interlace approaching or touching value arrays; increasing the positive integer i by 1 and exchanging the first set and the second set; and when value of the positive integer i is larger than 2, forming a complete pressure value image based on an (i−1)-th interlace pressure value image and an (i−2)-th interlace pressure value image and forming a complete approaching or touching value image based on an (i−1)-th interlace approaching or touching value image and an (i−2)-th interlace approaching or touching value image; calculating one or more points of pressure according to the pressure value image; and calculating one or more points of approaching or touching according to the approaching or touching value image.

Preferably, in order to provide a pressure value corresponding to the point of pressure and a pressure value corresponding to the point of approaching or touching, wherein the i-th interlace image sensing step further comprises: calculating a pressure value corresponding to each of the points of pressure according to the pressure value image; and calculating a pressure value corresponding to each of the points of approaching or touching according to the approaching or touching value image.

Preferably, in order to make resolutions of the points of pressure and points of approaching or touching similar, wherein an absolute value of a difference of a number of the elements of the interlace approaching or touching value array and a number of the elements of the interlace pressure value array is zero or one.

Preferably, wherein the processor is further configured for reporting the one or more points of pressure and the points of approaching or touching to a host.

Preferably, in order to simultaneously provide a position of active stylus corresponding to the touch panel, wherein the sensing step further comprises: sensing electrical signals via the second circuits, respectively, to get an electrical signal value array, wherein the electrical signals and the driving signals have different frequencies, the i-th interlace image sensing step further comprises: composing an electrical signal value image based on all the electrical signal value arrays according to positions of the third circuits corresponding to the electrical signal value arrays; and calculating one or more positions of transmitters according to the electrical signal value image.

Preferably, wherein the processor is further configured for reporting the one or more positions of transmitters to a host.

According to an embodiment of the present application, a touch sensitive processing apparatus is provided. Applicable to the touch panel, the touch sensitive processing apparatus, comprising: an interconnection network for connecting the first electrodes, the second circuits, and the third circuits, respectively; a driving circuit for connecting to the interconnection network; a sensing circuit for connecting to the interconnection network; and a processor, configured to execute instructions stored in a non-volatile memory for: performing multiple electrical signal value array sensing steps corresponding to each of the third circuits, wherein the electrical signal value array sensing step further comprises: controlling the switch circuits coupled to the corresponding third circuit being closed and controlling the switch circuits which are not coupled to the corresponding third circuit being opened; sensing electrical signals via the second circuits, respectively, to get an electrical signal value array; composing an electrical signal value image based on all the electrical signal value arrays according to positions of the third circuits corresponding to the electrical signal value arrays; and calculating one or more positions of transmitters according to the electrical signal value image.

Preferably, wherein the processor is further configured for reporting the one or more positions of transmitters to a host.

According to an embodiment of the present application, a touch sensitive processing apparatus is provided. Applicable to the touch panel, the touch sensitive processing apparatus, comprising: an interconnection network for connecting the first electrodes, the second circuits, and the third circuits, respectively; a driving circuit for connecting to the interconnection network; a sensing circuit for connecting to the interconnection network; and a processor, configured to execute instructions stored in a non-volatile memory for: controlling potentials of all the first electrodes floating; providing first driving signals to all the third circuits so as that all the switch circuits being opened; providing second driving signals to all the third circuits and sensing variations of the second driving signals on each of the third circuits to get a first axis sensing array; providing the second driving signals to all the second circuits and sensing variations of the second driving signals on each of the second circuits to get a second axis sensing array; calculating one or more first axis coordinate values corresponding to one or more external conductive objects according to the first axis sensing array; and calculating one or more second axis coordinate values corresponding to the one or more external conductive objects according to the second axis sensing array.

According to an embodiment of the present application, a touch sensitive processing apparatus is provided. Applicable to the touch panel, the touch sensitive processing apparatus, comprising: an interconnection network for connecting the first electrodes, the second circuits, and the third circuits, respectively; a driving circuit for connecting to the interconnection network; a sensing circuit for connecting to the interconnection network; and a processor, configured to execute instructions stored in a non-volatile memory for: controlling potentials of all the first electrodes floating; providing first driving signals to all the third circuits so as that all the switch circuits being closed; providing second driving signals to all the third circuits and sensing variations of the second driving signals on each of the third circuits to get a first axis sensing array; providing the second driving signals to all the second circuits and sensing variations of the second driving signals on each of the second circuits to get a second axis sensing array; calculating one or more first axis coordinate values corresponding to one or more external conductive objects according to the first axis sensing array; and calculating one or more second axis coordinate values corresponding to the one or more external conductive objects according to the second axis sensing array.

According to an embodiment of the present application, a touch sensitive processing apparatus is provided. Applicable to the touch panel, the touch sensitive processing apparatus, comprising: an interconnection network for connecting the first electrodes, the second circuits, and the third circuits, respectively; a driving circuit for connecting to the interconnection network; a sensing circuit for connecting to the interconnection network; and a processor, configured to execute instructions stored in a non-volatile memory for: controlling potentials of all the first electrodes floating; providing first driving signals to all the third circuits so as that all the switch circuits being opened; providing second driving signals to all the third circuits and sensing variations of the second driving signals on each of the third circuits to get a first axis sensing array; providing third driving signals to all the second circuits and sensing variations of the third driving signals on each of the second circuits to get a second axis sensing array; calculating one or more first axis coordinate values corresponding to one or more external conductive objects according to the first axis sensing array; and calculating one or more second axis coordinate values corresponding to the one or more external conductive objects according to the second axis sensing array.

According to an embodiment of the present application, a touch sensitive processing apparatus is provided. Applicable to the touch panel, the touch sensitive processing apparatus, comprising: an interconnection network for connecting the first electrodes, the second circuits, and the third circuits, respectively; a driving circuit for connecting to the interconnection network; a sensing circuit for connecting to the interconnection network; and a processor, configured to execute instructions stored in a non-volatile memory for: controlling potentials of all the first electrodes floating; providing first driving signals to all the third circuits so as that all the switch circuits being closed; providing second driving signals to all the third circuits and sensing variations of the second driving signals on each of the third circuits to get a first axis sensing array; providing third driving signals to all the second circuits and sensing variations of the third driving signals on each of the second circuits to get a second axis sensing array; calculating one or more first axis coordinate values corresponding to one or more external conductive objects according to the first axis sensing array; and calculating one or more second axis coordinate values corresponding to the one or more external conductive objects according to the second axis sensing array.

Preferably, the processor is further configured for reporting the one or more first axis coordinate values and one or more second axis coordinate values to a host.

According to an embodiment of the present application, a touch system is provided. The touch system comprises aforementioned touch panel, touch sensitive processing apparatus and host.

One object of the present application is to provide a structure of touch panel. Based on the provided structure, it may use mutual-capacitance sensing principles to sense and to calculate points of pressure where external objects press on the touch panel and their pressure values or points of approaching or touching by the external objects and their possible pressure values. It may also use self-capacitance sensing principles to sense and to calculate points of approaching or touching by the external objects. Moreover, while the mutual-capacitance sensing is performed or in a time-sharing manner, it may detect positions of transmitters, such as active styli, where the transmitters sit on the touch panel.

Objects of the present application are to provide various touch sensitive processing methods applicable to the structure of touch panel. They may use mutual-capacitance sensing principles to sense and to calculate points of pressure where external objects press on the touch panel and their pressure values or points of approaching or touching by the external objects and their possible pressure values. It may also use self-capacitance sensing principles to sense and to calculate points of approaching or touching by the external objects.

One object of the present application is to detect positions of transmitters, such as active styli, where the transmitters sit on the touch panel, while the mutual-capacitance sensing is performed or in a time-sharing manner.

One of advantages provided by the present application is to use the switch circuits controlled by the third circuits to prevent or to limit electric charges of the driving signals nearby the points of pressure flow through irrelevant second circuits via the third circuits and the corresponding second circuit so as error in the sensing of induced driving signals can be reduced. Hence, points of pressure and points of approaching or touching can be calculated more precisely or more accurately based on better sensing results.

Another one of advantages provided by the present application is to provide a new structure of touch panel for measuring one or any combination of following information: 1) central points of pressure where external object press on the touch panel and their pressure values; 2) central points of approaching or touching where external object approaches or touches the touch panel; 3) central positions of transmitters where styli or board erasers, which actively transmit electrical signals, hover or touch the touch panel; and in case the entire or a large part of the touch panel is covered by conductive liquid, measuring the aforementioned 1) and 2) information.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A touch panel, sequentially comprising:
   a first electrode layer, which comprises multiple first electrodes in parallel to a first axis;
   an elastic dielectric layer; and
   a second structure, which further comprises:
      multiple second circuits in parallel to the first axis;
      multiple third circuits in parallel to a second axis;
      multiple second electrodes; and
      multiple switch circuits,
   wherein that each of the switch circuits is coupled to one of the second electrodes and one of the second circuits,
   wherein that each of the switch circuits is configured to be selectively closed or opened according to signals transmitted from one of the third circuits,
   wherein each of the first electrodes covers on top of one of the second circuits and the switch circuits and the second electrodes which are coupled to the one of the second circuits;
   wherein the second structure comprises a second electrode layer,
   wherein the second electrodes and the second circuits are arranged on a first surface of the second electrode layer,
   wherein the third circuits and the switch circuits are arranged on a second surface of the second electrode layer,
   wherein the first surface is opposite to the second surface, the first surface is closer to the first electrode layer than the second surface.

2. The touch panel of claim 1, wherein the first electrode layer, the dielectric layer, and the second structure are all flexible.

3. The touch panel of claim 1,
   wherein the second structure sequentially comprises the second electrode layer and a third electrode layer,
   wherein the second electrode layer further comprises the second circuits and the second electrodes,
   wherein the third electrode layer further comprises the third circuits and the switch circuits,
   wherein the second electrode layer is closer to the first electrode layer than the third electrode layer.

4. A touch sensitive processing method, performed on the touch panel of claim 1, comprising:
   performing multiple pressure value array sensing steps corresponding to each of the third circuits, wherein each pressure value array sensing step further comprises:
      controlling the switch circuits coupled to the corresponding third circuit being closed and controlling the switch circuits which are not coupled to the corresponding third circuit being opened;
      providing driving signals to at least a part of the first electrodes; and
      sensing the induced driving signals via the second circuits which are covered by the first electrodes which are being provided with the driving signals, respectively, to get a pressure value array;
   composing a pressure value image by all the pressure value arrays according to positions of the third circuits corresponding to the pressure value arrays; and
   calculating one or more points of pressure according to the pressure value image.

5. The touch sensitive processing method of claim 4, further comprising:
   calculating a pressure value corresponding to each of the points of pressure according to the pressure value image.

6. The touch sensitive processing method of claim 4, wherein any given two of the first electrodes being provided with the driving signals are not adjacent to each other.

7. The touch sensitive processing method of claim 4, wherein the first electrodes being provided with the driving signals are all the first electrodes.

8. The touch sensitive processing method of claim 4,
   wherein the pressure value array sensing step further comprises:
      sensing electrical signals via the second circuits, respectively, to get an electrical signal value array,
   wherein the electrical signals and the driving signals have different frequencies,
   wherein the touch sensitive processing method further comprises:
      composing an electrical signal value image based on all the electrical signal value arrays according to positions of the third circuits corresponding to the electrical signal value arrays; and
      calculating one or more positions of transmitters according to the electrical signal value image.

9. A touch sensitive processing method, performed on the touch panel of claim 1, comprising:
   performing multiple approaching or touching value array sensing steps corresponding to each of the third circuits, wherein each pressure value array sensing step further comprises:
      controlling the switch circuits coupled to the corresponding third circuit being closed and controlling the switch circuits which are not coupled to the corresponding third circuit being opened;
      providing driving signals to at least a part of the first electrodes; and
      sensing the induced driving signals via the second circuits which are covered by the first electrodes which are not being provided with the driving signals, respectively, to get an interlace approaching or touching value array;
   composing an interlace approaching or touching value image by all the interlace approaching or touching value arrays according to positions of the third circuits corresponding to the interlace approaching or touching value arrays; and
   calculating one or more points of approaching or touching according to the interlace approaching or touching value image.

10. The touch sensitive processing method of claim 9, further comprising calculating a pressure value corresponding to each of the points of approaching or touching according to the interlace approaching or touching value image.

11. The touch sensitive processing method of claim 9, wherein any given two of the first electrodes being provided with the driving signals are not adjacent to each other.

12. The touch sensitive processing method of claim 9,
wherein the approaching or touching value array sensing step further comprises:
sensing electrical signals via the second circuits, respectively, to get an electrical signal value array, wherein the electrical signals and the driving signals have different frequencies,
wherein the touch sensitive processing method further comprises:
composing an electrical signal value image based on all the electrical signal value arrays according to positions of the third circuits corresponding to the electrical signal value arrays; and
calculating one or more positions of transmitters according to the electrical signal value image.

13. A touch sensitive processing method, performed on the touch panel of claim 1, comprising:
performing multiple sensing steps corresponding to each of the third circuits, wherein each sensing step further comprises:
controlling the switch circuits coupled to the corresponding third circuit being closed and controlling the switch circuits which are not coupled to the corresponding third circuit being opened; providing driving signals to at least a part of the first electrodes;
sensing the induced driving signals via the second circuits which are covered by the first electrodes which are being provided with the driving signals, respectively, to get an interlace pressure value array; and
sensing the induced driving signals via the second circuits which are covered by the first electrodes which are not being provided with the driving signals, respectively, to get an interlace approaching or touching value array;
composing an interlace pressure value image by all the interlace pressure value arrays according to positions of the third circuits corresponding to the interlace pressure value arrays;
composing an interlace approaching or touching value image by all the interlace approaching or touching value arrays according to positions of the third circuits corresponding to the interlace approaching or touching value arrays;
calculating one or more points of pressure according to the interlace pressure value image; and
calculating one or more points of approaching or touching according to the interlace approaching or touching value image.

14. The touch sensitive processing method of claim 13, further comprising:
calculating a pressure value corresponding to each of the points of pressure according to the interlace pressure value image; and
calculating a pressure value corresponding to each of the points of approaching or touching according to the interlace approaching or touching value image.

15. The touch sensitive processing method of claim 13, wherein any given two of the first electrodes being provided with the driving signals are not adjacent to each other.

16. The touch sensitive processing method of claim 13, wherein an absolute value of a difference of a number of the elements of the interlace approaching or touching value array and a number of the elements of the interlace pressure value array is zero or one.

17. The touch sensitive processing method of claim 13, wherein each sensing step further comprises: sensing electrical signals via the second circuits, respectively, to get an electrical signal value array,
wherein the electrical signals and the driving signals have different frequencies,
wherein the touch sensitive processing method further comprises:
composing an electrical signal value image based on all the electrical signal value arrays according to positions of the third circuits corresponding to the electrical signal value arrays; and
calculating one or more positions of transmitters according to the electrical signal value image.

18. A touch sensitive processing method, performed on the touch panel of claim 1, comprising:
setting a positive number i as 1, designating multiple non-adjacent ones of the first electrodes as a first set, designating rest of the first electrodes as a second set, and performing multiple interlace image sensing steps, wherein an i-th interlace image sensing step of the interlace image sensing steps comprises:
performing multiple sensing steps corresponding to each of the third circuits, wherein each sensing step further comprises:
controlling the switch circuits coupled to the corresponding third circuit being closed and controlling the switch circuits which are not coupled to the corresponding third circuit being opened;
providing driving signals to the first set;
sensing the induced driving signals via the second circuits which are covered by the first electrodes which are being provided with the driving signals, respectively, to get an interlace pressure value array; and
sensing the induced driving signals via the second circuits which are covered by the first electrodes which are not being provided with the driving signals, respectively, to get an interlace approaching or touching value array;
composing an i-th interlace pressure value image by all the interlace pressure value arrays according to positions of the third circuits corresponding to the interlace pressure value arrays;
composing an i-th interlace approaching or touching value image by all the interlace approaching or touching value arrays according to positions of the third circuits corresponding to the interlace approaching or touching value arrays;
increasing the positive integer i by 1 and exchanging the first set and the second set, and when a value of the positive integer i is larger than 2, forming a complete pressure value image based on an (i−1)-th interlace pressure value image and an (i−2)-th interlace pressure value image and forming a complete approaching or touching value image based on an (i−1)-th interlace approaching or touching value image and an (i−2)-th interlace approaching or touching value image;
calculating one or more points of pressure according to the pressure value image; and
calculating one or more points of approaching or touching according to the approaching or touching value image.

19. The touch sensitive processing method of claim 18, wherein the i-th interlace image sensing step further comprises:
calculating a pressure value corresponding to each of the points of pressure according to the pressure value image; and
calculating a pressure value corresponding to each of the points of approaching or touching according to the approaching or touching value image.

20. The touch sensitive processing method of claim 18, wherein an absolute value of a difference of a number of the elements of the interlace approaching or touching value array and a number of the elements of the interlace pressure value array is zero or one.

21. The touch sensitive processing method of claim 18, wherein each sensing step further comprises: sensing electrical signals via the second circuits, respectively, to get an electrical signal value array,
wherein the electrical signals and the driving signals have different frequencies,
wherein the i-th interlace image sensing step further comprises:
composing an electrical signal value image based on all the electrical signal value arrays according to positions of the third circuits corresponding to the electrical signal value arrays; and
calculating one or more positions of transmitters according to the electrical signal value image.

22. A touch sensitive processing method, performed on the touch panel of claim 1, comprising:
performing multiple electrical signal value array sensing steps corresponding to each of the third circuits, wherein each electrical signal value array sensing step further comprises:
controlling the switch circuits coupled to the corresponding third circuit being closed and controlling the switch circuits which are not coupled to the corresponding third circuit being opened; and
sensing electrical signals via the second circuits, respectively, to get an electrical signal value array;
composing an electrical signal value image based on all the electrical signal value arrays according to positions of the third circuits corresponding to the electrical signal value arrays; and
calculating one or more positions of transmitters according to the electrical signal value image.

23. A touch sensitive processing apparatus, in conjunction with the touch panel of claim 1, further comprising:
an interconnection network for connecting the first electrodes, the second circuits, and the third circuits, respectively;
a driving circuit for connecting to the interconnection network;
a sensing circuit for connecting to the interconnection network; and
a processor, configured to execute instructions stored in a non-volatile memory for:
performing multiple pressure value array sensing steps corresponding to each of the third circuits, wherein each pressure value array sensing step further comprises:
controlling the switch circuits coupled to the corresponding third circuit being closed and controlling the switch circuits which are not coupled to the corresponding third circuit being opened;
providing driving signals to at least a part of the first electrodes; and
sensing the induced driving signals via the second circuits which are covered by the first electrodes which are being provided with the driving signals, respectively, to get a pressure value array;
composing a pressure value image by all the pressure value arrays according to positions of the third circuits corresponding to the pressure value arrays; and
calculating one or more points of pressure according to the pressure value image.

24. The touch sensitive apparatus of claim 23, wherein the processor is further configured for calculating a pressure value corresponding to each of the points of pressure according to the pressure value image.

25. The touch sensitive apparatus of claim 23, wherein any given two of the first electrodes being provided with the driving signals are not adjacent to each other.

26. The touch sensitive apparatus of claim 23, wherein the first electrodes being provided with the driving signals are all the first electrodes.

27. The touch sensitive apparatus of claim 23, wherein the processor is further configured for reporting the one or more points of pressure to a host.

28. The touch sensitive apparatus of claim 23,
wherein the pressure value array sensing step further comprises:
sensing electrical signals via the second circuits, respectively, to get an electrical signal value array,
wherein the electrical signals and the driving signals have different frequencies,
wherein the processor is further configured for:
composing an electrical signal value image based on all the electrical signal value arrays according to positions of the third circuits corresponding to the electrical signal value arrays; and
calculating one or more positions of transmitters according to the electrical signal value image.

29. The touch sensitive apparatus of claim 28, wherein the processor is further configured for reporting the one or more positions of transmitters to a host.

30. A touch sensitive processing apparatus, in conjunction with the touch panel of claim 1, comprising:
an interconnection network for connecting the first electrodes, the second circuits, and the third circuits, respectively;
a driving circuit for connecting to the interconnection network;
a sensing circuit for connecting to the interconnection network; and
a processor, configured to execute instructions stored in a non-volatile memory for:
performing multiple approaching or touching value array sensing steps corresponding to each of the third circuits, wherein each approaching or touching value array sensing step further comprises:
controlling the switch circuits coupled to the corresponding third circuit being closed and controlling the switch circuits which are not coupled to the corresponding third circuit being opened;
providing driving signals to at least a part of the first electrodes; and
sensing the induced driving signals via the second circuits which are covered by the first electrodes which are not being provided with the driving signals, respectively, to get an interlace approaching or touching value array;

composing an interlace approaching or touching value image by all the interlace approaching or touching value arrays according to positions of the third circuits corresponding to the interlace approaching or touching value arrays; and calculating one or more points of approaching or touching according to the interlace approaching or touching value image.

31. The touch sensitive processing apparatus of claim 30, wherein the processor is further configured for calculating a pressure value corresponding to each of the points of approaching or touching according to the interlace approaching or touching value image.

32. The touch sensitive processing apparatus of claim 30, wherein any given two of the first electrodes being provided with the driving signals are not adjacent to each other.

33. The touch sensitive processing apparatus of claim 30, wherein the processor is further configured for reporting the one or more points of approaching or touching to a host.

34. The touch sensitive processing apparatus of claim 30, wherein the approaching or touching value array sensing step further comprises:
   sensing electrical signals via the second circuits, respectively, to get an electrical signal value array, wherein the electrical signals and the driving signals have different frequencies,
   wherein the processor is further configured for:
      composing an electrical signal value image based on all the electrical signal value arrays according to positions of the third circuits corresponding to the electrical signal value arrays; and
      calculating one or more positions of transmitters according to the electrical signal value image.

35. The touch sensitive processing apparatus of claim 34, wherein the processor is further configured for reporting the one or more positions of transmitters to a host.

36. A touch sensitive processing apparatus, in conjunction with the touch panel of claim 1, comprising:
   an interconnection network for connecting the first electrodes, the second circuits, and the third circuits, respectively;
   a driving circuit for connecting to the interconnection network;
   a sensing circuit for connecting to the interconnection network; and
   a processor, configured to execute instructions stored in a non-volatile memory for:
      performing multiple sensing steps corresponding to each of the third circuits, wherein each sensing step further comprises:
         controlling the switch circuits coupled to the corresponding third circuit being closed and controlling the switch circuits which are not coupled to the corresponding third circuit being opened;
         providing driving signals to at least a part of the first electrodes;
         sensing the induced driving signals via the second circuits which are covered by the first electrodes which are being provided with the driving signals, respectively, to get an interlace pressure value array; and
         sensing the induced driving signals via the second circuits which are covered by the first electrodes which are not being provided with the driving signals, respectively, to get an interlace approaching or touching value array;
      composing an interlace pressure value image by all the interlace pressure value arrays according to positions of the third circuits corresponding to the interlace pressure value arrays;
      composing an interlace approaching or touching value image by all the interlace approaching or touching value arrays according to positions of the third circuits corresponding to the interlace approaching or touching value arrays;
      calculating one or more points of pressure according to the interlace pressure value image; and
      calculating one or more points of approaching or touching according to the interlace approaching or touching value image.

37. The touch sensitive processing apparatus of claim 36, wherein the processor is further configured for:
   calculating a pressure value corresponding to each of the points of pressure according to the interlace pressure value image; and
   calculating a pressure value corresponding to each of the points of approaching or touching according to the interlace approaching or touching value image.

38. The touch sensitive processing apparatus of claim 36, wherein any given two of the first electrodes being provided with the driving signals are not adjacent to each other.

39. The touch sensitive processing apparatus of claim 36, wherein an absolute value of a difference of a number of the elements of the interlace approaching or touching value array and a number of the elements of the interlace pressure value array is zero or one.

40. The touch sensitive processing apparatus of claim 36, wherein the processor is further configured for reporting the one or more points of pressure and the one or more points of approaching or touching to a host.

41. The touch sensitive processing apparatus of claim 36,
   wherein each sensing step further comprises sensing electrical signals via the second circuits, respectively, to get an electrical signal value array,
   wherein the electrical signals and the driving signals have different frequencies,
   wherein the processor is further configured for:
      composing an electrical signal value image based on all the electrical signal value arrays according to positions of the third circuits corresponding to the electrical signal value arrays; and
      calculating one or more positions of transmitters according to the electrical signal value image.

42. The touch sensitive processing apparatus of claim 41, wherein the processor is further configured for reporting the one or more positions of transmitters to a host.

43. A touch sensitive processing apparatus, in conjunction with the touch panel of claim 1, further comprising:
   an interconnection network for connecting the first electrodes, the second circuits, and the third circuits, respectively;
   a driving circuit for connecting to the interconnection network;
   a sensing circuit for connecting to the interconnection network; and
   a processor, configured to execute instructions stored in a non-volatile memory for:
      setting a positive number i as 1,
      designating multiple non-adjacent ones of the first electrodes as a first set,
      designating rest of the first electrodes as a second set, and performing multiple interlace image sensing steps, wherein an i-th interlace image sensing step of the interlace image sensing steps comprises:
  performing multiple sensing steps corresponding to each of the third circuits, wherein each sensing step further comprises:
    controlling the switch circuits coupled to the corresponding third circuit being closed and controlling the switch circuits which are not coupled to the corresponding third circuit being opened;
    providing driving signals to the first set;
    sensing the induced driving signals via the second circuits which are covered by the first electrodes which are being provided with the driving signals, respectively, to get an interlace pressure value array; and
    sensing the induced driving signals via the second circuits which are covered by the first electrodes which are not being provided with the driving signals, respectively, to get an interlace approaching or touching value array;
  composing an i-th interlace pressure value image by all the interlace pressure value arrays according to positions of the third circuits corresponding to the interlace pressure value arrays;
  composing an i-th interlace approaching or touching value image by all the interlace approaching or touching value arrays according to positions of the third circuits corresponding to the interlace approaching or touching value arrays;
  increasing the positive integer i by 1 and exchanging the first set and the second set; and
  when value of the positive integer i is larger than 2,
    forming a complete pressure value image based on an (i−1)-th interlace pressure value image and an (i−2)-th interlace pressure value image and forming a complete approaching or touching value image based on an (i−1)-th interlace approaching or touching value image and an (i−2)-th interlace approaching or touching value image;
    calculating one or more points of pressure according to the pressure value image; and
    calculating one or more points of approaching or touching according to the approaching or touching value image.

44. The touch sensitive processing apparatus of claim 43, wherein the i-th interlace image sensing step further comprises:
  calculating a pressure value corresponding to each of the points of pressure according to the pressure value image; and
  calculating a pressure value corresponding to each of the points of approaching or touching according to the approaching or touching value image.

45. The touch sensitive processing apparatus of claim 43, wherein an absolute value of a difference of a number of the elements of the interlace approaching or touching value array and a number of the elements of the interlace pressure value array is zero or one.

46. The touch sensitive processing apparatus of claim 43, wherein the processor is further configured for reporting the one or more points of pressure and the points of approaching or touching to a host.

47. The touch sensitive processing apparatus of claim 43, wherein each sensing step further comprises:
  sensing electrical signals via the second circuits, respectively, to get an electrical signal value array, wherein the electrical signals and the driving signals have different frequencies, wherein the i-th interlace sensing step further comprises:
    composing an electrical signal value image based on all the electrical signal value arrays according to positions of the third circuits corresponding to the electrical signal value arrays; and
    calculating one or more positions of transmitters according to the electrical signal value image.

48. The touch sensitive processing apparatus of claim 47, wherein the processor is further configured for reporting the one or more positions of transmitters to a host.

49. A touch sensitive processing apparatus, in conjunction with the touch panel of claim 1, comprising:
  an interconnection network for connecting the first electrodes, the second circuits, and the third circuits, respectively;
  a driving circuit for connecting to the interconnection network;
  a sensing circuit for connecting to the interconnection network; and
  a processor, configured to execute instructions stored in a non-volatile memory for:
    performing multiple electrical signal value array sensing steps corresponding to each of the third circuits, wherein each electrical signal value array sensing step further comprises:
      controlling the switch circuits coupled to the corresponding third circuit being closed and controlling the switch circuits which are not coupled to the corresponding third circuit being opened; and
      sensing electrical signals via the second circuits, respectively, to get an electrical signal value array;
    composing an electrical signal value image based on all the electrical signal value arrays according to positions of the third circuits corresponding to the electrical signal value arrays; and
    calculating one or more positions of transmitters according to the electrical signal value image.

50. The touch sensitive processing apparatus of claim 49, wherein the processor is further configured for reporting the one or more positions of transmitters to a host.

51. The touch sensitive processing apparatus according to claims 27, 29, 33, 35, 40, 42, 46, 48, or 50, in which the touch sensitive processing apparatus is a modular component of a touch system.

* * * * *